US00RE40700E

(19) United States
(12) Reissued Patent
Heenan et al.

(10) Patent Number: US RE40,700 E
(45) Date of Reissued Patent: Apr. 14, 2009

(54) RETROREFLECTIVE ARTICLES HAVING MICROCUBES, AND TOOLS AND METHODS FOR FORMING MICROCUBES

(75) Inventors: Sidney A. Heenan, Park Ridge, IL (US); Liviu A. Coman, Deerfield, IL (US); Dennis I. Couzin, Berlin (DE)

(73) Assignee: Avery Dennison Corporation, Pasadena, CA (US)

(21) Appl. No.: 11/514,326

(22) Filed: Aug. 30, 2006

Related U.S. Patent Documents

Reissue of:
(64) Patent No.: 6,015,214
Issued: Jan. 18, 2000
Appl. No.: 08/655,595
Filed: May 30, 1996

(51) Int. Cl.
*G02B 5/124* (2006.01)
*A01K 1/015* (2006.01)

(52) U.S. Cl. ..... 359/530; 359/529; 428/221
(58) Field of Classification Search ..... 359/529–530
See application file for complete search history.

(56) References Cited

U.S. PATENT DOCUMENTS

| | | | |
|---|---|---|---|
| 1,591,572 | A | 7/1926 | Stimson |
| 1,795,952 | A | 3/1931 | James |
| 1,925,096 | A | 9/1933 | Hunter |
| 2,055,298 | A | 9/1936 | Leray |
| 2,310,790 | A | 2/1943 | Jungersen |

(Continued)

FOREIGN PATENT DOCUMENTS

| | | | |
|---|---|---|---|
| CA | 785139 | | 5/1968 |
| DE | 1917292 | * | 4/1969 |
| DE | 1917292 | | 10/1970 |
| DE | 2317871 | * | 4/1973 |
| DE | 2317871 | | 10/1974 |

(Continued)

OTHER PUBLICATIONS

*Applied Optics,*"Photometry and Colorimetry of Retroreflection: State–of–Measurement–Accuracy Report," Apr. 1, 1981, p. 1266, vol. 20, No. 7.
*Applied Optics,*"Making Masters for Corner Cube Reflectors," Apr. 15, 1981, pp. A80, 1267–1268, vol. 20, No. 8.

*Primary Examiner*—James Phan
(74) *Attorney, Agent, or Firm*—Christie, Parker & Hale, LLP.

(57) ABSTRACT

A method for tooling a pattern of retroreflective microcubes, which pattern can be subdivided into smaller increments within which there are straight line tooling paths, none of which pass through an otherwise solid part of the incremental pattern. The tooling paths within the various increments need not be parallel to a common plane. Various adaptions of the method enable the tooling of a number of specific microcube shapes and for modifying such optical properties of the microcubes as entrance angularity, incidence angularity, orientation angularity, observation angularity, percent active aperture and retroreflectance. Specific techniques govern the pre-selection of cube parameters such as cube axis cant, cube apex decentration, and cube boundary proportions, which parameters can be adjusted independently of each other. Designs tooled by the method can have 100% active aperture at near zero degrees entrance angle. The method involves providing a plurality of plates of micro thickness, each plate having at least one end comprised of a material that can be tooled with polished surfaces by means of an appropriate tool, tooling on said end of each plate an increment of the pattern, and assembling the plates together in various ways to form a master. Retroreflective articles made by means of this technique are expected to provide superior performance when used in pavement markers, highway signs and other applications.

41 Claims, 27 Drawing Sheets

U.S. PATENT DOCUMENTS

| | | | |
|---|---|---|---|
| 3,069,721 | A | 12/1962 | Arni et al. |
| 3,332,327 | A | 7/1967 | Heenan |
| 3,417,959 | A | 12/1968 | Schultz |
| 3,541,606 | A | 11/1970 | Heenan et al. |
| 3,684,348 | A | 8/1972 | Rowland |
| 3,689,346 | A | 9/1972 | Rowland |
| 3,712,706 | A | 1/1973 | Stamm |
| 3,830,682 | A | 8/1974 | Rowland |
| 3,833,285 | A | 9/1974 | Heenan |
| 3,834,789 | A | 9/1974 | Brundy |
| 3,873,184 | A | 3/1975 | Heenan |
| 3,922,065 | A | 11/1975 | Schultz |
| 3,923,378 | A | 12/1975 | Heenan |
| RE29,396 | E | 9/1977 | Heenan |
| 4,066,331 | A | 1/1978 | Lindner |
| 4,073,568 | A | 2/1978 | Heasley |
| 4,076,383 | A | 2/1978 | Heasley |
| 4,080,280 | A | 3/1978 | Heasley |
| 4,095,773 | A | 6/1978 | Lindner |
| 4,202,600 | A | 5/1980 | Burke et al. |
| 4,208,090 | A | 6/1980 | Heenan |
| 4,243,618 | A | 1/1981 | Van Arnam |
| 4,244,683 | A | 1/1981 | Rowland |
| 4,332,847 | A | 6/1982 | Rowland |
| 4,349,598 | A | 9/1982 | White |
| 4,460,449 | A | 7/1984 | Montalbano |
| 4,478,769 | A | 10/1984 | Pricone et al. |
| 4,486,363 | A | 12/1984 | Pricone et al. |
| 4,588,258 | A | 5/1986 | Hoopman |
| 4,633,567 | A | 1/1987 | Montalbano |
| 4,775,219 | A | 10/1988 | Appeldorn et al. |
| 4,833,285 | A | 5/1989 | Okamoto et al. |
| 4,895,428 | A | 1/1990 | Nelson et al. |
| 4,938,563 | A | 7/1990 | Nelson et al. |
| 5,122,902 | A | 6/1992 | Benson |
| 5,138,488 | A | 8/1992 | Szczech |
| 5,450,235 | A | 9/1995 | Smith et al. |
| 5,557,836 | A | 9/1996 | Smith et al. |
| 5,564,870 | A | 10/1996 | Benson et al. |
| 5,585,164 | A | 12/1996 | Smith et al. |
| 5,600,484 | A | 2/1997 | Benson et al. |
| 5,706,132 | A | 1/1998 | Nestegard et al. |
| 5,764,413 | A | 6/1998 | Smith et al. |
| 5,812,315 | A | 9/1998 | Smith et al. |
| 5,822,121 | A | 10/1998 | Smith et al. |
| 5,926,314 | A | 7/1999 | Smith et al. |
| 5,936,770 | A | 8/1999 | Nestegard et al. |
| 5,981,032 | A | 11/1999 | Smith et al. |
| 6,168,275 | B1 | 1/2001 | Benson et al. |
| 6,350,035 | B1 | 2/2002 | Smith et al. |
| 6,508,559 | B2 | 1/2003 | Bacon, Jr. et al. |
| 6,770,225 | B2 | 8/2004 | Nilsen et al. |

FOREIGN PATENT DOCUMENTS

| | | | | |
|---|---|---|---|---|
| DE | 4236399 | A1 | * | 10/1992 |
| DE | 92171796 | U | * | 12/1992 |
| DE | 92171796 | U1 | | 6/1993 |
| DE | 4236799 | C2 | | 5/1994 |
| DE | 4236799 | A1 | | 5/1994 |
| DE | 4410994 | C2 | | 10/1995 |
| EP | 844056 | B1 | | 5/1998 |
| EP | 0844056 | A1 | * | 5/1998 |
| EP | 875008 | B1 | | 11/1998 |
| EP | 885705 | B1 | | 12/1998 |
| EP | 0885705 | A1 | * | 12/1998 |
| FR | 1289029 | | | 2/1962 |
| GB | 269760 | | | 4/1927 |
| GB | 423464 | | | 2/1935 |
| WO | WO 9418581 | A1 | | 8/1994 |
| WO | WO 9511463 | A2 | | 4/1995 |
| WO | WO 9511465 | A2 | | 4/1995 |
| WO | WO 9511467 | A2 | | 4/1995 |
| WO | WO 9511470 | A1 | | 4/1995 |
| WO | WO 9704939 | A1 | | 2/1997 |
| WO | WO 9704940 | A1 | | 2/1997 |
| WO | WO 9727035 | A1 | | 7/1997 |
| WO | WO 9901269 | A1 | | 1/1999 |
| WO | WO 9901273 | A1 | | 1/1999 |
| WO | WO 9901274 | A1 | | 1/1999 |
| WO | WO 9901275 | A1 | | 1/1999 |

* cited by examiner

FIG. 7A
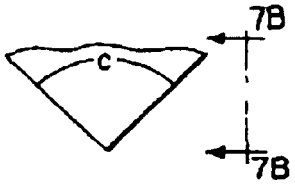
FIG. 7B
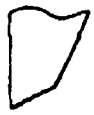
FIG. 9
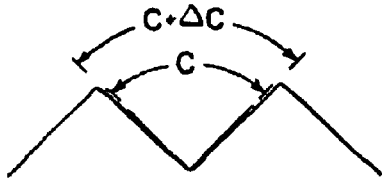
FIG. 8B
TOOL DIRECTION DURING CUTTING
FIG. 8A
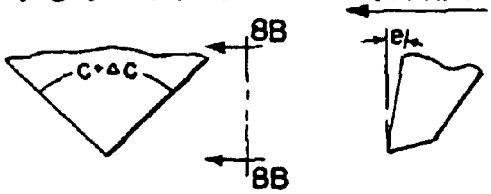
FIG. 10B
PROJECTION PERPENDICULAR TO THE PLANE OF THE CUBE APICES
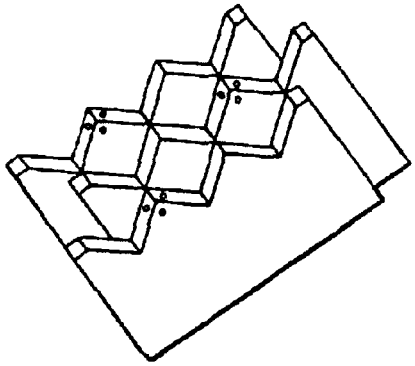
FIG. 10A
PROJECTION ALONG CUBE DIAGONAL
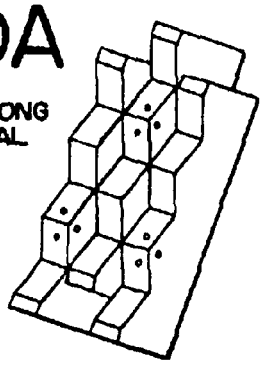
FIG. 10
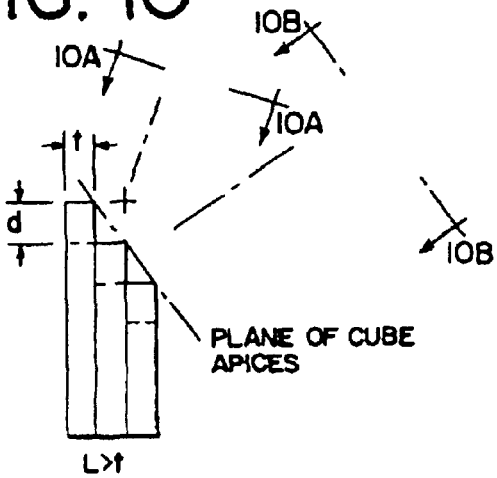
FIG. 10C
PROJECTION PERPENDICULAR TO FACE OF PLATE
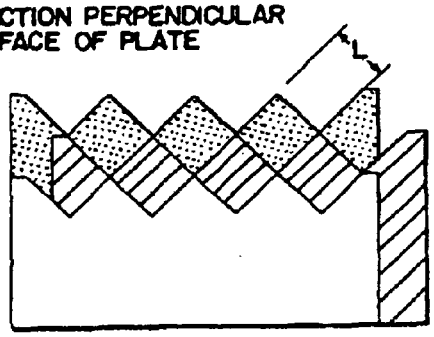

FIG. 11A
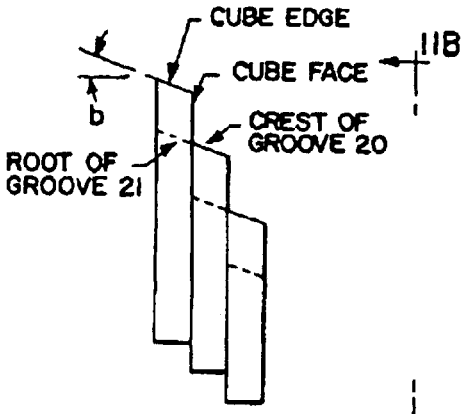
FIG. 11B
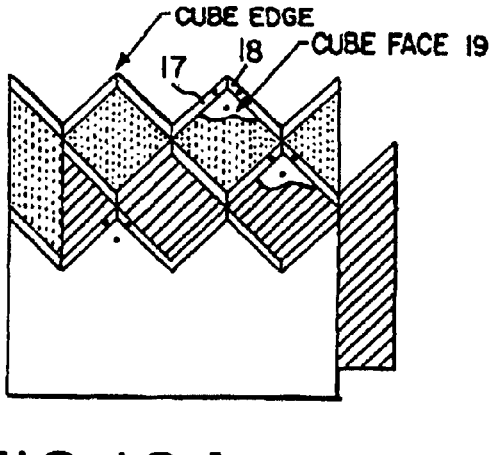
FIG. 11
PLATE ANGLE HIGHLY EXAGGERATED
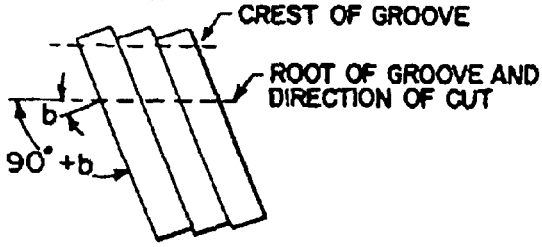
FIG. 12A
PROJECTION ALONG CUBE DIAGONAL
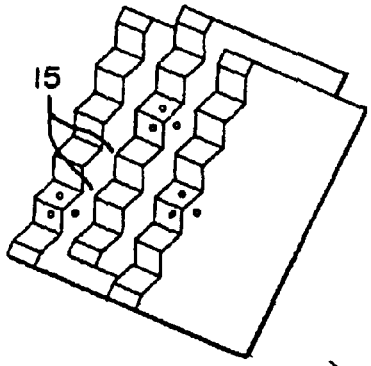
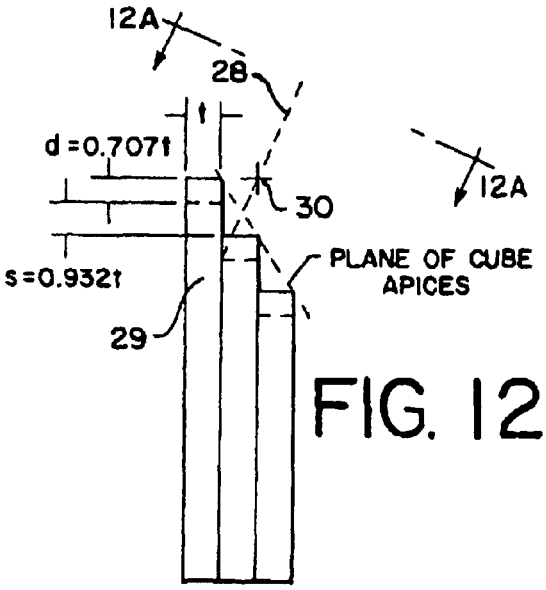
FIG. 12
PLATES DISPLACED SO GROOVE EDGE DOES NOT MEET GROOVE ROOT OF ADJACENT PLATE L=t
FIG. 12B
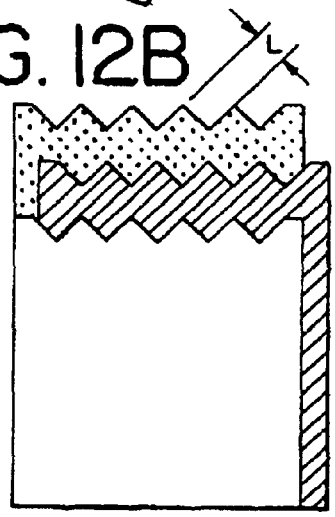
PROJECTION PERPENDICULAR TO FACE PLATE INTERRELATIONSHIP OF d, s, t, I AND I' FOR NEGATIVE VALUES OF I INTERRELATIONSHIP OF d, s, t, I AND I' FOR POSITIVE VALUES OF I

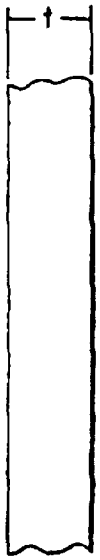
FIG. 14A
FIG. 14B
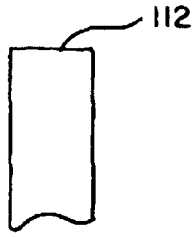
FIG. 15
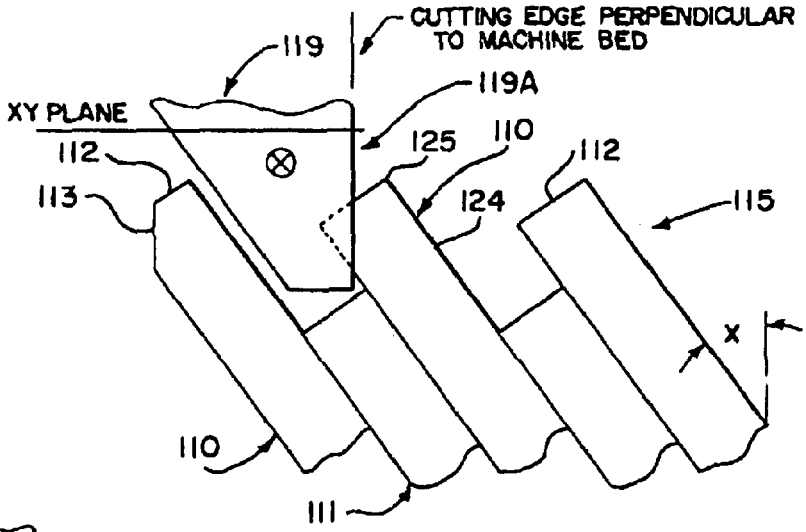
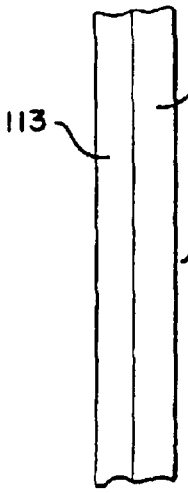
FIG. 16A
FIG. 16B
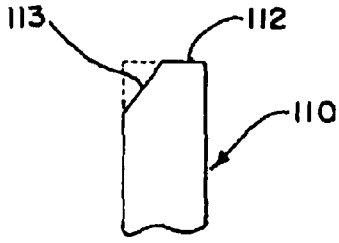

FIG. 17
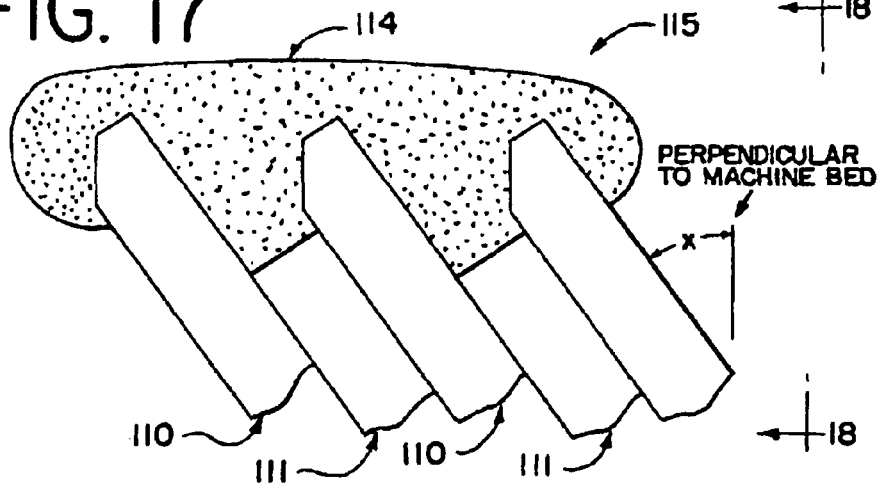
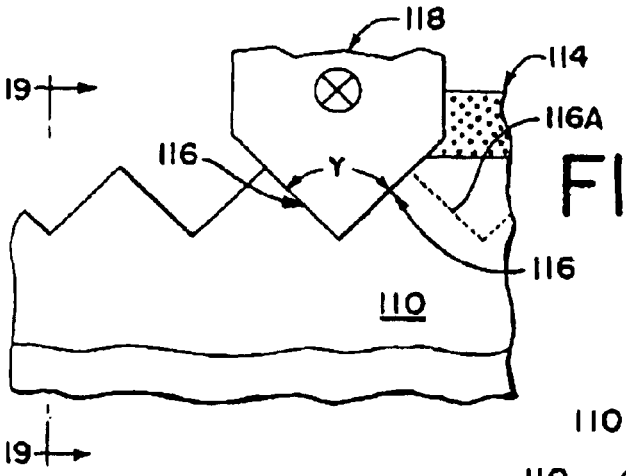
FIG. 18
FIG. 21
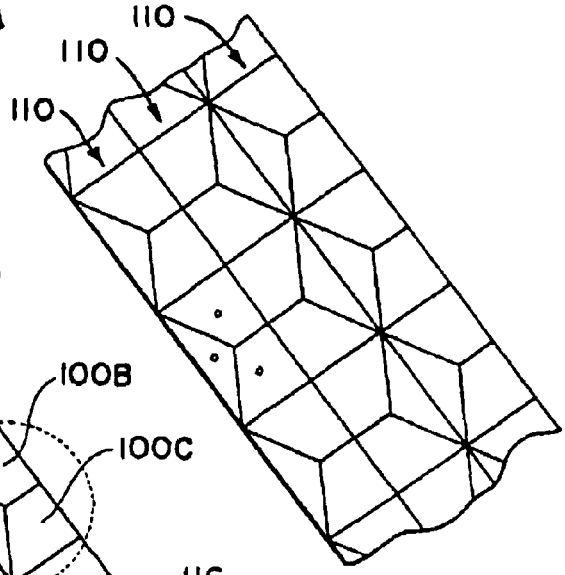
FIG. 20
FIG. 19
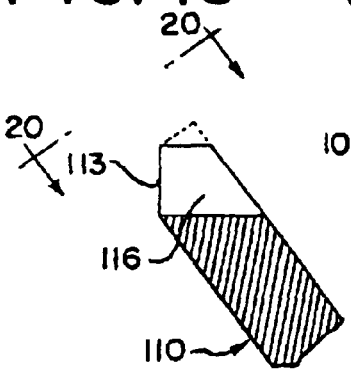
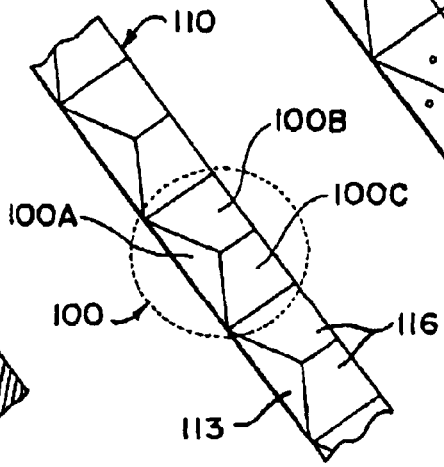

FIG. 22A
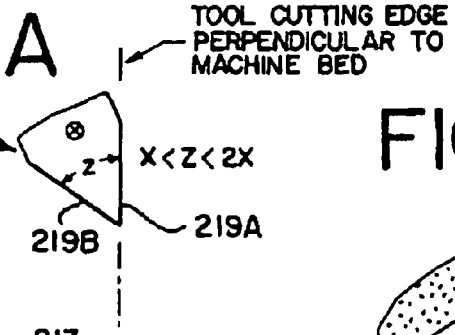
FIG. 22B
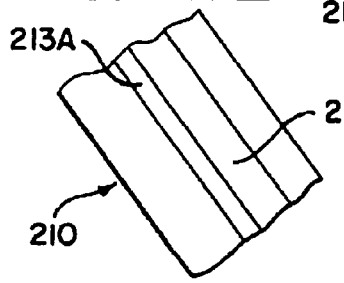
FIG. 22C
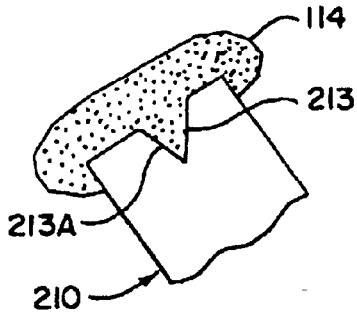
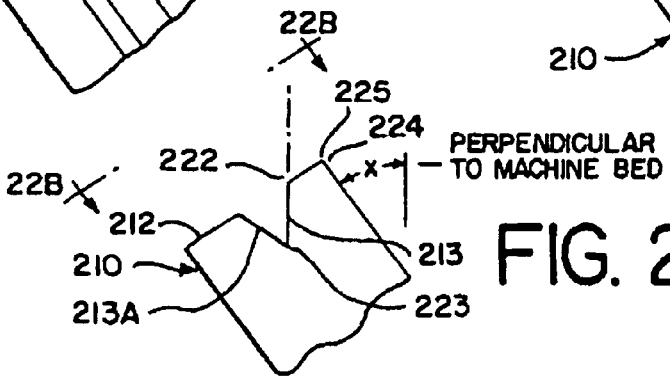
FIG. 22
FIG. 23
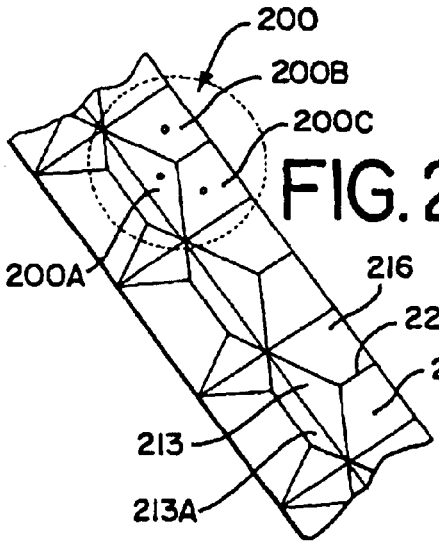
FIG. 23B
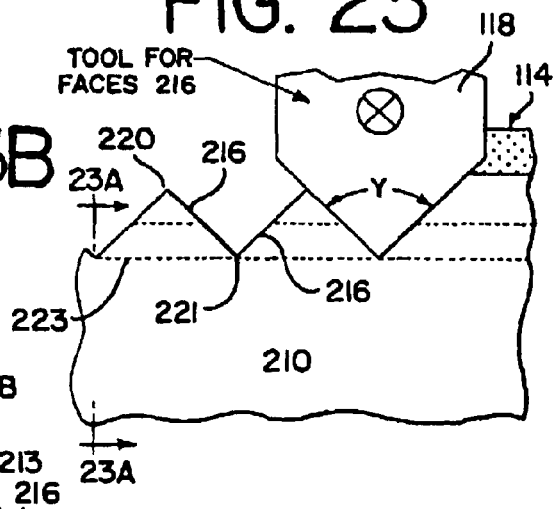
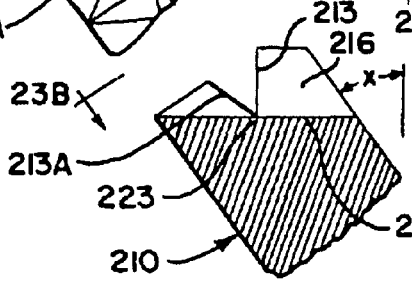
FIG. 23A

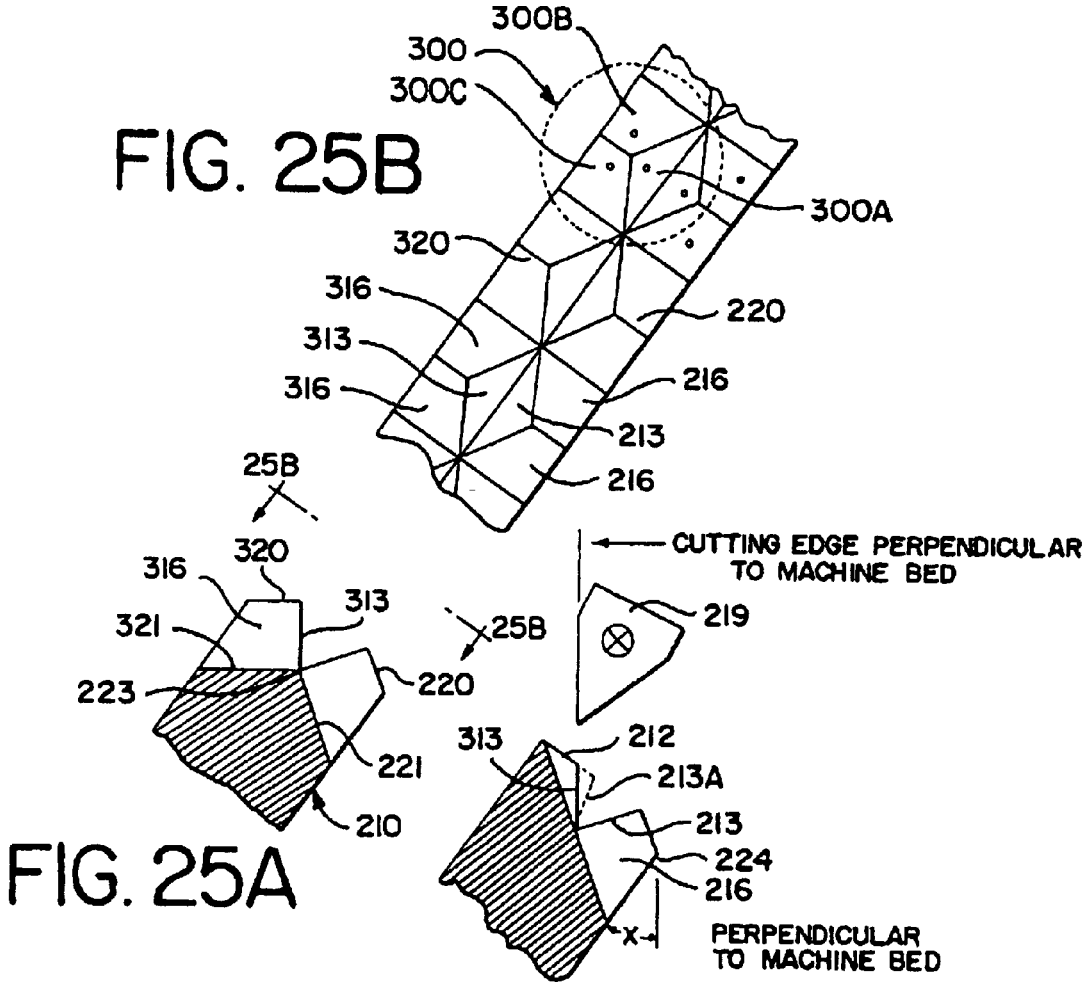
FIG. 25B
FIG. 25A
FIG. 24
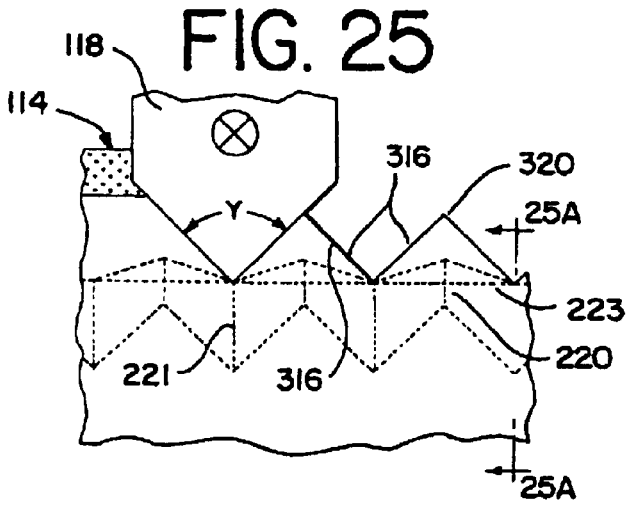
FIG. 25

FIG. 26
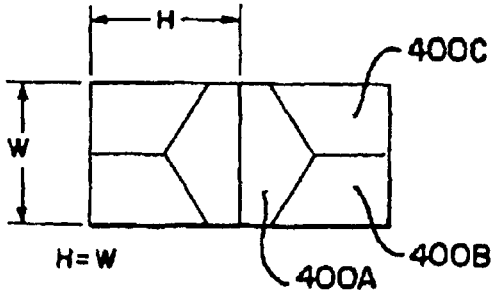
FIG. 27B
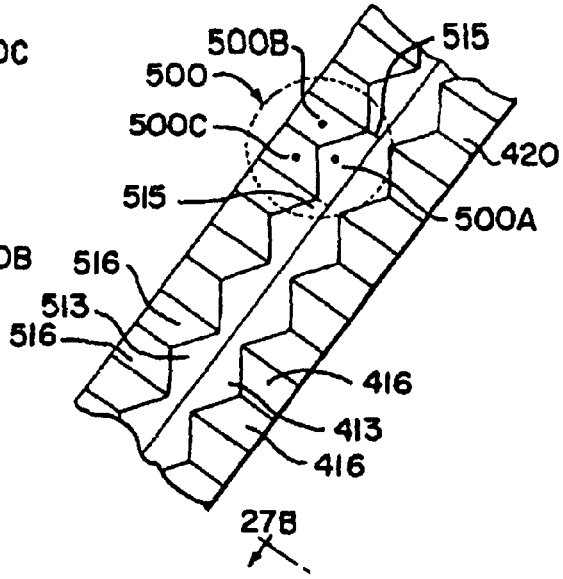
FIG. 27
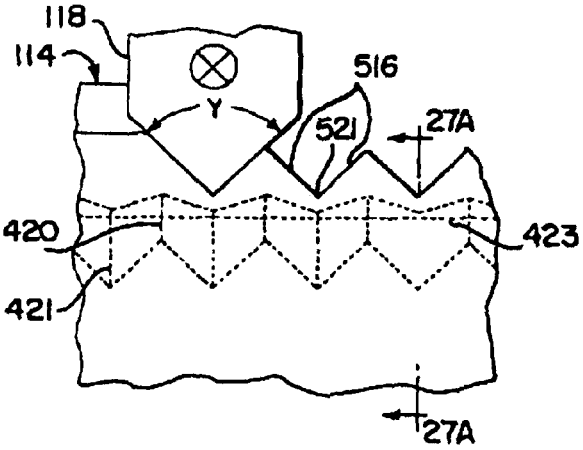
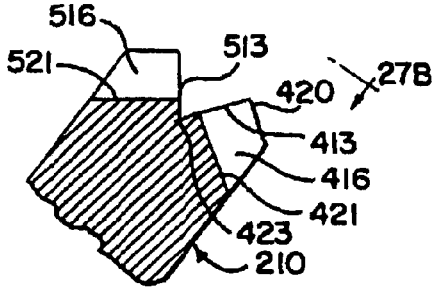
FIG. 27A
FIG. 27C
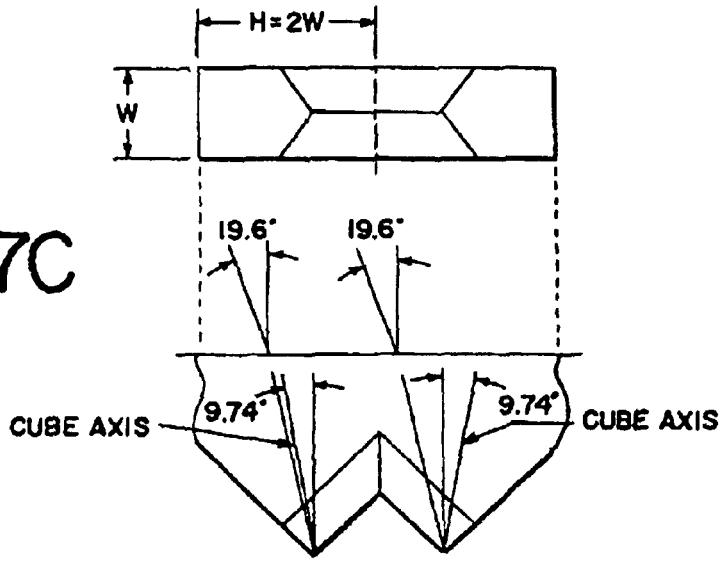

113
H
W
116
PRINCIPAL REFRACTED RAY

X
35.26°
θ
CUBE AXIS
CAC
OPTICAL AXIS
0.5W
FRONT SURFACE TILT, T

FIG. 35 ARRAY OF PENTA-FACE HEXAGONAL CUBES SHOWING A PLATE HIGHLIGHTED
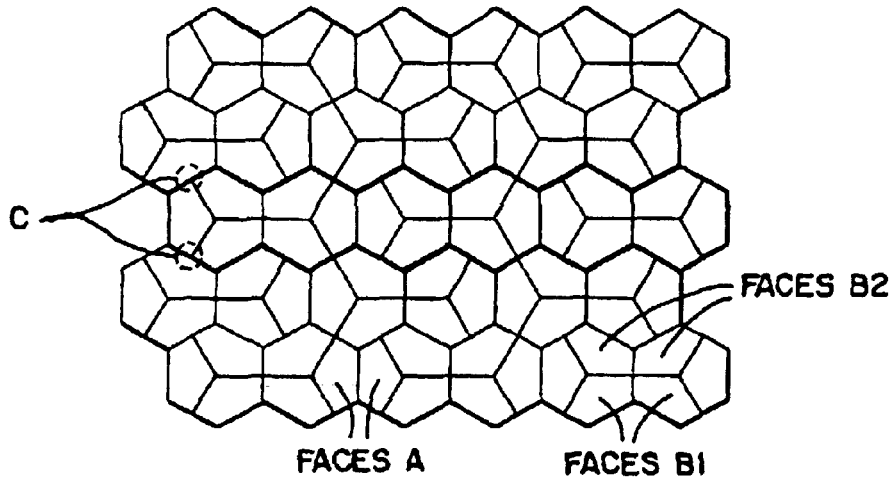
FIG. 36
ARRAY OF PENTAGONAL CUBES WITH +8.7 AXIS TILT AND 89.8 AREA EFFICIENCY
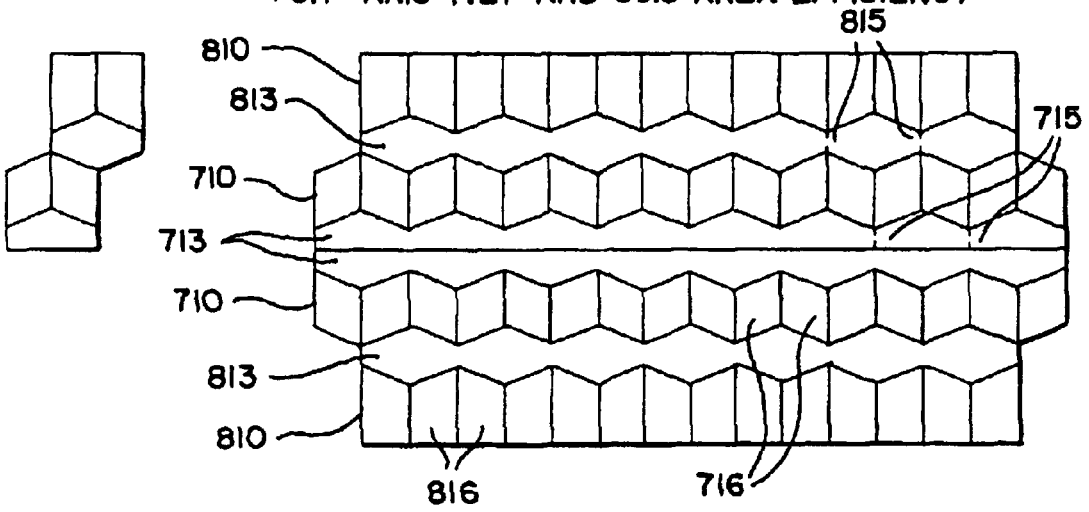
FIG. 36A
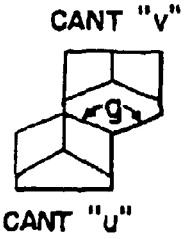
$$g = 2\arctan \frac{\sqrt{3}\cos(v-u)}{\cos(v) - \sqrt{2}\sin(v)}$$

PERFORMANCE OF SIMPLEST HEXBLADE ARRAY (d/t=.7071, s/t=0, NOT PAIRED) FORMED IN MATERIALS OF DIFFERENT REFRACTIVE INDICES

RETROREFLECTANCE VERSUS ENTRANCE ANGLE FOR PAIRED ARRAYS O

RETROREFLECTIVE ARTICLES HAVING MICROCUBES, AND TOOLS AND METHODS FOR FORMING MICROCUBES

Matter enclosed in heavy brackets [ ] appears in the original patent but forms no part of this reissue specification; matter printed in italics indicates the additions made by reissue.

BACKGROUND OF THE INVENTION

This invention relates to tools for making microcube retroreflective elements for use in manufacturing retroreflective articles, and in particular, retroreflective sheeting; to articles and sheeting having microcubes; and to methods of making such tools and articles. This invention further relates to tools, articles, and methods wherein said microcubes may have boundary shapes other than triangular.

Microcube retroreflective sheeting is now well-known as a material for making reflective highway signs, safety reflectors, reflective vests and other garments, and other safety-related items. Such retroreflective sheeting typically comprises a layer of a clear resin, such as for example, an acrylic or polycarbonate or vinyl, having a smooth front surface and a plurality of retroreflective microcube elements on the reverse surface. Light incident on the smooth front surface passes through the sheeting, impinges on the retroreflective elements, and is reflected back out through the smooth front surface in a direction nominally 180° to the direction of incidence.

The reverse surface of the resin layer bearing the microcubes may be further provided with additional layers, such as metallization, which enhances the entrance angularity of the sheeting, or hydrophobic silica, adhesives, release liners, or other layers which otherwise contribute to the functionality of the sheeting.

Cube corner retroreflectors have been used on automobiles and for highway markings since the early 1900's. These prior art devices were based on macrocube corner elements made by the pin making art. From the use of macrocubes, a number of optical principles involving cube corner technology have been published, and some have been patented. Generally, these principles have involved changes in the size, shape or tilt of the cube faces, or of the included dihedral angles between faces, to achieve desired retroreflector performance. These known optical principles have included:

- increasing the efficiency of the retroreflector at large observation angles by changing one or more of the three dihedral angles of the cube, as taught in Heenan U.S. Pat. No. 3,833,285;
- increasing the efficiency of the retroreflector at large incident angles by inclining the cube axis with respect to the normal (often called "angled reflex"), taught, for example, in Leray U.S. Pat. No. 2,055,298 and Br. 423, 464, and in Heenan U.S. Pat. No. 3,332,327;
- increasing entrance angularity in one or more planes by including in the array cubes with cube axis cant, as taught in Heenan U.S. Pat. No. 3,873,184 and Heenan U.S. Pat. No. 3,923,378, and, in particular, by positioning one face of each of the oppositely oriented cubes more parallel to the front face of the reflector, as taught in Heenan et al U.S. Pat. No. 3,541,606 to increase entrance angularity in two planes at right angles to each other;
- increasing uniformity of retroreflectance versus orientation by rotating some cubes by varying degrees about a normal to the front surface of the article, and also by assembling them in arrays of variant dispositions, as in Uding Canadian Pat. No. 785,139; and by angling the cube axis in combination with multiple rotations, as in U.S. Pat. No. 3,923,378.

While these retroreflective optic design principles are well-known in the cube corner art, in more recent years some have attempted to patent them again in microcube sheeting technology, apparently because those persons either did not know what was done in prior macrocube technology, or chose either to ignore or to limit the applicability of the prior art teachings when applied to microcube retroreflective sheeting.

Prior to applicants' present invention, virtually all microcube sheeting has been limited to the use of microcubes made by ruling along parallel planes. This limitation is a result of the microcube dimensions being smaller than the dimensions obtainable by the cutting, polishing and lapping techniques used in the pin making art. The need to use traditional ruling techniques has inhibited the application of known optical principles to microcubes, and has, with one exception, further generally limited percent active aperture to less than 100%.

The present invention is a major advance in microcube sheeting technology. It enhances both the applicability to microcubes of prior known retroreflective optic principles and the manufacturability of microcubes of different base configurations. Before detailing these advances, further background information is provided.

Retroreflective sheeting and methods of forming the microcube retroreflective elements in such sheeting are disclosed, for example in Pricone et al. U.S. Pat. No. 4,486,363, assigned to the common assignee herein, and incorporated herein by reference in its entirety. As disclosed in such patent, the resinous layer of the sheeting may be on the order of 0.01 inch (0.25 mm) thick or less, and the retroreflective elements formed in the reverse face of the resinous layer comprise triangular microcubes such as are known in the manufacture of flexible retroreflective sheeting.

To manufacture such microcube sheeting, generally a master plate of retroreflective triangular microcubes is made by ruling a pattern of retroreflective cube corners into a planar surface of the plate. This is taught generally by Stamm U.S. Pat. No. 3,712,706; is mentioned in U.S. Pat. No. 5,122,902; and is also taught in detail in U.S. Pat. No. 4,478,769, assigned to the applicants' assignee and incorporated herein by reference in its entirety.

As shown in FIGS. 1A, 2 and 3 of the '769 patent, the planar surface of a master plate is ruled with a diamond tool which cuts a series of precise parallel V-shaped grooves. To rule equilateral triangular microcubes, three sets of parallel grooves intersecting one another at angles of 60° are made; each groove also will have an included angle of substantially 70.53°, and will be ruled to a groove depth determined by the height of the microcubes desired. This automatically results in an array of oppositely oriented pairs of equilateral triangular microcubes on the face of the master.

The ruled master may then be used to make a series of duplicates, such as by electroforming, and the duplicates are assembled together to form a single "mother" tool. The assembled "mother" tool is used to electroform molds, which are then assembled and ultimately used to form a tool capable of providing the microcube retroreflective elements on the sheeting, such as by embossing, casting, or other means known in the art. A continuous embossing method is disclosed in the aforementioned U.S. Pat. No. 4,478,769; a casting technique for forming microcubes is disclosed, for example, in Rowland U.S. Pat. Nos. 3,684,348 and 3,689,346.

As will be described hereafter, triangular microcubes having bases other than equilateral triangles have been used in an effort to achieve enhanced entrance angularity by use of the well known optical principles taught in macrocube technology. Thus, as taught in applicants' assignee's commonly assigned patent Montalbano U.S. Pat. No. 4,633,567, variations of the triangular microcube may be achieved by changing the tool ruling angles (thus, canting the cube axis), thereby adopting and applying some of the prior optical principles to microcube technology. For example, it is possible to achieve arrays having different entrance angularity or orientation angularity (c.f. Rowland U.S. Pat. No. 3,684,348, col. 10, 11. 1–18 and Montalbano U.S. Pat. No. 4,633,567, col. 6, 11. 4–36)

As previously noted, U.S. Pat. No. 3,833,285, discloses that the observation angularity of cube corner retroreflection can be increased in one plane by increasing (or decreasing) one of the three dihedral angles of the cubes; U.S. Pat. Nos. 3,873,184 and 3,923,378, discloses an array of retroreflective elements wherein the cube axes of neighboring cubes are inclined with respect to each other and oppositely oriented such that the entrance angularity is increased; U.S. Pat. No. 3,541,606 discloses that if one cube face of each of the oppositely oriented cubes is "more parallel" to the front surface, entrance angularity is increased in two planes at right angles to each other. Each of the foregoing patents is incorporated herein by reference.

The identical optical principles used in macrocubes for enhancing retroreflectivity have also been applied to the triangular microsized cubes such as are used in retroreflective sheeting. Thus, U.S. Pat. No. 4,588,258 to Hoopman discloses a retroreflective article with purportedly novel wide angularity wherein an array of triangular microcube elements comprises sets of matched pairs with the cube axes of the cubes in each pair being tilted toward one another; but this simply duplicates the face-more-parallel structure disclosed, for example, in applicants' assignee's prior U.S. Pat. No. 3,541,606, U.S. Pat. No. 3,923,378 or U.S. Pat. No. 3,873,184 patents. Moreover, the Hoopman matched pairs of triangles are inherent when ruling triangles, which at the time of Hoopman's application was the only technique used for manufacturing microcubes.

Similarly, U.S. Pat. No. 4,775,219 to Appeldorn, et al., discloses a retroreflective article of modified observation angularity having an array of microcube retroreflective elements formed by three intersecting sets of parallel V-shaped grooves, wherein at least one of the sets includes, in a repeating pattern, at least two groove side angles that differ from one another. The Appeldorn article merely achieves, in an obvious manner, the identical principle taught years ago in applicants' commonly assigned U.S. Pat. No. 3,833,285.

However, all triangular cubes, while providing adequate retroreflectance, suffer the known disadvantage that inherently by their geometry no more than 66% of their area can be retroreflective for any particular incidence angle. In an attempt to overcome this deficiency of triangular cubes, the Minnesota Mining and Manufacturing Company, in a series of published PCT applications (WO 95/11463; WO 95/11465; WO 95/11467; WO 95/11470), has disclosed arrays of microcubes including some non-triangular cubes, and techniques for ruling such arrays. However, the disclosed arrays have cubes of greatly different heights (which may pose manufacturing problems) and greatly varying aperture size (affecting diffraction and impacting on retroreflectivity). At best, the disclosed arrays provide calculated percent effective aperture (at 0° incidence) of 91%, which appears to fall to about 87% when manufacturing draft is considered (see, e.g., WO 95/11470, FIG. 12). If the cubes are canted by the disclosed ruling technique, the efficiency drops even further. The very nature of forming these cubes by intersecting ruled grooves parallel to a single plane inherently limits the results which can be obtained.

The advantages of the techniques and articles of the present invention, as compared to those obtained by the earlier, triangular microcubes or even by the more recent ruled mixtures of triangular and non-triangular cubes, are shown in the drawings of this application and are more specifically described hereinafter.

Unlike triangular cube corners, hexagonal and rectangular cube corners have the advantage that 100% of their area can be retroreflective even at large incidence angles. Also unlike triangular microcubes, however, hexagonal and rectangular microcubes are not defined by continuous straight lines that extend along a planar surface, and therefore cannot be ruled with intersecting sets of parallel lines all parallel to a common plane. Thus, with the sole exception of the rectangular cubes disclosed in U.S. Pat. Nos. 4,349,598 and 4,895,428 (wherein one of the active cubes faces is perpendicular to the reflector front surface) it is not possible to cut or rule a master containing all hexagonal or all rectangular microcubes by ruling straight lines in a single flat surface. Moreover, because of the geometric limitations inherent in ruling the cubes for the U.S. Pat. No. 4,349,598 and U.S. Pat. No. 4,895,428 patents, the cube structures disclosed therein are not useful where the primary light source will generally be at a near-zero incidence angle, such as in highway sign sheeting.

Processes for making tools having macrocubes are known in the prior art. Such tools are typically made by assembling a cluster of metal pins, each pin having a single cube corner machined and polished on one end. Hexagonal pins typically may have a dimension across parallel flats on the order of about 0.10 inch (2.5 mm). Rectangular pins have a short dimension of about 0.070 inch (1.8 mm) and a long dimension of about 0.120 inch (3.0 mm). A cluster of such pins is then used as a master to electroform a mold. These larger cubes, because of their height, are too large for use in the manufacture of thin flexible retroreflective sheeting requiring microcubes, but do find utility where larger (and thus taller) retroreflective elements are acceptable, such as in molded plastic reflectors for roadway markers, automobile taillights, and the like.

Because of manufacturing limitations, the smallest pin known to applicants has a cube shape about 0.040" square. Microcubes as used in flexible retroreflective sheeting generally are no greater than about 0.016 inch (0.4 mm) on a side, and in applicants' assignee's commercial sheeting products, the longest edge of the cube shape is about 0.010 inches (0.25 mm).

The term microcube (or a cube of small dimensions), has been used in patents of others to describe or claim sheeting products produced from tools made directly or indirectly from ruled masters, as opposed to retroreflector articles comprising macrocubes typically formed by grouping pins (or by other techniques used to form the larger cubes).

For tooling hexagonal cubes, an alternative to the "pin cluster" manufacturing technique is shown in Applied Optics, Vol. 20, No. 6, p. 1268, 15 Apr., 1981. It is there stated that one way to achieve hexagonal cube corners is to accurately machine and polish grooves in the edge surfaces of a stack of flat plates and to assemble the plates at a desired angle. The reference shows a photograph of several flat plates with grooves cut in one edge, stacked one atop the other and with adjacent plates shifted with respect to one another so that the grooves are offset. The tilted stack of plates so assembled results in a set of hexagonal cubes which may be used as a master for electroforming molds. However, this technique was disclosed decades earlier by applicants' assignee's founder and was stated to be an unsatisfactory technique for tooling retroreflectors, see U.S. Pat. No. 1,591,572 (FIG. 16, p. 5, 11. 85–99).

Heretofore, the above-described "stacked plates" method of forming macrocubes was not of practical interest for producing molds for retroreflective products on a commercial scale. First, the molds for macrocubes could be made satisfactorily by the aforementioned clustering of hexagonal pins. Secondly, as observed in U.S. Pat. No. 1,591,572, by using conventional machining and polishing techniques, it was not possible to cut and polish inside-intersecting faces with the precise angular tolerances and sharp edges achievable with the pin technique. In particular, any irregularities in the cube surfaces as might be caused by either the cutting operation or the polishing operation could disadvantageously increase the divergence of the retroreflected light and thus diminish the effective retroreflectivity of the cubes so formed. This recognized difficulty in polishing grooved internal angles is highly exacerbated with microcubes because the area that cannot be polished flat is a relatively greater percentage of the resulting cube face area.

As part of the present application, applicants disclose a technique for making and using thin plates that can be ruled without the need of polishing and that can be assembled in various ways to achieve microcube elements not previously available.

It is an object of the present invention to provide an array of microcubes which cannot be produced by ruling in one plane.

It is a further object of the invention to provide an array of microcubes in which the non-dihedral face-edges are not all parallel to a common plane.

It is still another object of the invention to provide means for interrelating three constructional parameters defining a hexagonal microcube (i.e., slippage, groove depth, and plate thickness, explained infra), by which the desired optical characteristics of the microcube can be optimized.

It is still another object of the invention to provide a retroreflective article and, in particular, retroreflective sheeting, having a pattern of hexagonal retroreflective microcubes having desired retroreflective characteristics.

It is another object of the instant invention to provide a method of making a tool including two or more contiguous hexagonal microcubes, which tool can be used for making a retroreflective article and, in particular, retroreflective sheeting.

It is still another object of the invention to provide a method of making a tool having a pattern of all hexagonal microcubes, which tool is made in part by ruling a set of grooves into the ends of a set of plates and then assembling the plates so as to define an array of hexagonal microcubes having desired retroreflective characteristics.

It is yet another object of the invention to provide an article having hexagonal microcubes wherein all of the cube faces are pentagonal; to provide a tool for making such an article; and to provide methods for making such an article and such a tool.

It is yet another object of the invention to provide a retroreflective article and, in particular, retroreflective sheeting, having rectangular retroreflective microcubes in which no dihedral face-edges of one cube are collinear with those of another cube, and in particular, such an article in which the microcubes provide desired retroreflective characteristics.

It is another object of the invention to provide a tool having a unique pattern of rectangular microcubes in which cube axis cant is not constrained by the need for collinearity of dihedral face-edges of adjacent cubes, which tool can be used for making a retroreflective article and, in particular, retroreflective sheeting.

It is another object of the instant invention to provide a method of making a tool having a pattern of rectangular microcubes in which dihedral face-edges are not collinear, which tool can be used for making a retroreflective article having rectangular microcubes, such as sheeting.

It is still another object of the invention to provide a method of making a tool having a pattern of rectangular microcubes, which tool is made in part by ruling grooves and bevels into plate ends to provide a desired rectangular cube shape and pattern.

It is also an object of the invention to provide a method of making rectangular microcube tools by means of assembling flat plates, on one end of which the rectangular microcubes have been formed.

It is still another object of the invention to provide an article having a pattern of retroreflective square microcubes, wherein the microcubes in a square set of four cubes have cube axes canted in four different directions.

It is yet another object of the invention to provide an article having a pattern of retroreflective pentagonal microcubes; to provide a tool for making such an article; and to provide methods for making such an article and such a tool.

It is still another object of the invention to provide an article having a pattern of pentagonal microcubes with canted cube axes, and such an article having pentagonal microcubes with differently canted cube axes, and tools for making such articles and methods for making such tools and articles.

Still a further object of the invention is to provide a retroreflective article having one or more triangular microcubes in which the cube shape and the position of the projection of the cube apex within the cube shape are independent of the cube axis cant.

Yet a further object is to provide such a retroreflective article in which adjacent triangular microcubes may have different degrees of inclination of the cube axes and are not necessarily matched pairs.

Other objects, advantages, and novel features of the instant invention will be understood by those skilled in the art from the following specification and the drawings appended hereto.

SUMMARY OF THE INVENTION

In accordance with the invention, methods are disclosed for making a tool having a pattern of microcubes for use in making a retroreflective article. A plurality of plates is provided, each plate having two substantially parallel planar surfaces and at least one end made of a material that can be cut by a cutting tool that will produce an optical surface, as cut. The plate has a micro-sized thickness "t", i.e., on the order of about one or two microcube widths, depending upon the type of microcube-corner to be tooled. The thickness need not be the same for all plates.

Many shapes of microcubes are manufacturable using the plate process disclosed herein. Two shapes, hexagonal and rectangular, are discussed in detail; other shapes are described more generally to illustrate the versatility of the process.

Hexagonal Microcubes

To produce a pattern of hexagonal microcubes, the plates are stacked one against another so that the set of ends of cuttable material lies substantially in a single plane, which, in a preferred form, is substantially perpendicular to the parallel planar surfaces of each plate. A series of parallel V-shaped grooves is ruled with a cutting tool into the set of cuttable ends. The ruled grooves preferably have polished surfaces as cut and therefore do not require subsequent lapping and polishing as do pins used in making macrocubes.

In one embodiment of the invention, the direction of cutting the grooves is nominally perpendicular to the planar surfaces of the plates, the length "L" of each inclined surface of the groove perpendicular to the direction of cutting is chosen to be equal to the thickness "t" of the plate, and the included angle between the inclined surfaces is about 90°; the included angle may be varied from 90° by tilting the cutting face of the cutting tool with respect to the surface being cut.

The grooved plates are then offset from one another by half a groove width horizontally and possibly, but not necessarily, by the depth "d" of one groove vertically, so that the top edge of a groove in one plate coincides with the bottom edge of a ruled groove in the adjacent plate, thus creating two superimposed arrays of hexagonal cube corners. One array consists of female (concave) hexagonal cube corners, each comprised of the exposed planar surface of one plate plus the two surfaces of one groove of the next adjacent plate. The other array consists of male (convex) hexagonal cube corners, each comprised of the exposed planar surface of one plate plus two adjacent surfaces from adjacent grooves in that same plate. For greater accuracy in the eventual retroreflective article, the male cube corners are preferred, because they avoid any plate-to-plate angular errors.

Rectangular Microcubes

To produce a pattern of rectangular microcubes, in one embodiment, plates of a chosen thickness "t" are stacked alternately with slightly shorter spacers. The assembly of plates and spacers is tilted at a predetermined preferred angle, with one set of edges of the cuttable ends lying in a plane parallel to the bed of the ruling machine. The cuttable end of each plate is then bevel cut by means of a cutting tool so that the beveled face is perpendicular to the bed of the ruling machine. A series of grooves of desired included angle is then cut by the cutting tool in a direction substantially perpendicular to the beveled face. To create an electroforming master comprising rectangular microcubes, the spacers are removed and the plates are then stacked together with adjoining plates rotated 180° with respect to each other with the apices of the rectangular cube-corners all lying in the same plane perpendicular to the plane of the sides of the plates and with the apices of cubes in adjoining plates aligned parallel to the grooves.

Manufacture of Article

The stack of grooved plates (for hexagonal cubes) or grooved and beveled plates (for rectangular cubes) may then be used as a master for electroforming a mold insert or for initiating a mothering process to electroform a larger mold insert or an embossing belt, as shown in patent U.S. Pat. No. 4,478,769 for the manufacture of retroreflective articles and, in particular, retroreflective sheeting, but now having a pattern of hexagonal or rectangular microcubes. The use of hexagonal or rectangular microcubes instead of triangular microcubes advantageously increases the active aperture of the article as projected parallel to the principal refracted ray from 66% or less to essentially 100%.

GLOSSARY OF TERMS

For purposes of this application, Applicants are using certain terms in a particular sense, as defined herein, and other terms in accordance with industry accepted practice, such as current ASTM definitions. Note that many of these definitions distinguish between a cube and a cube shape, each of which is defined herein.

Adjacent—for microcubes, having a portion of an edge of the shape of one cube essentially coincident with a portion of an edge of the shape of another cube.

Angle of incidence—the angle between the illumination axis and the normal to the front surface of a retroreflector. See also "entrance angle."

Array active aperture—the sum of the active apertures of the individual microcube elements making up the array. (See also "percent active aperture")

Contiguous microcubes—microcubes, a non-dihedral face-edge of one of which is coincident with a non-dihedral face-edge of another microcube. Compare, "adjacent cubes." Note that non-contiguous microcubes may be adjacent. An array of contiguous microcubes is one in which the non-dihedral face edges of each microcube (except those at the perimeter of the array) are coincident with non-dihedral face edges of another microcube.

Cube (also "cube corner")—an element consisting of three nominally perpendicular faces, regardless of the size or shape of the faces; often referred to in industry and literature as "corner cubes", "trihedrals" or "tetrahedrons".

Cube area—the area enclosed by the cube shape.

Cube axis—a central axis that is the trisector of the internal space defined by the three intersecting faces of a microcube. In the art, sometimes called the "symmetry axis."

Cube axis cant—the angle between the cube axis and the principal refracted ray. The sign of the cant is negative for face-more-parallel and positive for edge-more-parallel. A cube is considered canted when the cube axis cant is not zero.

Cube diagonal—for certain cube corners, an imaginary line passing through the apex of the cube corner at an angle such that in a projection of the outline of the cube corner parallel to the cube diagonal, every line through the apex terminating on both ends at the cube shape will be bisected by the apex.

Cube perimeter—closed spatial curve comprising the non-dihedral edges of the faces of a cube. In instances where there is an uninterrupted surface shared by two or more microcubes, the dividing lines between microcubes shall be considered to be the shortest lines that can be drawn to complete the polygon (see e.g. FIG. 27B).

Cube shape—the two-dimensional geometrical figure defined by the projection of the cube perimeter in the direction of the principal refracted ray. Thus, a triangular cube has a cube shape that is a triangle, a hexagonal cube has a cube shape that is a hexagon, and so forth.

Cube symmetry plane—a plane that divides a cube corner into mirror images. Not all cube corners have a plane of symmetry.

Design ray—an imaginary line through the cube apex in a tool, which ray is coincident with the principal refracted ray in the article.

Dihedral face-edge—intersection of two faces of a single cube.

Entrance angle—the angle between the illumination axis and the optical axis (retroreflector axis). Note that distinction between entrance angle and angle of incidence. The angle of incidence is always measured between the incident ray and the normal to the surface (which may or may not be the retroreflector axis), whereas the entrance angle is measured between the incident ray and the retroreflector axis (which may or may not be the normal to the surface). Entrance angle is a measure only of the amount by which an incident ray is angled to the retroreflector axis, and is not concerned with the normal; angle of incidence is a measure only of the amount by which an incident ray is angled to the normal, and is not concerned with the retroreflector axis. For example, a pavement marker may be designed for the normal to the marker surface to be angled 60° to the optical axis; if light from an approaching vehicle is incident upon that marker along the retroreflector axis, the entrance angle is 0° and the angle of incidence is 60°, if light from an approaching vehicle is incident on the marker at a horizontal angle of 20° with respect to the retroreflector axis, the entrance angle is 20° and the angle of incidence is $61.98° = [\cos^{-1}(\cos 60)(\cos 20)]$.

"Face-more-parallel" and "edge-more-parallel" refer to the positioning of the cube relative to the principal refracted ray. When the angles between the cube faces and the principal refracted ray are not all equal to 35.26°, the cube is "face-more-parallel" or "edge-more-parallel" depending upon whether the face angle with respect to the principal refracted ray that is most different from 35.26° is respectively greater or less than 35.26°. In the case of sheeting or other retroreflectors for which the principal refracted ray is nominally perpendicular to the front surface of the retroreflector, then for face-more-parallel microcubes the selected cube face will also be more parallel to the reflector front surface than will any face of an uncanted microcube.

Horizontal entrance angle—for pavement markers, the angle in the horizontal plane between the direction of incident light and the retroreflector axis.

Incidence angle—see, "angle of incidence."

Microcube (also "microcube corner")—a cube corner having a maximum area of about 0.0016 square inches (1 $mm^2$).

Non-dihedral face-edge—edge of a microcube face that is not a dihedral face-edge, i.e., an edge that is a segment of the cube perimeter.

Optical axis—a designated line segment from the retroreflector center that is chosen centrally among the intended directions of illumination, such as the direction of the road on which or with respect to which the retroreflector is intended to be mounted.

Paired—oppositely oriented. Paired cubes, as used herein, refers to oppositely oriented adjacent cubes. Paired arrays, as used herein, refers to two arrays, the cubes in one array being oppositely oriented to the cubes of the other.

Percent active aperture—that portion of the projected area of an array that is retroreflectively functional for a particular selected direction of projection. (This definition assumes that the rear surfaces of the cube are 100% reflective. This definition is equivalent to that used in WO 95/11470, page 6, lines 23–25.)

Principal incident ray—a light ray parallel to the optical axis, chosen so that after refraction at the article's front surface, the ray passes through the apex of the cube corner.

Principal refracted ray—the continuation of the principal incident ray after refraction at the retroreflector front surface.

Retroreflectance—the product of percent active aperture times each cube face's reflectivity times the square of the transmission (to account for Fresnel transmission loss) of the front surface. (This term differs from "total light return" as defined in WO95/11467, page 17, lines 26 and 27, by inclusion in "retroreflectance" of the Fresnel loss of the front surface.) Photometrically, retroreflectance is the measure of the total retroreflection accumulated over all appropriately small observation angles and all rotation angles.

Retroreflector axis—same as "optical axis."

Rulable—capable of being generated by the repeated straight-line motion of a shaped tool along paths parallel to a common plane.

Zone of reflectorization—the range of entrance angles in a given entrance plane throughout which the retroreflector maintains a given minimum retroreflectance.

BRIEF DESCRIPTION OF THE DRAWINGS

FIG. 7A is a view of a portion of the front face of a cutting tool used to rule grooves in the plate ends in accordance with the instant invention, taken perpendicular to the face of the tool;

FIG. 7B is a view in the direction of the arrows 7B—7B of FIG. 7A and illustrates a side view of the cutting tool of FIG. 7A;

FIG. 8A is a view of a portion of the front face of the cutting tool as tilted for cutting a groove;

FIG. 8B is a side view of the cutting tool of FIG. 8A in the direction 8B—8B of FIG. 8A, showing the tilt, e, of the face of the tool and the direction of cutting;

FIG. 9 is a view of one complete groove as cut in a plate with included groove angle $C+\Delta C$ corresponding to the tilt, e, of the cutting tool;

FIG. 10 is a side view of stacked plates similar to FIG. 6, but in which "L" is greater than "t" and in which adjacent plates are offset by one groove depth d in the vertical direction and one-half groove width in the horizontal direction;

FIG. 10A is a view taken in the direction of the arrows 10A—10A in FIG. 10, which direction is along the diagonal of the cubes formed by the plates, which may also coincide with the principal refracted ray;

FIG. 10B is a view taken in the direction of the arrows 10B—10B in FIG. 10, which direction is perpendicular to the plane passing through the cube apices;

FIG. 10C is a view taken perpendicular to the faces of the plates, in which different shading has been added to emphasize the offset between adjacent plates;

FIG. 11 is a side view of a stack of plates about to be ruled with grooves but set at an angle to the cutting plane, the angle being greatly exaggerated for the purpose of illustration;

FIG. 11A is a side view of the stack of plates of FIG. 11 after ruling and after being offset with respect to adjacent plates by one groove depth in the vertical direction and one-half groove width in the horizontal direction;

FIG. 11B is a view taken perpendicular to the plane of the face of the plate (along the arrows 11B—11B in FIG. 11A) illustrating that the edges of the grooves are angled with respect to the perpendicular to the face of the plate (only portions of the plates being differently shaded for illustrative purposes);

FIG. 12 is a side view of a stack of plates with "L" equal to "t" as in FIG. 6, but stacked with adjacent plates offset 1.64 t vertically and 0.707 t horizontally;

FIG. 12A is a projection taken in the direction 12A—12A of FIG. 12, which direction is parallel to the cube diagonal;

FIG. 12B is a frontal view of the plates of FIG. 12;

FIGS. 14A and 14B are partial plan and side views respectively of a plate before machining rectangular cubes;

FIG. 15 is a schematic side view of a section of a stack of alternating plates and spacers tilted at angle X for machining a bevel face with a cutting tool;

FIGS. 16A and 16B are partial plan and side views respectively of the single plate of FIGS. 14A and 14B after machining of the bevel face;

FIG. 17 is a view similar to FIG. 15 of a section of a stack of alternating plates and spacers after machining the bevel faces, with the spaces between plates filled with plastic in preparation for machining grooves;

FIG. 18 is a view in the direction 18—18 on FIG. 17 of the stack of plates and spacers after partial machining of groove faces and showing a cutting tool moving toward the plane of the paper and machining the grooves (and the next groove to be cut in dashed lines);

FIG. 19 is a side view of the cross section of a single plate of FIG. 18 at arrows 19—19;

FIG. 20 is a plan view in the direction of arrows 20—20 in FIG. 19 of a single plate after machining of the bevel faces and groove faces and showing the rectangular outline of the microcube corners, a typical microcube being shown in the dashed circle in FIG. 20;

FIG. 21 is a plan view of a stack of three plates machined as in FIG. 20, assembled with adjacent plates oriented 180° to each other and ready for use as a master in electroforming, with a typical individual cube indicated by three dotted faces;

FIG. 22 is a partial side view of a double thickness plate used in an alternative inventive method of making rectangular microcubes, after cutting a bevel face perpendicular to the plane of the bed of the ruling machine, with the plates positioned at an angle (90°-X) to that plane;

FIG. 22A is a view of the cutting tool as positioned for cutting the bevel face of FIG. 22;

FIG. 22B is a view in the direction of arrows 22B—22B of FIG. 22 showing the first bevel face and a temporary face machined in the plate end by the cutting tool;

FIG. 22C shows the first bevel face and the temporary face in FIG. 22 filled in preparation for cutting grooves;

FIG. 23 shows the plate of FIG. 22 during cutting of groove faces in a direction substantially perpendicular to the direction of the first bevel cut by means of a second cutting tool;

FIG. 23A is a cross section through FIG. 23 at arrows 23A—23A, at the root of the cut for the groove faces;

FIG. 23B is a view of FIG. 23A in the direction of arrows 23B—23B after cutting of the groove faces to form a first row of rectangular cubes, one of which is indicated by the dotted faces in the dashed circle;

FIG. 24 is the side view of the plate of FIG. 23A repositioned for cutting a second bevel face for a second row of cubes by means of the first cutting tool, which, in effect, removes the temporary face (as shown by dashed lines);

FIG. 25 shows a front view of the plate of FIG. 24 after cutting the second bevel face for the second row of cubes and during machining of new groove faces substantially perpendicular to the second bevel face;

FIG. 25A is a cross section in the direction of the arrows 25A—25A at the root of the cut for the groove faces of the second row of cubes;

FIG. 25B is a plan view of a finished plate ready for use as an electroforming master, taken in the direction 25B—25B of FIG. 25A and showing the bevel faces and groove faces of the second row of cubes, one such cube of the second row being indicated in the dashed circle;

FIG. 26 is a plan view of two square microcubes;

FIG. 27 is a frontal view of a plate for forming the square microcubes of FIG. 26, taken in the direction of cutting of the groove faces, in which the groove roots define a plane parallel to but offset above the intersection of the bevel faces;

FIG. 27A is a cross-section view in the direction of arrows 27A—27A of FIG. 27 taken through a groove root;

FIG. 27B is a view in the direction of arrows 27B—27B of FIG. 27A, depicting a finished plate for use as an electroform master;

FIG. 27C is another partial side view of an article similar to FIG. 13, but depicting an array of rectangular microcubes made in a manner similar to that of FIGS. 27 through 27B, but in which H=2 W, axes are canted, and apices are decentered;

FIG. 35 illustrates in plan view an array of penta-face hexagonal cubes with the end of one plate highlighted;

FIG. 36 illustrates an array of pentagonal microcubes made pursuant to the plate technique of the present invention;

FIG. 36A illustrates two pentagonal microcubes with different cants;

Figure 1:
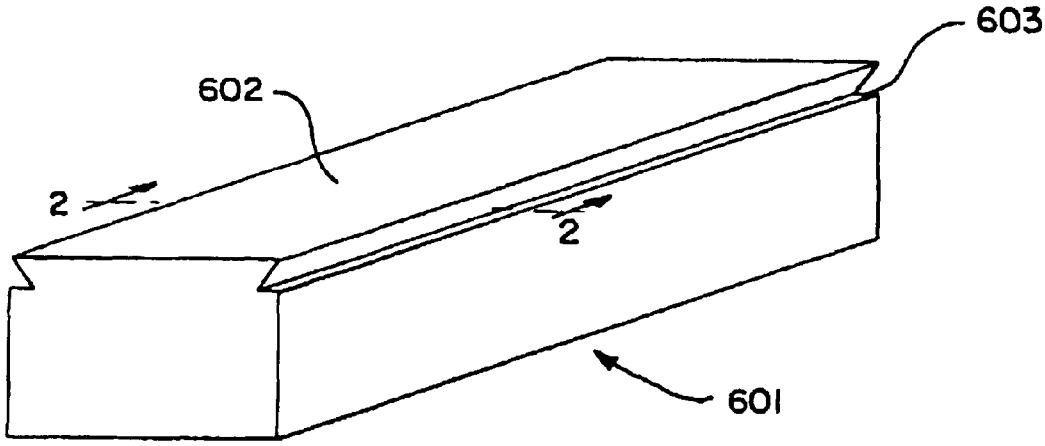
FIG. 1 is a perspective view of a steel block for forming electroless nickel plates used in the present invention.

These various figures, which are not to scale, are intended to be merely illustrative and not limiting. The various graphs are similarly not limiting but are for demonstrative and comparative purposes. Other graphs and examples will be apparent from the detailed descriptions which follow.

DETAILED DESCRIPTION OF THE INVENTION

The inventive method of making microcubes uses the principle of ruling the ends of certain plates in a particular fashion and then assembling these plates in a particular combination to form an array of microcubes. An "array" as used in this patent application shall mean a repeating pattern of geometrical elements, including microcubes. Those skilled in the art will recognize that a retroreflective article having desired performance characteristics could be made from a composite of different arrays. For example, such an article could include different arrays each made by one or more techniques of the instant invention, or such an article could include a combination of arrays of the instant invention and arrays made by prior art machining methods. Means for combining different arrays in a single article are known to those skilled in the art, and retroreflective articles having a plurality of arrays, one or more of which is made in accordance with the instant invention, are considered to be within the scope of the instant application. In every instance where different arrays are combined, it shall be understood that the specification and claims are relevant to that array, or that portion of the array, that is made by the technique of the instant invention.

The various examples discussed hereinafter demonstrate the advances in this technology in their simplest form and also disclose specific embodiments in which improved retroreflector performance can be achieved in microcubes using the same optical principles as have been employed in macrocubes.

All embodiments of the invention require the use of plates, which differ somewhat for different types of microcubes. The plates are of micro-sized thickness, on the order of about 0.004–0.040 inches (0.1–1.00 mm). There are four basic types of plates. Plates 10, suitable for the tooling of hexagonal microcubes with rectangular cube faces, have flat and parallel faces and, uniquely, one face of the plate becomes a face of the microcube, and therefore, must have a polished surface. Plates 110 and 210, suitable for tooling rectangular and triangular microcubes, have flat and parallel faces and in a preferred form, neither face of the plate becomes a face of the microcube. Plates 710 and 810, suitable for tooling the pentagonal microcubes of FIG. 36, have one flat face and one grooved face, neither of which becomes a face of the microcube. Plates suitable for tooling the hexagonal microcubes with pentagonal faces of FIG. 35, or for cutting two rows of pentagonal microcubes on one plate, are grooved on both sides, the groove spacing and groove angles being not necessarily the same for both sides.

Method of Making Plates

The plates must be of a material that cuts cleanly when ruled, such as with a diamond cutting tool as is known in the art. Electroless nickel is a particularly suitable material for the rulable plates used in the method of the instant invention.

Although the above-described plates may differ, the method of their manufacture can be generally illustrated by the method of making plates 10 used in the manufacture of hexagonal microcubes. For purposes of illustration, plate 10 can have dimensions of about 1.0"×4.0" and a thickness "t" of about 0.010".

Figure 2A:
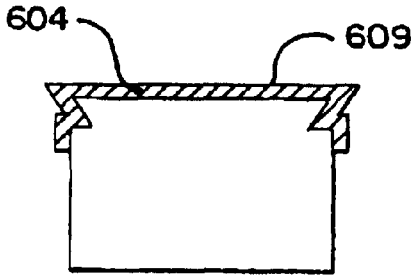
FIG. 2A is a cross section of the block of FIG. 1 in the direction of the arrows 2—2 after deposition of an electroless nickel layer on the top surface of the block.

Referring to FIG. 1, a stainless steel block 601 is provided having a flat top surface 602 of about 1.01"×4.0". Block 601 may be of grade 440C stainless. Grind and polish the surface 602 of block 601. Machine an undercut 603 on the two 0.75" by 4.0" side surfaces tapering from zero at the polished face 602 to 0.005" deep at 0.250" down from the polished face 602. Passivate the block 601 by immersion for 10 seconds in 30% nitric acid, for example, and deposit electroless nickel 604, FIG. 2A, on the polished top surface 602 of the stainless block to the thickness desired plus approximately 0.002", in this example to a total thickness above the block of 0.012" and also approximately 0.25" down the sides of the block.

Figure 2B:
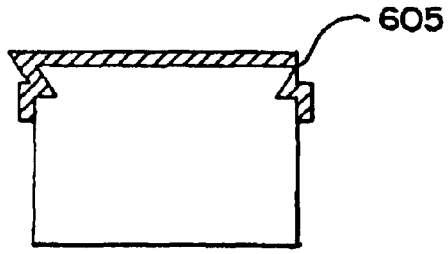
FIG. 2B is a cross section of the block of FIG. 1 and the electroless nickel deposit after machining one of the upper edges.

Machine the 1.0" by 4.0" surface 609 of the electroless nickel 604 with a diamond tool to the desired thickness, in this example to 0.010". Machine the sides of the block with diamond to cut away electroless nickel at 605 (FIG. 2B) to the stainless at the top of the undercut, freeing the 0.010" thick electroless nickel plate 606 FIG. 2C to be separated from the stainless block. Clean out the undercuts in the block by picking out the loose wedge 607 FIG. 2C of electroless nickel in the undercut. Repeat the process to make as many plates 606 as may be required. In the steps that follow, the plates 606 will be identified as 10, 110 or 210 in the tooling of hexagonal, single rectangular or double rectangular microcubes, respectively.

Figure 2C:
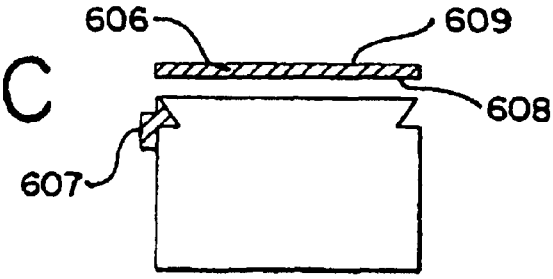
FIG. 2C is a cross section of the block with the electroless nickel plate separated and with electroless nickel residue remaining in one of the block undercuts.

In the tooling of hexagonal microcubes, a portion of the surface 608 FIG. 2C of the electroless nickel plate 606 that was against the polished surface of the stainless block will become one face of the cube corner. Alternatively, the approximately 1.0" by 4.0" surface 609 of the electroless nickel can be provided with an optical finish during the step of machining the plate to size with a diamond tool, in which instance, it will be unnecessary to polish the face of the stainless steel block. For the tooling of rectangular microcubes, it will be unnecessary to polish the face of the stainless steel block before electroforming because neither face of the plate becomes a face of a microcube.

Method of Making Hexagonal Microcubes

Figure 3:
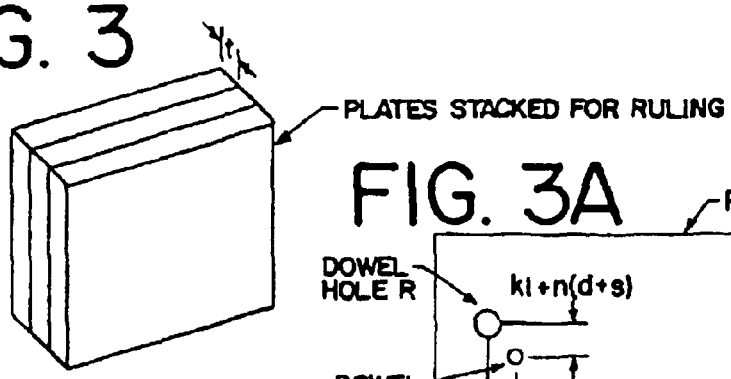
FIG. 3 is a perspective view of a stack of electroless nickel plates before being ruled.
Figure 4:
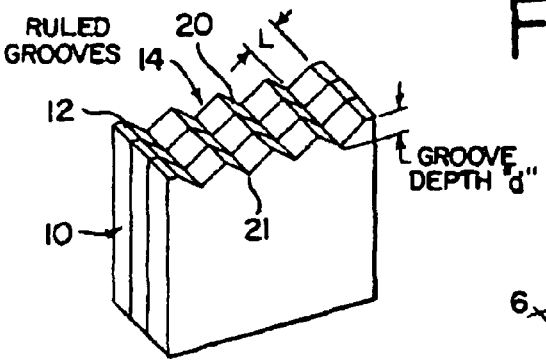
FIG. 4 is a perspective view of the same stack of plates after being ruled with grooves.

As shown in FIG. 3, the plates 10 are preferably flat and each has at least one flat end 12 that is cuttable, such as by a diamond cutting tool. The plates 10 are stacked together so that at least one set of ends 12 lies within a plane. It will be understood that the three plates shown in FIG. 3 are for clarity of the illustration, and that more than three plates can be included in a single stack. A series of V-grooves 14 are ruled into the set of ends 12. FIG. 4 shows the same stack of plates 10 but with the V-grooves 14 ruled into the straight ends 12. The grooves 14 are preferably substantially parallel to one another and substantially perpendicular to the front face of the stack of plates 10. The V-shaped grooves have an included angle of substantially 90°, with each groove being defined by two top edges or crests 20 and a bottom edge or root 21. For optimum efficiency, the grooves 14 are spaced from one another so that they are separated only by the top edges 20 of adjoining grooves; i.e., there are no substantial flat surfaces between the grooves 14.

FIGS. 7A and 7B are front and side views, respectively, of a portion of the cutting tool for ruling grooves, in which C is the angle between cutting edges viewed perpendicular to the front face of the tool. The angle C may be chosen to be smaller than the desired included groove angle, C+ΔC in FIG. 9, in order that fine adjustment of that groove angle may be made by tilting the tool by a relatively coarse amount "e" in FIG. 8B, where "e" is the angle at which the face of the cutting tool is tilted from a perpendicular to the direction of the cut such that $$e=\cos^{-1}[(\tan 0.5C)/\tan 0.5(C+\Delta C)] \qquad \text{Equation A}$$

FIG. 8A is a view of a portion of the front face of the cutting tool tilted by the amount "e" of FIG. 8B, in which C+ΔC is the angle between cutting edges viewed parallel to the direction of cutting. FIG. 9 shows the changed angle C+ΔC in the cut groove.

Figure 5:
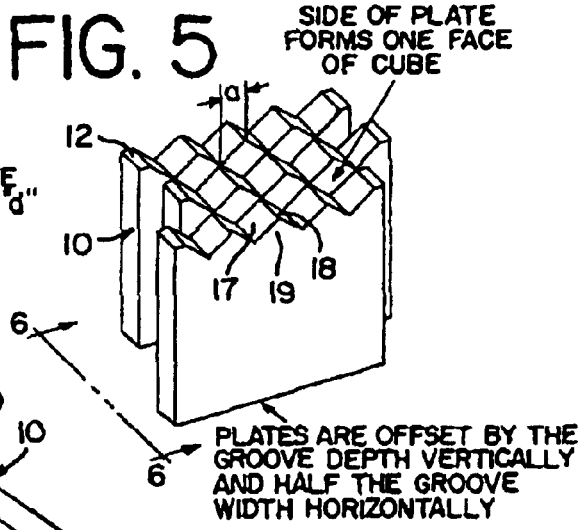
FIG. 5 is a perspective view of the plates of FIG. 4 with adjacent plates offset by one groove depth in the vertical direction and one half groove width in the horizontal direction.

In order to define a pattern of hexagonal retroreflective microcubes the grooved plates 10 may be offset one from another as shown in FIG. 5. Adjacent plates are offset from one another in the horizontal direction by a distance "a", which as shown in FIG. 5 is equal to one half the width of a groove. Adjacent plates are also offset from one another in the vertical direction by a distance "d", which as shown in FIG. 4 is equal to the depth of one groove. The manner in which the plates are offset from one another is also shown in FIG. 6B, wherein alternating plates are shaded differently for clarity. It will be understood that, throughout this specification, "vertical" shall designate a direction perpendicular to the plane of the roots of the grooves of a single plate, and "horizontal" shall designate a direction perpendicular to the vertical and in the plane of the plate.

With the plates offset in this manner, "male" microcubes are defined by the inclined walls of adjacent grooves which meet at a top edge 20 to form two faces 17 and 18 of the microcube, and the front surface of the same plate which forms the third face 19 of the microcube. It can be seen in FIG. 6A that all three faces 17, 18 and 19 of a single male cube (shown by dots) are formed on a single plate 10. Female microcubes may be formed by the two faces of a groove in one plate and the front surface of an adjacent plate. An advantage of the male microcube is that the accuracy of the angles between the faces of each microcube is dependent solely on the accuracy of the groove ruling operation, and not on the accuracy with which the plates are stacked and assembled in forming the "master". The "master" of stacked and assembled plates may then be subjected to an electroforming procedure to make tools, as will be discussed in greater detail below.

Figure 6A:
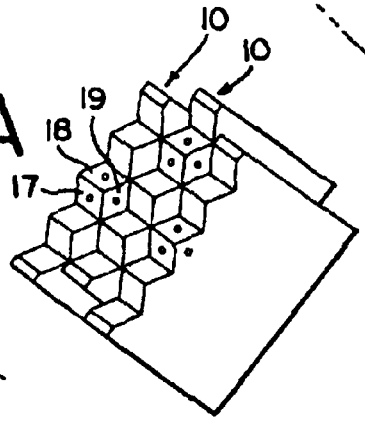
FIG. 6A is a view in the direction of the arrows 6A—6A of FIG. 6.

The hexagonal outline of the cube corners produced by the method described above, and the quadrilateral outline of the cube faces, are both readily apparent in FIGS. 5 and 6A. In particular, it is evident in FIGS. 5 and 6A that the hexagonal cube corners are not defined by continuous straight lines which extend along the entire surface of the ruled master, as in the case with triangular cube corners, shown for example in FIG. 1A of the aforementioned patent U.S. Pat. No. 4,478,769. Therefore, it is apparent that a tool comprising only hexagonal microcube corners cannot be machined by ruling three sets of parallel grooves as described in the '769 patent.

Figure 6:
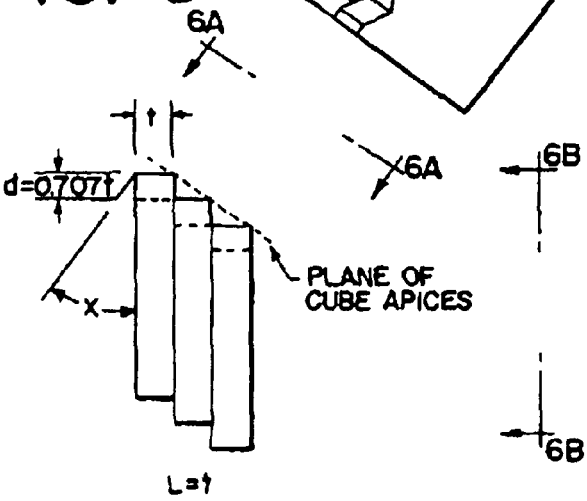
FIG. 6 is a side view of the stack of plates of FIG. 5 in the direction of the arrows 6—6 and in which "L" (as shown in FIG. 4) equals "t"
Figure 6B:
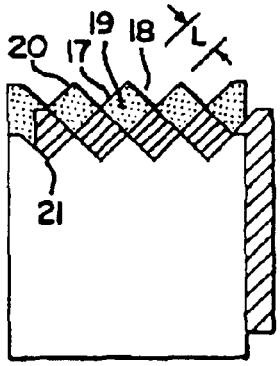
FIG. 6B is a view in the direction of the arrows 6B—6B of FIG. 6, with different shading added to emphasize the offset between adjacent plates.

In the embodiment of FIGS. 5 and 6, the length of the sides of the groove ("L" in FIGS. 4 and 6B) and the thickness of the plate ("t" in FIGS. 3 and 6) are equal and the direction of the ruling is perpendicular to the face of the plate 10. For this embodiment, the cube axis is perpendicular to the plane of the cube apices and the angle X in FIG. 6 is nominally 35.26°.

While in the foregoing example all the cube dihedral angles are equal and all the cube faces are identical, it is recognized in the art of cube corner retroreflectors that for some applications it may be desirable to alter various optical properties of the retroreflective article by making predetermined modifications to the cube angles and the relative sizes and shapes of the respective cube faces. Those modifications can be achieved using the methods of the instant invention. Thus, for example, the thickness of the plate "t" need not necessarily be equal to the length of the side of the groove "L", the crest of one groove need not be coincident with the root of a groove in an adjacent plate, and the direction of ruling is not necessarily perpendicular to the face of the plate 10.

Figure 45:
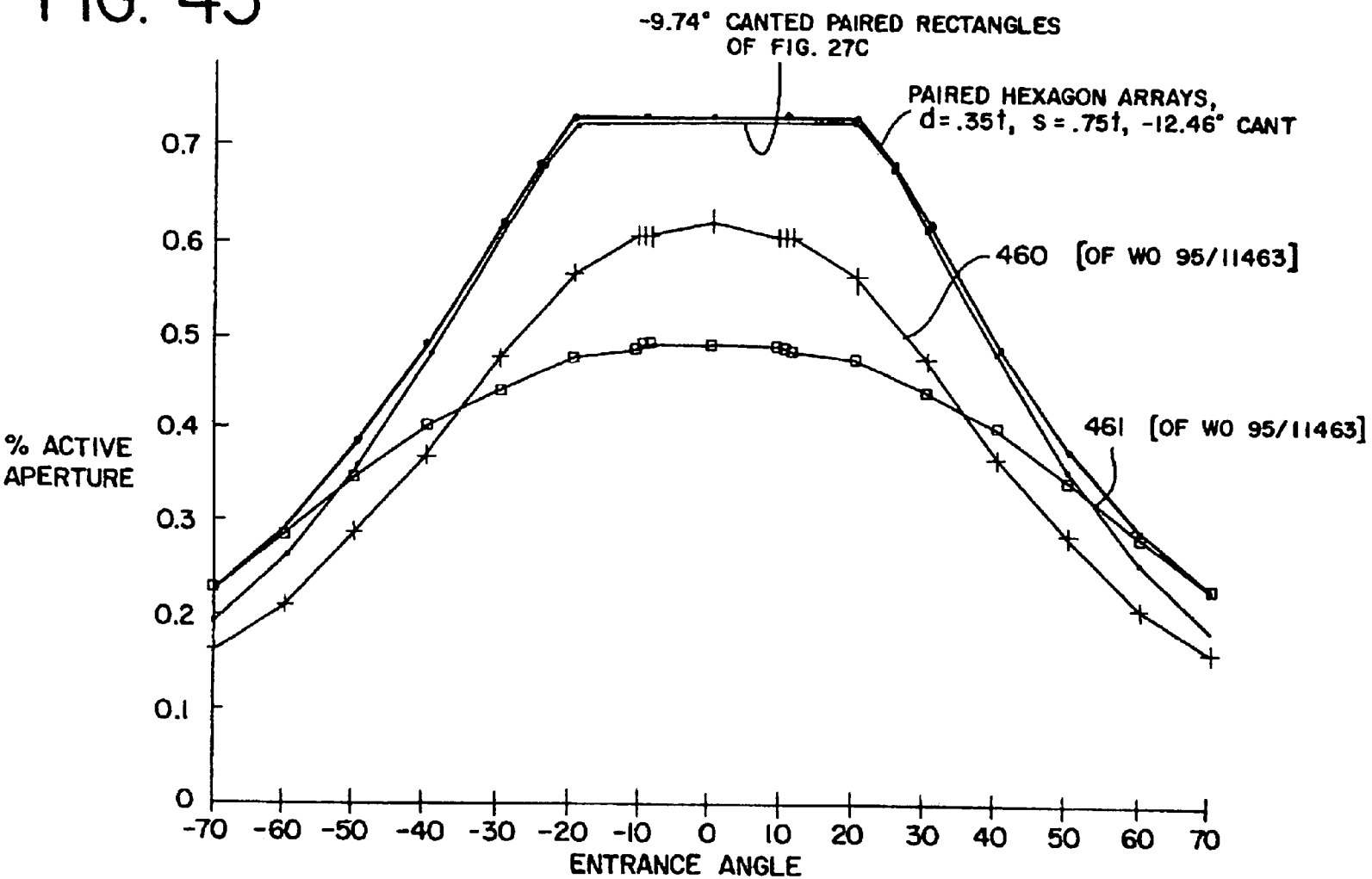
FIG. 45 is a graph showing percent active aperture versus entrance angles from −70° through 70° for paired canted rectangular microcubes and paired arrays of canted hexagonal microcubes, compared with FIG. 32 of prior publication WO 95/11463.

The inventive method as described allows the cube designer to control certain retroreflective properties of the resulting array of microcubes. For example, various angles of the principal incident ray can be accommodated by varying the depth of the groove relative to the thickness of the plates (FIG. 10), and/or by tilting the bisector of the groove so that the lengths of the two sides of a single groove are not the same (not illustrated) and/or by changing the offset of adjacent plates (FIG. 12). In another embodiment, the entrance angularity can be increased either in a plane perpendicular to the cube symmetry plane by canting the cube axis to face-more-parallel (FIGS. 41 and 43) or in a plane parallel to the cube symmetry plane by using oppositely oriented pairs with either face-more-parallel or edge-more-parallel cant (FIG. 42), or in multiple planes parallel to and perpendicular to the symmetry plane by combining oppositely oriented pairs with face-more-parallel cant (FIGS. 43 and 45). In yet another embodiment, the divergence of the retroreflected beam (i.e., the observation angularity) can be increased in one plane or in multiple planes by making the groove angle slightly greater or less than 90° and/or by making the path of the cutting tool slightly angled to the normal to the face of the plates, as illustrated by greatly exaggerated angle "b" in FIG. 11, where "b" equals the small angle between the cutting path and the normal to the front surface of the plate. In FIG. 11, angle "b" lies in a vertical plane, but it could, by other shifts of the plates, lie in any plane that includes the cutting path and the normal to the face of the plates. FIG. 11A shows the adjacent plates of FIG. 11 offset so that the crest of a groove in one plate is aligned with the root of a groove in an adjacent plate. The manner in which the plates are offset from one another is shown in FIG. 11B, wherein alternating plates are shaded differently for clarity; FIG. 11B also shows that, because of the exaggerated cutting angle, faces 17 and 18 are visible even though the view is perpendicular to face 19.

Those skilled in the art will recognize that the above variations of the inventive method allowing for control of incidence angularity, entrance angularity, and observation angularity, are not necessarily mutually exclusive, and can be combined by one skilled in the art to produce an array having a desired combination of retroreflector performance characteristics.

Three constructional parameters determine the geometry and thus the entrance angularity of a regular assembly of identical grooved plates that produces an array of hexagon cube corners: plate thickness t; groove depth d; and plate slip s. (See FIGS. 12C and 12D.) Slip is the distance between the crests of one grooved plate and the roots of the next adjacent plate. For the assembly of FIG. 6, the slip s=0; for the assembly of FIG. 12, the slip s does not equal 0. The entrance plane is assumed to be parallel to a symmetry plane of the cube corners.

Light incident on the front surface of an article at incidence angle I will be retroreflected with 100% geometric efficiency (i.e., percent active aperture equals 100%) if and only if the following relation holds:

$$\text{Equation E: } 90° - I' = \tan^{-1}\left[\frac{t}{d+s}\right] + \tan^{-1}\left[\frac{t}{2d+s}\right]$$

Figure 12C:
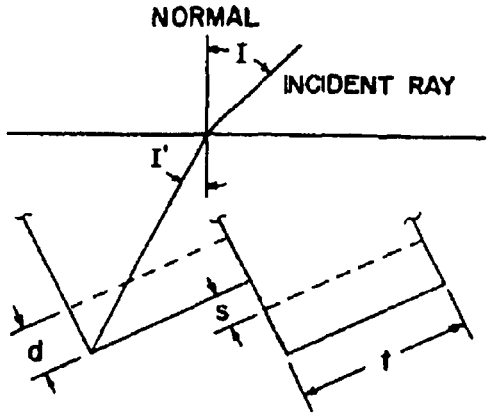
FIGS. 12C and 12D illustrate the interrelationship of various cube parameters for different incident rays.
Figure 12D:
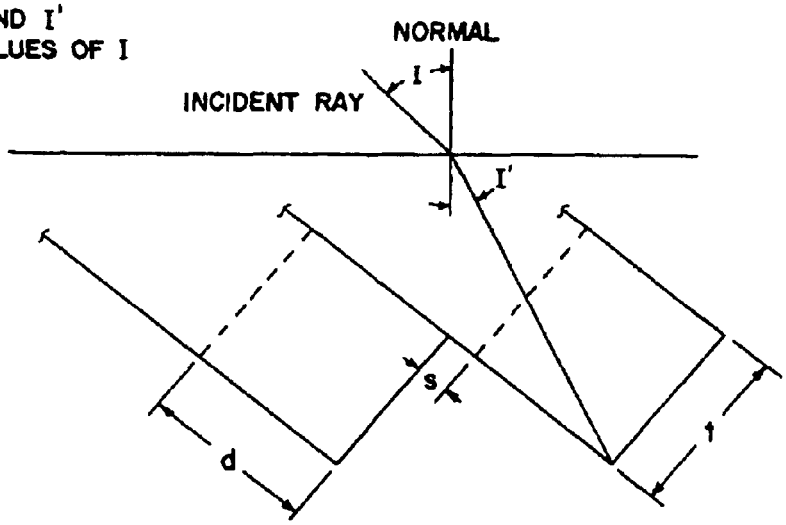

I' is the incidence angle after refraction by the article's front surface. $I'=\sin^{-1}(\sin I/n)$, where n is the refractive index of the material. I'=I for hollow retroreflectors. I and I' are either negative or positive; negative and positive values of I and I' are illustrated in FIGS. 12C and 12D, respectively. Because cube size is being ignored in the following discussion, the dimensions d and s have been relativised to t.

For every value of I, from −90° to +90°, there are solutions to Equation E for t, d, and s. For small values of slip s/t, Equation E ensures a unique ratio of groove depth to plate thickness, the quantity d/t, for each incidence angle. For example, Table B shows solutions when there is no slip, i.e., s/t=0, and when the refractive index is 1.49.

TABLE B

Tailoring of Plates to Incidence Angles, Assuming s/t = 0, n = 1.49

| External Incidence Angle I | d/t Ratio of Depth to Thickness |
|---|---|
| −90° | 0.301 |
| −80° | 0.307 |
| −60° | 0.351 |
| −40° | 0.434 |
| −20° | 0.552 |
| 0° | 0.707 |
| 20° | 0.906 |
| 40° | 1.151 |
| 60° | 1.423 |
| 80° | 1.628 |
| 90° | 1.659 |

For large values of slip s/t, there are solutions to Equation E only for the larger values of I. For example, Table C shows examples when s/t=0.75, and when the refractive index is 1.49.

TABLE C

Tailoring of Plates to Incidence Angles, Assuming s/t = .75, n = 1.49

| External Incidence Angle I | d/t Ratio of Depth to Thickness |
|---|---|
| less than −40° | impossible |
| −40° | impossible |
| −20° | 0.028 |
| 0° | 0.169 |
| 20° | 0.352 |
| 40° | 0.583 |
| 60° | 0.842 |
| 80° | 1.041 |
| 90° | 1.071 |

If the ratio d/t is fixed, such as would be the case for a set of fabricated plates, then there will be a range of incidence angles for which it is possible to solve equation E with positive values of s/t. For example, Table D was developed for d/t=0.707 and refractive index 1.49.

TABLE D

Slip for Utilization of Plates with d/t = .707, n = 1.49

| External Incidence Angle I | s/t Ratio of Slip to Thickness |
|---|---|
| less than 0° | impossible |
| 0° | 0 |
| 20° | .262 |

TABLE D-continued

| Slip for Utilization of Plates with d/t = .707, n = 1.49 | |
|---|---|
| External Incidence Angle I | s/t Ratio of Slip to Thickness |
| 40° | .581 |
| 60° | .932 |
| 80° | 1.199 |
| 90° | 1.239 |

The solution with d/t=0.707 and s/t=0 appearing both in Tables B and D corresponds to the embodiment previously discussed, for which L equals t and adjacent plates are offset in the vertical direction by the groove depth d as in FIG. 6, so that the crest of a groove in one plate is aligned with the root of a groove in an adjacent plate and there is no slip.

The solution with d/t=1.423 and s/t=0 appearing in Table B corresponds to the embodiment of FIG. 10 where L has been increased to approximately twice the thickness of the plate. FIG. 10A shows the projection of the array of FIG. 10 parallel to the cube diagonal (approximately 35.54° to the normal to the plane of the cube apices corresponding to incidence angle I of 60°). Viewed at 35.54° to the normal, as in FIG. 10A, the effective aperture of the microcubes of FIG. 10 is 100%. FIG. 10B shows a projection of the microcubes of FIG. 10 perpendicular to the plane of the cube apices and illustrates that the effective aperture at this angle is low. FIG. 10C shows a projection perpendicular to the sides of the plates wherein alternating plates are shaded differently for clarity.

The solution with d/t=0.707 and s/t=0.932 appearing in Table D corresponds to the embodiment illustrated in FIG. 12, for which the active aperture is 100% at the 60° incidence angle as in FIG. 12A. FIG. 12B is a projection of FIG. 12 perpendicular to the sides of the plates, wherein alternating plates have been differently shaded for clarity.

The solution with d/t=0.352 and s/t=0.75 appearing in Table C corresponds closely to the embodiment whose performance is shown in the uppermost curve of FIG. 45. Table C shows that this cube is 100% effective at an incidence angle I of 20°. If these cubes are in paired arrays, as they were for the example of FIG. 45, then when one cube array receives light at I=20° the other array receives it at I=−20°, for which incidence angle the cube array has low effective aperture. The rising and falling efficiencies of the two cube arrays add to produce the performance curve of FIG. 45 which is flat for entrance angle values from −20° to 20°.

Figure 38:
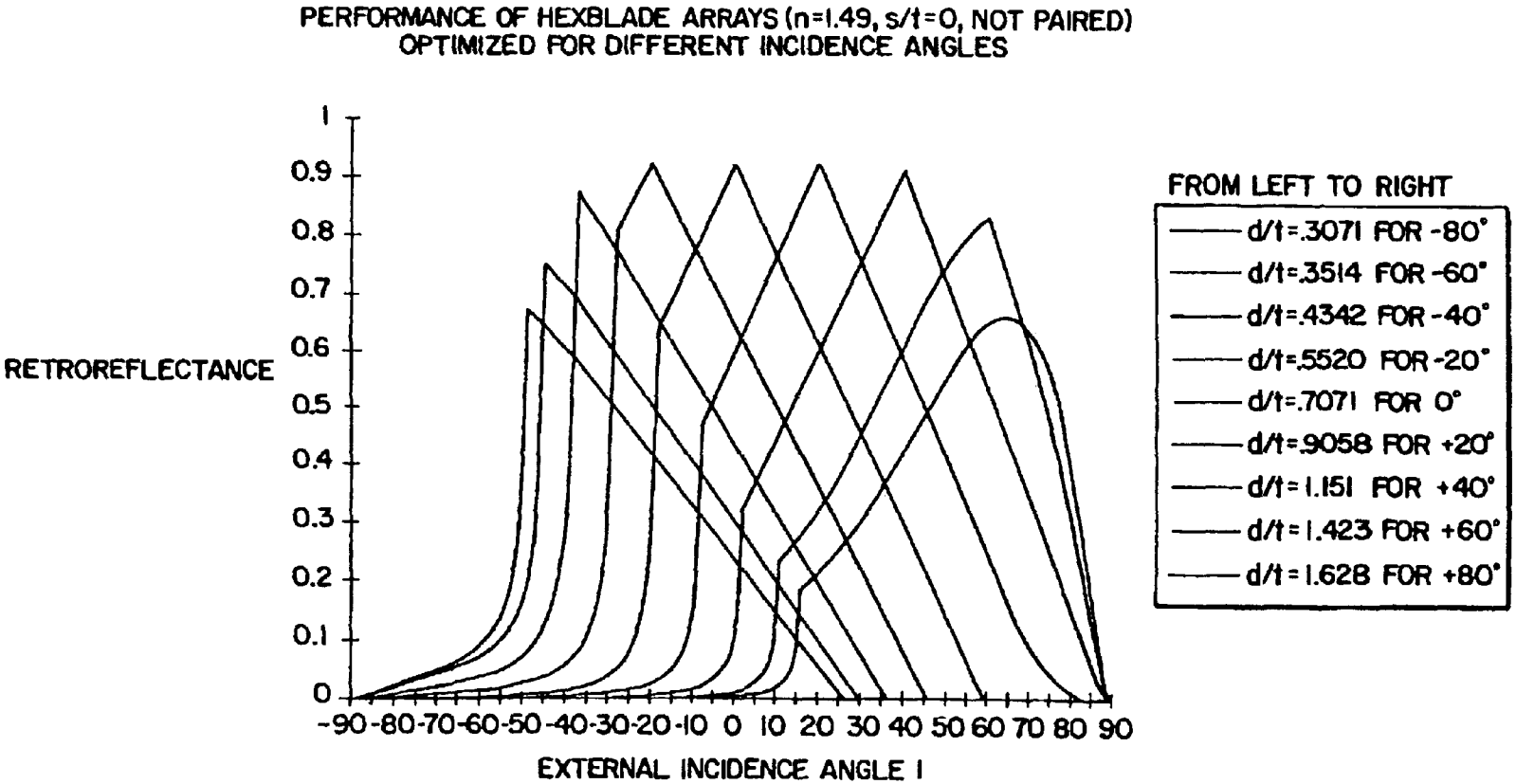
FIG. 38 is a graph of a family of curves of retroreflectance versus incidence angle I from −90° to +90°, for arrays of unpaired hexagonal microcubes having refractive index= 1.49 where d/t is varied and s/t=0.
Figure 39:
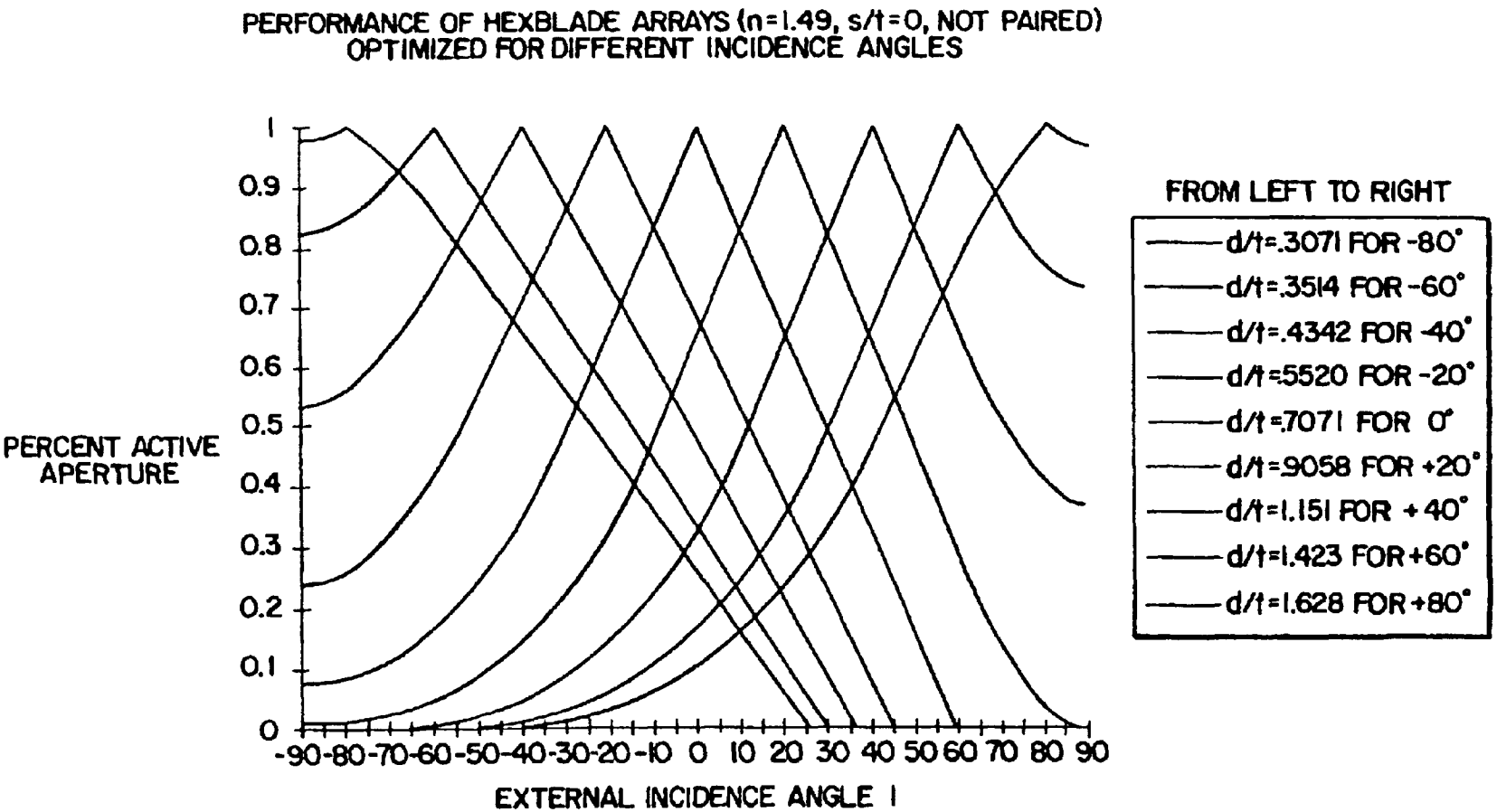
FIG. 39 is a graph of a family of curves of percent active aperture (instead of retroreflectance) versus incidence angle I from −90° to +90° for the same microcubes used for FIG. 38.

When d/t and s/t solve Equation E for a certain value of I' the hexagon cube achieves 100% active aperture for just that one internal incidence angle. Depending on the refractive index this corresponds to one external incidence angle I. The percent active aperture, and more generally the retroreflectance, of this hexagon cube for all other incidence angles requires additional calculation. Graphs of retroreflectance and percent active aperture versus incidence angle from −90° to +90° are shown in FIGS. 38 and 39, respectively, for nine different unpaired hexagonal microcube arrays. Each of the microcubes has n=1.49, s/t=0 and d/t chosen, in accordance with Equation E, to make 100% active aperture at one incidence angle between −80° to +80°, in 20° increments.

Figure 37:
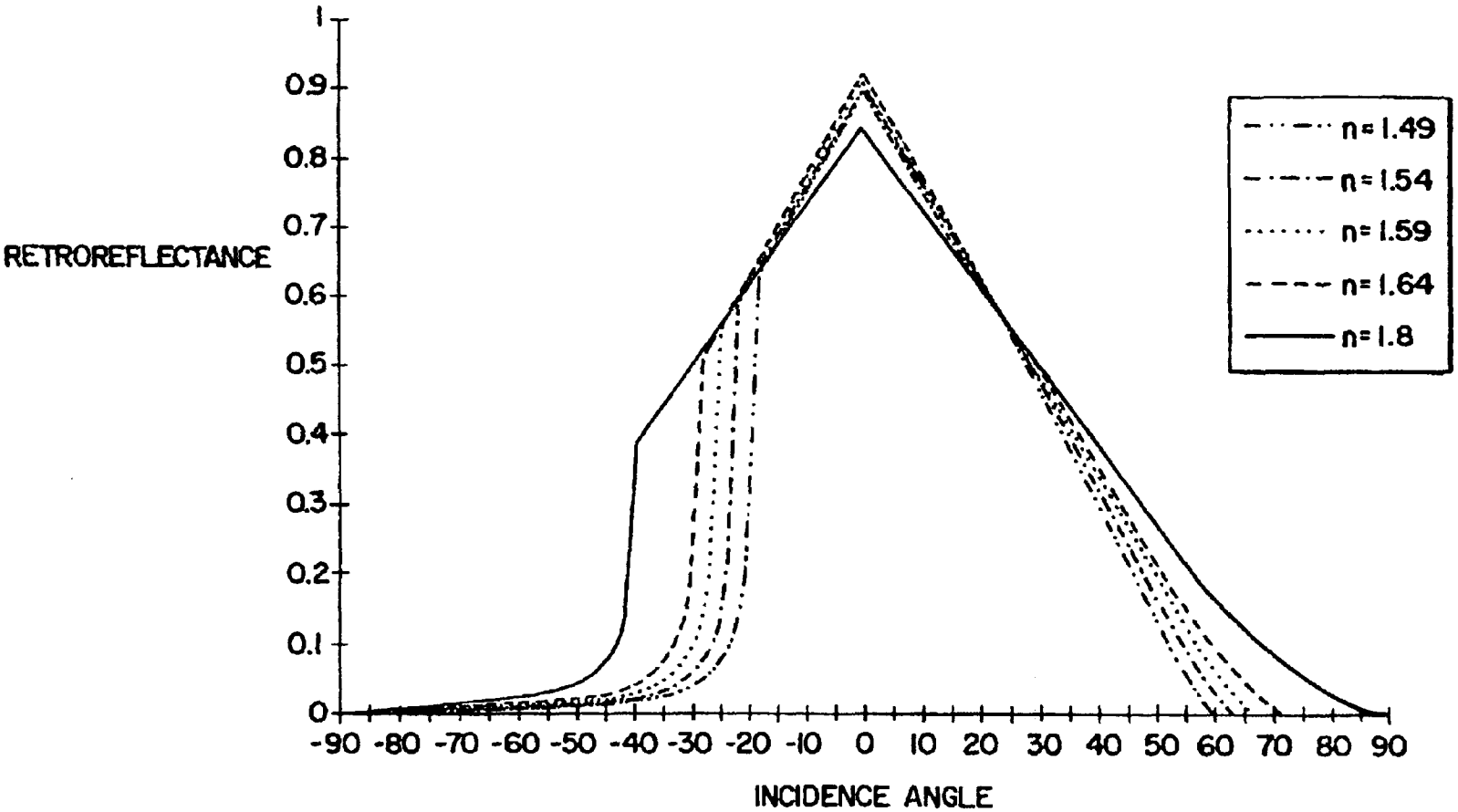
FIG. 37 is a graph of a family of curves comparing retroreflectance of microcubes of various refractive indices versus incidence angle from −90° to +90°, for an array of hexagonal microcubes where d/t=0.7071, s/t=0, of the type depicted in FIGS. 6 through 6B.

Graphs of retroreflectance versus incidence angle from −90° to +90° are shown in FIG. 37 for an unpaired hexagonal microcube array with d/t=0.707 and s/t=0 and for five different refractive indices. FIG. 37 illustrates, as is well known in the industry, that any analysis of retroreflectance must include the refractive index of the materials used.

When slip is non-zero the cube corners are no longer, strictly speaking, hexagons. In instances where there is an uninterrupted face shared by two or more adjacent cube elements, the dividing lines between elements shall be considered to be the shortest imaginary lines (15 in FIG. 12A) that can be drawn to complete the polygon. The shared or continuous face becomes optically advantageous at certain orientation and entrance angles where a ray that first reflects off the continuous face within one hexagon makes its next two reflections, achieving retroreflection, in a neighboring hexagon.

Slip is a useful parameter for the optical designer. For example, while the solutions in Tables C and D assure 100% geometric efficiency at the chosen incidence angles, they entail different shapes of hexagonal cubes, with different volumes, different diffraction apertures, different spot "weights", and a different cube axis cant.

Cube axis cant, measured with respect to the front face of the array, depends simply on (s+d)/t according to this equation:

$$\text{Equation F: cant} = -90° + \tan^{-1}\left[\frac{1}{\sqrt{2}}\right] + \tan^{-1}\left[\frac{t}{d+s}\right]$$

It follows from equation E that for an array of hexagonal cubes assembled from grooved plates to have 100% active aperture at 0° incidence angle, d, s and t must satisfy the equation:

$$(2d+s)\,(d+s)=t^2 \qquad \text{Equation G}$$

From this it follows that:

$$\text{Relation H: } \frac{1}{\sqrt{2}} \le \frac{d+s}{t} \le 1$$

This corresponds, according to Equation F, to a range of cants from 0° to −9.74°. While all cants are obtainable with grooved plate constructions, only those in the range from 0° to −9.74° can be chosen also to have 100% active aperture at 0° incidence angle.

To further increase entrance angularity, however, the designer may choose to accept less than 100% efficiency at 0° incidence angle. As illustrated by the series of retroreflectance graphs in FIGS. 42a through e, useful performance, including that at 0° entrance angle, can be obtained from grooved plates having (d+s)/t varying from 0.5 up to 1.2, i.e., far beyond the bounds of Relation H.

Figure 42A:
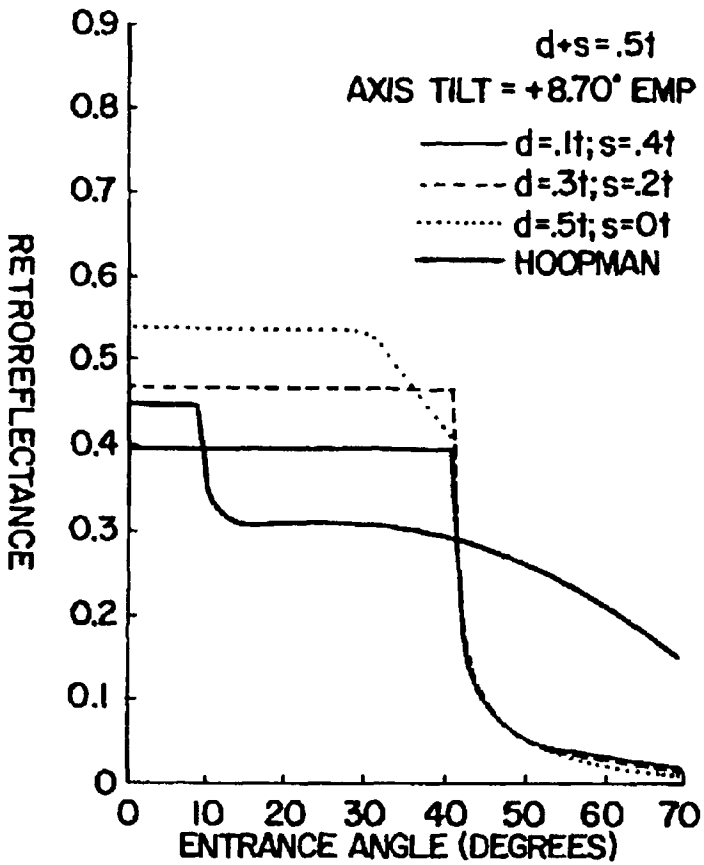
FIGS. 42A through 42E depict a family of three curves of retroreflectance versus entrance angle from 0° to 70° for paired arrays of hexagonal microcubes of refractive index= 1.59 for each of five cube axis cants compared with the retroreflectance of a triangular microcube retroreflective article of Hoopman U.S. Pat. No. 4,588,258.
Figure 42B:
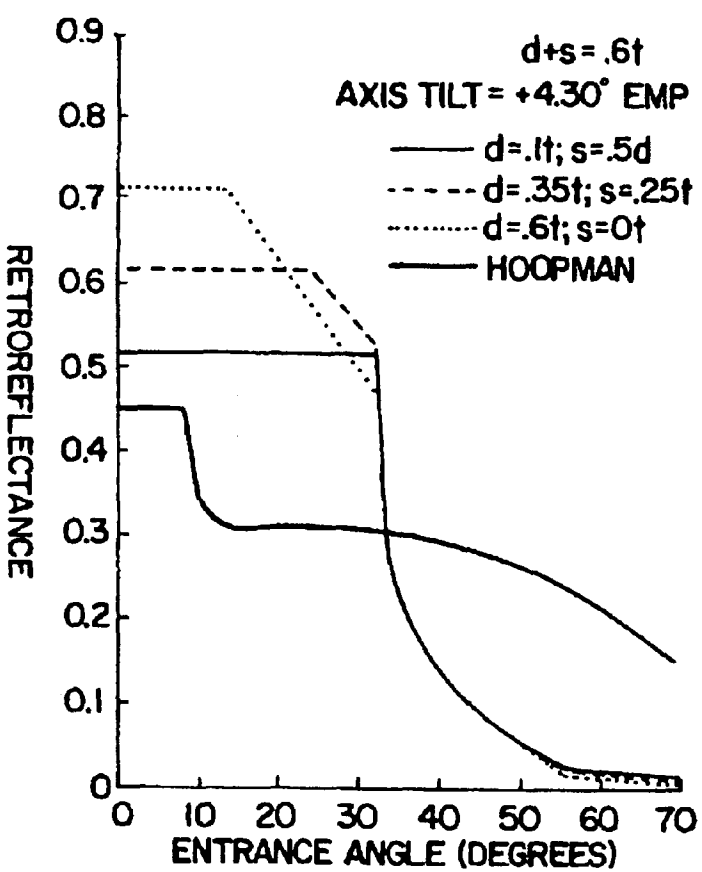

Each of the five families of curves in FIGS. 42a through e represents a different value of d+s and a resultant axis cant; for example, in FIG. 42a, d+s for all three curves is equal to 0.5 t and the resulting cant is +8.70° emp, where "emp" means edge-more-parallel. Each of the three curves within each family represents different values of d and s, the sum of which is 0.5 t in the 42a family; for one of the three curves within each family, s is chosen equal to 0 (as exemplified by the d/t=0.5, s/t=0 curve in FIG. 42a), and for another of the three curves within each family, d is chosen equal to 0.1 t (as exemplified by the d/t=0.1, s/t=0.4 curve in 42a). For comparison purposes, the curve of retroreflectance versus entrance angle for the Hoopman triangle discussed in PCT WO95/11463 is the heavier solid line in each figure. The hexagonal microcube can be designed to provide 40% to 100% greater retroreflectance than Hoopman through 34° entrance angle as exemplified in FIG. 42b, or to provide a constant retroreflectance through 40° that exceeds Hoopman by more than 50% from 10° to 40°, as shown by the d/t=0.3, s/t=0.2 curve of FIG. 42e, or exceeds Hoopman from 10° to 70° as in the d/t=0.1 s/t=1.1 curve of FIG. 42e.

Note in FIG. 42 that even for an active aperture of 100% the retroreflectance never exceeds 0.9 for polycarbonate articles because of Fresnel losses at the front surface that are included in the calculation of retroreflectance.

Method of Making Rectangular Microcubes

The method of making a tool with rectangular microcubes in accordance with the instant invention begins with a stack of plates 110 (shown in partial top plan view in FIG. 14A), the thickness t of the plate 110 being equal to the desired dimension H (FIG. 26) of the rectangle. The plates 110 are preferably flat and each has at least one flat end 112, shown in side view in FIG. 14B that is cuttable, such as by a diamond cutting tool.

Each plate 110 or a stack of plates 115 is positioned on a ruling machine with the cuttable end 112 up and with the front faces 124 of the plates angled by a desired amount X, for example 35.26°, with respect to a perpendicular to the cutting plane of the ruling machine, FIG. 15. If a stack of plates is used, the upper edges 125 of the ends 112 all lie within a single plane and, to provide clearance for the cutting tool between the plates to be machined, spacers of cuttable material or spacers 111 retracted from the plane of the edges 125 are provided between plates, FIG. 15, so that the cutting tool does not contact any material that might damage it. The cutting edge 119A of the cutting tool 119 as projected parallel to the direction of cutting, is positioned perpendicular to the plane of the machine bed, and the lower edge of the cuttable end 112 is cut away along the length of a plate 110 until the cutting tool reaches the midpoint of end 112, or beyond, creating bevel face 113, FIG. 15. FIGS. 16A and B show plan and side views, respectively, of a plate 110 after cutting the bevel face 113. This step is repeated for each plate 110 in the stack 115.

To prevent the formation of burrs, after the bevel faces 113 have been cut, the spaces between plates may be filled with a plastic compound 114, FIG. 17, that will not deteriorate the cutting tool. Grooves with a desired included angle Y, for example 90°, are then cut with cutting tool 118 in a direction parallel to each other and substantially perpendicular to the direction of the bevel face cut, forming faces 116, FIG. 18. Dotted line 116A indicates a face 116 yet to be cut. It will be understood and appreciated that the angle Y can be adjusted by controlled tilting of the cutting tool 118, in the manner illustrated in FIGS. 7A, 7B, 8A and 8B for groove angle C+ΔC. In this embodiment, the root of the groove defined by faces 116 intersects the lower edge of bevel face 113.

FIG. 19 is a section (19—19 of FIG. 18) through a finished plate taken at the root of a groove and perpendicular to the direction of the second ruling operation. FIG. 20 is a view taken in the direction of arrows 20—20, which is parallel to the face of plate 110 and perpendicular to a line through the cube apices, showing the rectangular outline of the microcube 100 defined by bevel face 100A and faces 100B and 100C from adjacent grooves. It may be seen that cube face 100A is a portion between grooves of bevel face 113, and cube faces 100B and 100C are groove faces 116 from adjoining grooves. The thin ruled plates of FIG. 18 can be stacked together, with the orientation rotated 180° in alternating plates, FIG. 21.

Note that the microcubes could be machined in one plate at a time, but the plates are preferably grouped for machining in order to minimize cost.

A variation of the process which may be useful to make very small microcubes is to machine two rows of microcubes on a single plate, thereby permitting doubling the thickness of the plate and increasing its rigidity. As shown in FIG. 22, the thicker plates 210 without spacers are positioned on the ruling machine with the cuttable end 212 up and with the front faces 224 of the plates angled by a desired amount, X, for example 35.26°, with respect to a perpendicular to the plane of the machine bed, FIG. 22.

With one cutting edge 219A of the cutting tool 219, FIG. 22A, as viewed parallel to the direction of tool travel, positioned perpendicular to the plane of the machine bed, a cut is made in the cuttable end 212 extending from the midpoint of the thickness of the plate at its lower edge 223 to a point 222 less than 25% of the width of the plate from the top edge 225 of the plate, FIG. 22, creating first bevel face 213 and temporary face 213A at an angle Z (FIG. 22A) to face 213, where angle Z is between 1 and 2 times the tilt angle X.

The cut may be filled with a plastic compound 114, FIG. 22C, that will not deteriorate the diamond tool, and V-shaped grooves with a desired included angle, Y, for example 90°, are then cut by means of diamond tool 118, FIG. 23, in a direction substantially perpendicular to the direction of cut of first bevel face 213, forming groove faces 216, with the groove roots 221 passing through the lower edge 223, FIG. 23A, of the first bevel face 213.

Inclined faces 216 of adjacent grooves, which meet at a top edge 220, form two faces 200B and 200C of microcube 200, and the first bevel face 213 forms the third face 200A, FIG. 23B; the rectangular outline of the microcube 200 is readily apparent. The method to this point forms a first row of microcubes on the end of the plate.

The plates 210 are then tilted so that front faces 224 are at an angle X with respect to the perpendicular to the plane of the machine bed, FIG. 24. It will be understood that the symbol "X" is used herein generally to designate the angle between the front face of a plate and the perpendicular to the plane of the machine bed, so that the angle "X" in FIG. 22 may or may not be equal to the angle "X" in FIG. 24, depending on the desired performance characteristics of the retroreflective article. Cutting tool 219 is again positioned, as viewed parallel to the direction of tool travel, with a cutting edge being perpendicular to the plane of the machine bed, and a cut is made in the cuttable end 212 of plate 210 completely removing temporary face 213A, FIG. 24, and creating second bevel face 313. The grooves may again be filled with a plastic compound (not illustrated), and additional grooves are cut perpendicular to the direction of cut of second bevel face 313 by means of tool 118, FIG. 25, forming groove faces 316.

Inclined faces 316 of adjacent grooves which meet at a top edge 320 form two faces 300B and 300C of microcube 300 and the second beveled surface 313 forms the third face 300A, FIG. 25B. Thus a second row of microcubes is formed on the other side of the same end of the plate where the first row of microcubes was formed. As is evident from the dotted lines in FIG. 25 representing the intersections of the faces of the microcubes 200, the lines of intersection are discontinuous so that it is not possible to rule a master comprising all-rectangular microcubes with opposing orientations by ruling straight lines in a single flat surface.

Method of Positioning Plates for Ruling

Figure 3A:
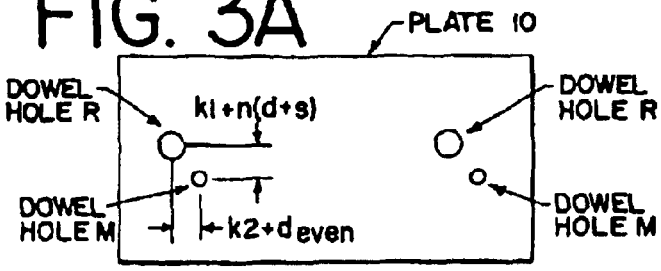
FIG. 3A is a view perpendicular to the face of one of the plates of FIG. 3 showing an arrangement of dowel holes used in one method of aligning plates for ruling and assembly of the electroform master.

Methods of fixturing to obtain the cube corner configurations described herein will be apparent to those skilled in the art. However, because of the exacting tolerances required for microcubes, further detail is provided regarding means of positioning the plates for machining operations. For all shapes of microcubes, two dowel holes R, FIG. 3A will be ground through the front face of each plate. For hexagonal microcubes, the dowel holes R will be used both to assemble the plates for cutting grooves and to position each plate for grinding another set of two dowel holes M for assembly of the electroforming master. The dowel holes M will be in a different position on each plate. Vertically, the dowel holes M will be displaced from dowel holes R (see FIG. 3A) by an amount equal to $k_1+n(d+s)$, where $k_1$ is a constant, n is the number of the plate in the stack, d is groove depth and s is slip; horizontally all dowel holes M will be displaced from the reference holes R by a constant $k_2$ in all odd numbered plates and by $k_2$ plus d in even numbered plates where d is the groove depth and is equivalent to ½ the groove width. For cutting grooves, dowels will be inserted only in the reference dowel holes R; for electroforming, dowels will be inserted only in dowel holes M. The error in locating a groove in one plate relative to a groove in an adjacent plate is anticipated to be less than 0.0002" (5 μ) in any direction. To avoid negative slip, which will introduce undercut and increase loss, the microcubes will preferably be designed for positive slip greater than 0.0005" (12.5 μ).

To machine rectangular microcubes one plate at a time, the plates will be positioned on the ruling machine by means of dowels through the reference dowel holes R and matching dowel holes provided in a fixture, the surface of which is angled by an amount X from a perpendicular to the bed of the ruling machine. After the bevel face and grooves have been machined, the reference dowel holes R will be used to position the plates for electroforming. The maximum error in positioning the apex of the microcube with respect to the center of the plate is anticipated to be less than 0.0001" (2.5 μ). If a number of plates are to be ruled at one time, secondary dowel holes can be provided on each plate in a manner somewhat similar to the procedure described for hexagonal microcubes; however, for a stack of 10 plates, the error in positioning the apex of the microcube is expected to increase possibly to 0.0005" (12.5 μ) in a direction perpendicular to the side of the plate.

Preferred methods of tooling microcubes have been described in great detail; however, it should be understood that alternative methods of tooling based upon the plate concept will be readily apparent to a skilled toolmaker, and the descriptions above should not be considered as limiting.

Retroreflector Performance

Figure 28:
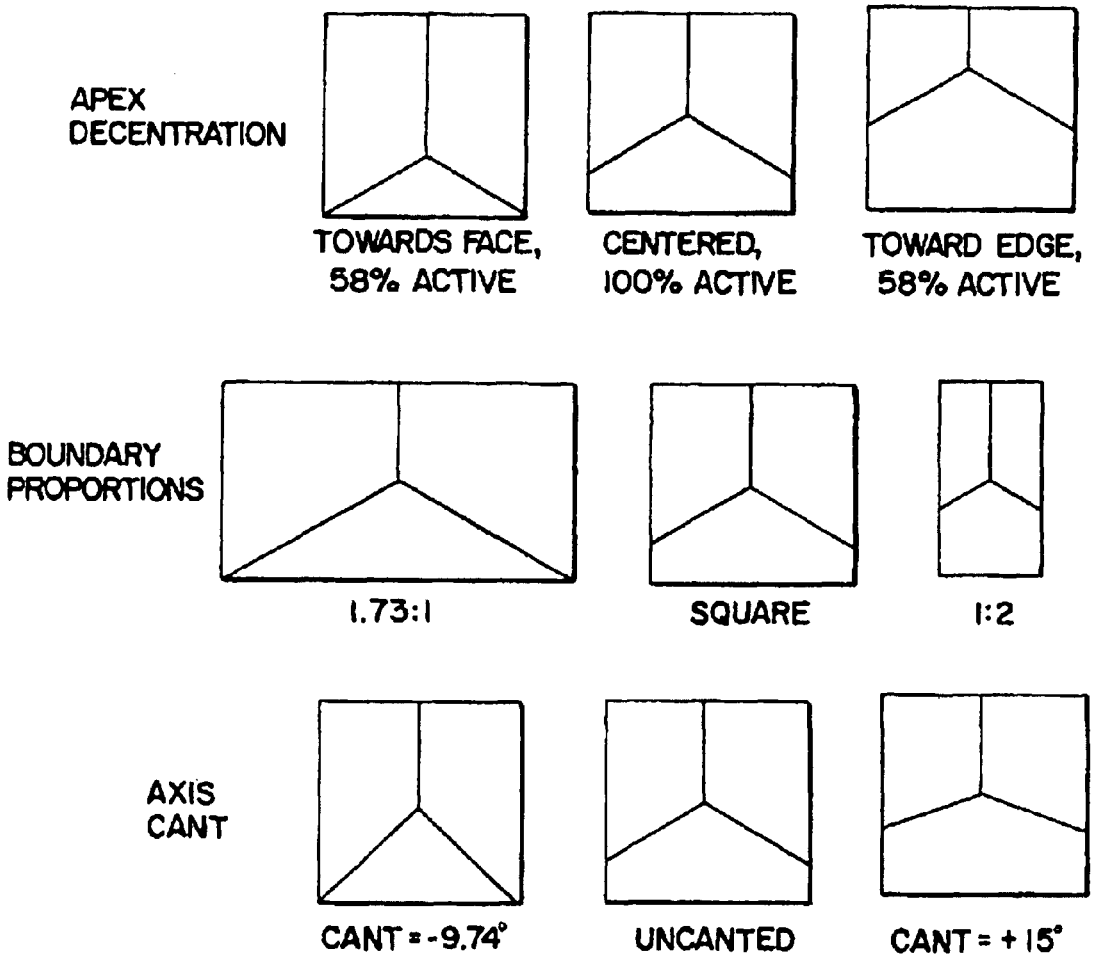
FIG. 28 depicts rectangular cubes wherein three principal optical parameters (apex decentration, boundary proportion, and axis cant) have been modified for illustrative purposes; cube size is a fourth parameter, not illustrated here.

Rectangular microcubes of the present invention differ from hexagonal microcubes of the present invention in two main ways. First, the rectangular microcubes can be arranged as paired (mirror image) elements, whereas the hexagonal microcubes produced from single cut plates are all alike in orientation; pairing of hexagonal microcubes to produce symmetrical performance requires pairing small mirror image arrays of hexagonal microcubes into a larger array. Second, rectangular microcubes offer generally greater design freedom than hexagonal microcubes produced from single cut plates; for rectangles, the axis cant, the apex centration, and the rectangular proportions are each independently variable (see FIG. 28), whereas for hexagons a change in one of the variables also requires a change in one of the other two. Rectangular cubes can have 100% active aperture at 0° incidence by centering the apex; the cant is then fully adjustable from −54.74° to +35.26°, and the proportions are still variable. By contrast, prior art direct ruled triangles have no independent variables; cant, apex centrations and proportions are inextricably interrelated.

For directly ruled triangular microcubes, cube axis cant is determined by the shape of the triangle according to the equation:

$$\text{EQUATION I: cant} = \cos^{-1}\left\{\frac{1}{\sqrt{3AB}}\left[1+\left(\sqrt{A}+\sqrt{B}\right)\sqrt{\frac{AB-1}{A+B}}\right]\right\}$$

where A and B are the tangents of the triangle's two acute angles. For triangular microcubes tooled by the plate assembly technique of the instant invention (see FIG. 31), cube axis cant becomes a combination of the angle calculated above and the angle between the triangle base and the front surface.

In the recent PCT publications Nos. WO 95/11463, WO 95/11465 and WO 95/11470 of the Minnesota Mining and Manufacturing Co., various graphs depict comparisons of retroreflectivity according to percent active aperture, but do not consider total internal reflection (TIR) limits, regarding the cube faces as if metallized to have 100% reflectance; nor do they consider the front surface specular losses, which become substantial at high incidence angles.

In the graphs depicted in the present application, unless noted otherwise, the following parameters were chosen for the determination of retroreflectance:

1. The prismatic article was regarded as a single material having a single refractive index.
2. Internal reflectance was calculated with the Fresnel equations, assuming (contrary to fact) unpolarized light.
3. The front surface transmittance was calculated with the Fresnel equations, assuming unpolarized light.
4. No account was taken of cosine losses due to incidence angle.
5. The entrance plane was parallel to a symmetry plane of the cube corners.
6. Diffraction effects were ignored.

The various depicted curves of possible designs are not necessarily representative of commercially practical articles, but do ably demonstrate the wide variety of results that can be achieved by producing tools and microcube retroreflectors in accordance with various aspects of the present invention.

Most of the graphs are for unmetallized cubes and include the effect of total internal reflection (TIR). FIGS. 39, 40, 44 and 45 demonstrate what happens when the microcubes are metallized. (The term "metallized" is used in a general sense to cover any material applied to the cube faces to provide specular reflection at angles where TIR breaks down.) The various concepts in the above identified recent PCT publications in measuring percent active aperture are material only if the cubes are going to be metallized.

Figure 44:
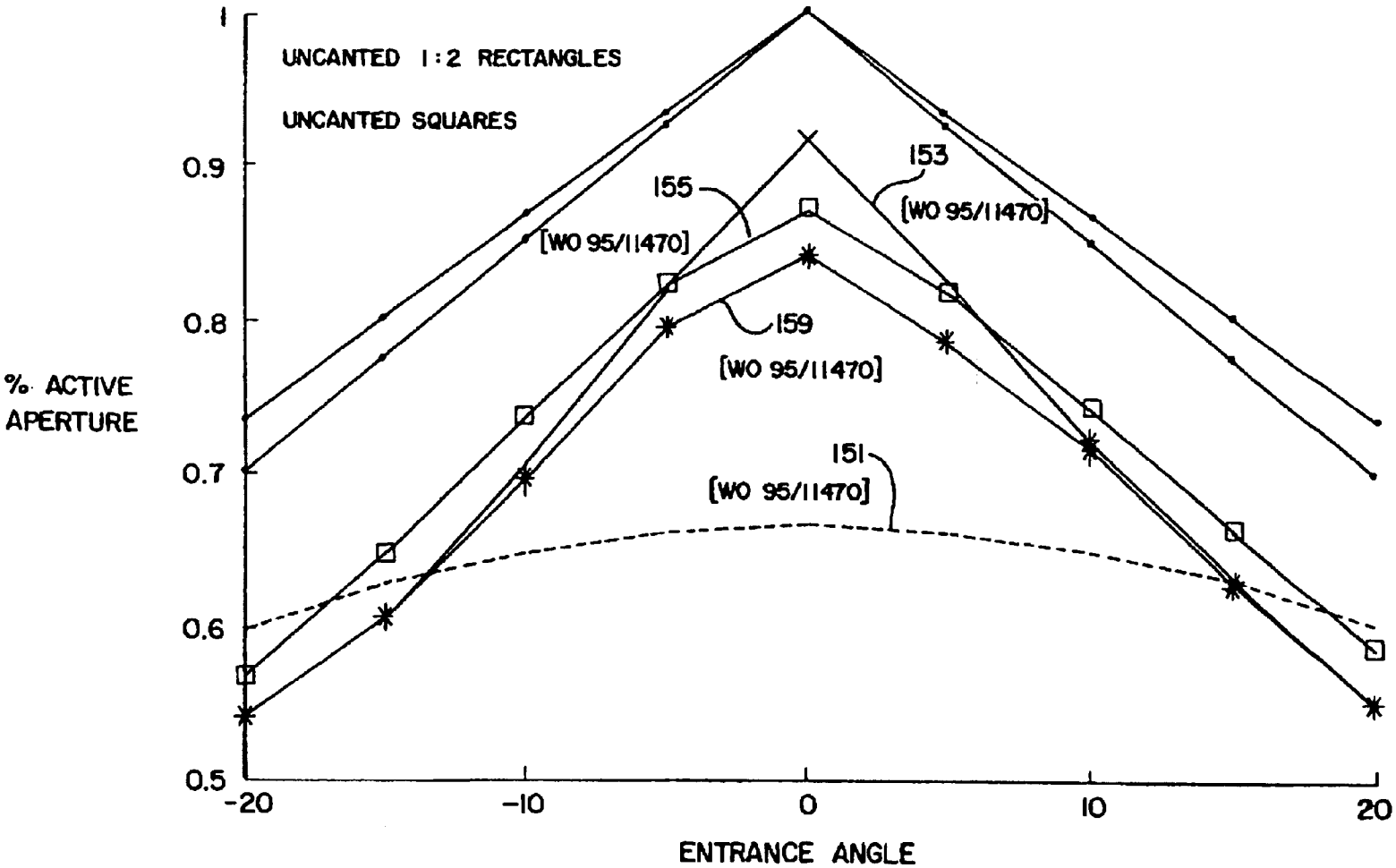
FIG. 44 is a graph showing percent active aperture versus entrance angles from −20° through 20° for paired rectangles and paired squares, both without cant, compared with arrays of microcubes from FIG. 12 of prior publication WO 95/11470.

FIGS. 44 and 45 each compare the performance of some articles of this invention with certain prior art. These figures include curves showing the best published geometric efficiencies (measured as percent active aperture) known to applicants, reproduced from FIG. 12 of WO 95/11470 and FIG. 32 of WO 95/11463, respectively, as well as corresponding curves for articles of this invention. FIG. 44 compares the efficiency of two very simple uncanted rectangle cube designs of the instant invention (such as illustrated in FIG. 26), with the efficiency curves from FIG. 12 of WO 95/11470. Note in FIG. 44 that at 0° the percent active aperture of the inventive microcubes is 9% higher than that of the best curve (curve 153) of FIG. 12 of WO 95/11470 and 50 percent higher than the curve for Hoopman. At 20°, the percent active aperture of the inventive microcubes is 29 percent higher than that of curve 153 and 19 percent higher than that of Hoopman.

EXAMPLE 1

Retroreflectors For Increased Entrance Angularity

Figure 13:
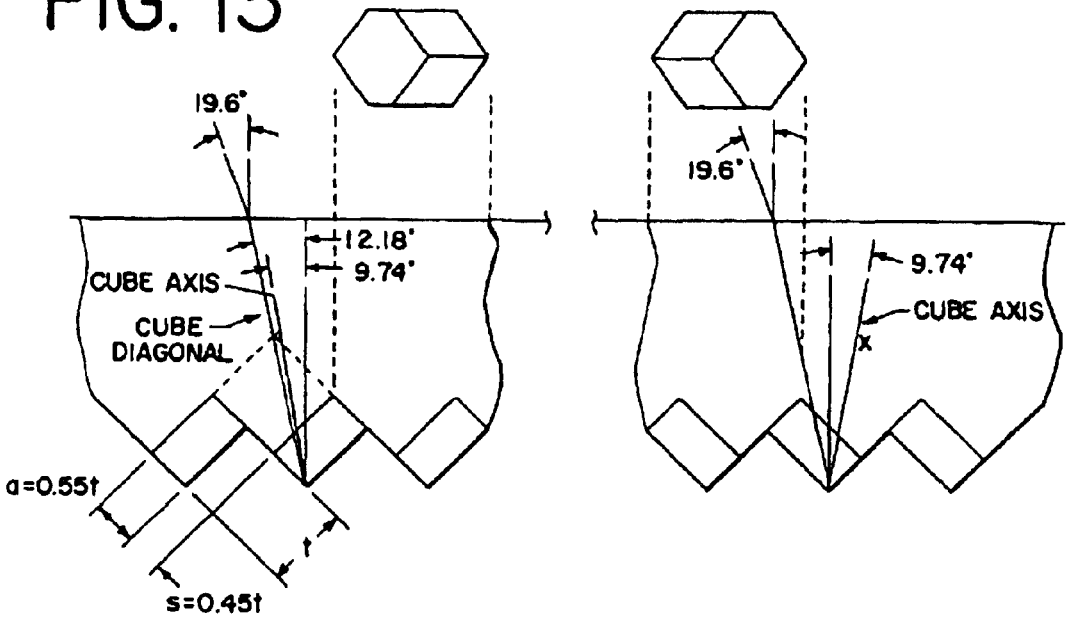
FIG. 13 is a partial side view of an article comprising paired arrays of hexagonal microcubes formed from stacked plates similar to FIG. 12, in which d=0.55 t and s=0.45 t to provide 9.74° face-more-parallel microcubes.

To increase the entrance angularity of the cubes as described in U.S. Pat. No. 3,541,606, U.S. Pat. No. 3,873,184 and U.S. Pat. No. 3,923,378 issued to the same assignee and incorporated herein by reference, the s/t=0, d/t=0.707 solution shown in FIG. 6 might be superseded by an s/t=0.45; d/t=0.55 solution as shown in FIG. 13, for which the cube axis tilt is −9.74° to the front surface of the array and the percent active aperture is 72.5% at 0° incidence angle and 100% at 19.6° incidence angle. (Throughout this example, the entrance plane is assumed to be aligned with the symmetry plane of the cube corners, and the refractive index is assumed to be 1.59.) However, if the hexagon arrays are paired for each cube favorably oriented for 19.6° incidence angle, there is also its mirror image having only 45% effective aperture for that same incident light; the paired array therefore averages 72.5% for light incident at an angle of 19.6°, which is as high as the average at 0° incidence. The result of this averaging of the active apertures is the desirable, surprisingly flat curves of percent active aperture versus entrance angle extending from −20° to +20° for the paired canted rectangles and paired arrays of canted hexagons of FIG. 45, which curves, throughout the 20° entrance angle region, are superior to the active aperture curve for Hoopman by more than 48% and the active aperture curve for example 460 of WO95/11463 by more than 16 percent. The curves of the exemplary rectangles and hexagons of the instant invention continue to be superior to the curve for Hoopman through 50° entrance angle and to the curve for example 460 through 70°, either of which entrance angles is beyond any meaningful entrance angle or specification.

Intimately paired rectangles can be ruled with 1:2 (width:height) proportions of FIG. 27C with the same −9.74° cant and with substantially the same 72.5% active aperture at both 0° and 19.6° incidence angles as for the exemplary hexagons by decentering the cube apex by 13.75% of the rectangle height. As illustrated by the curves in FIG. 40 and FIG. 45, the average percent active aperture of paired arrays of hexagons and paired rectangles can be remarkably similar at all entrance angles for those cases where the percent active apertures at 0° entrance are matched.

Figure 40:
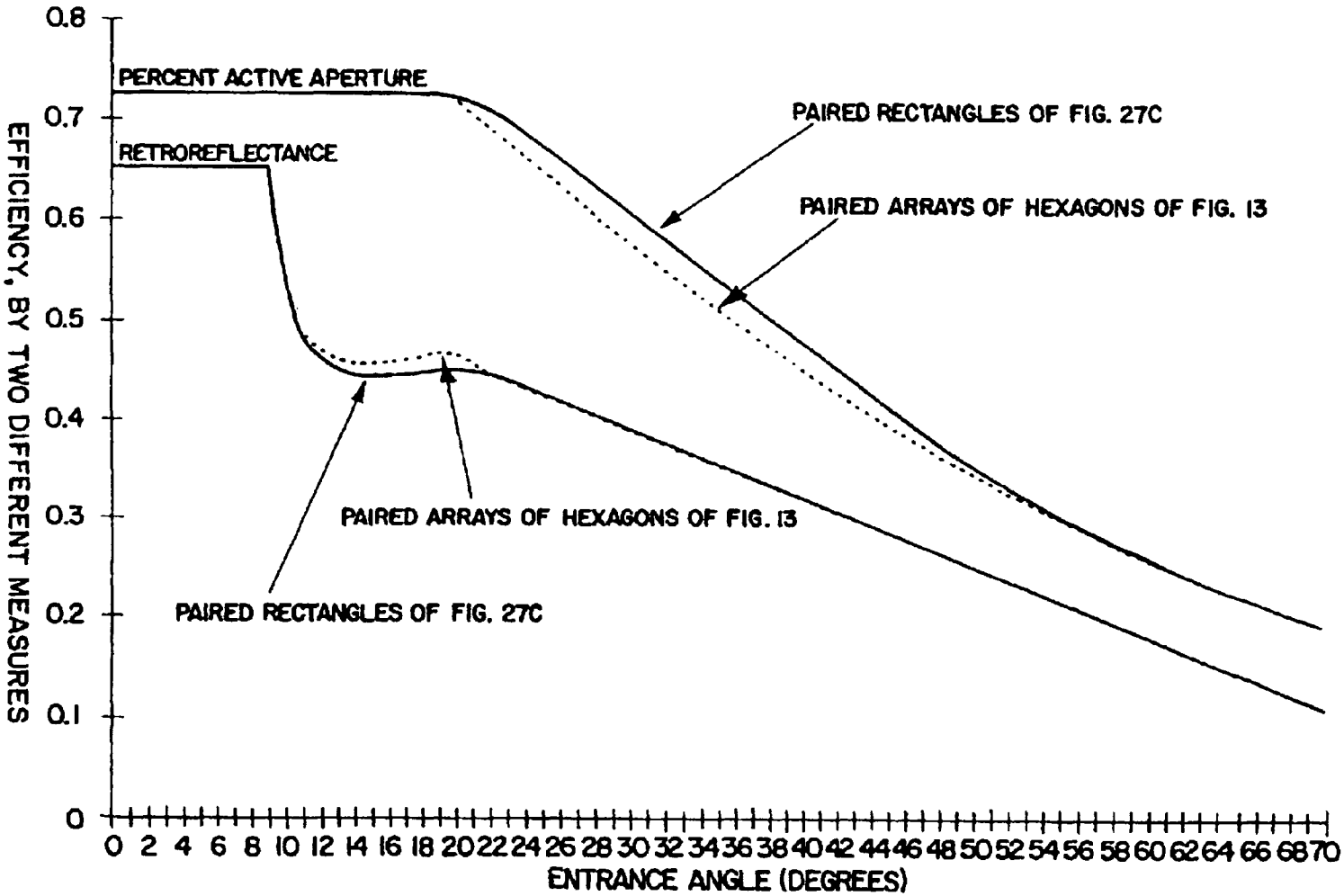
FIG. 40 is a graph comparing the efficiency of the paired arrays of hexagonal microcubes and paired rectangular microcubes of FIGS. 13 and 27C, at entrance angles from 0° to 70°, with efficiency being shown as both percent active aperture and also as retroreflectance.
Figure 42D:
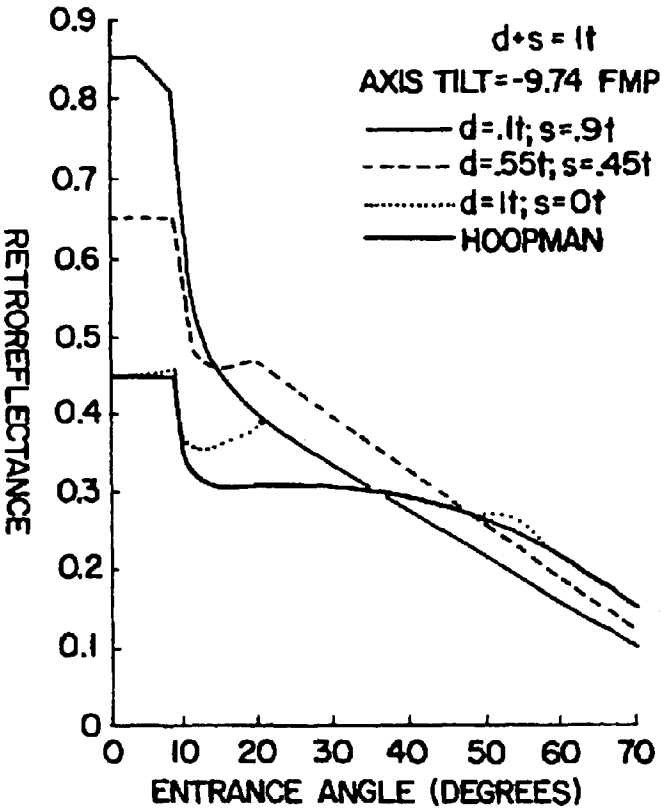
Figure 42C:
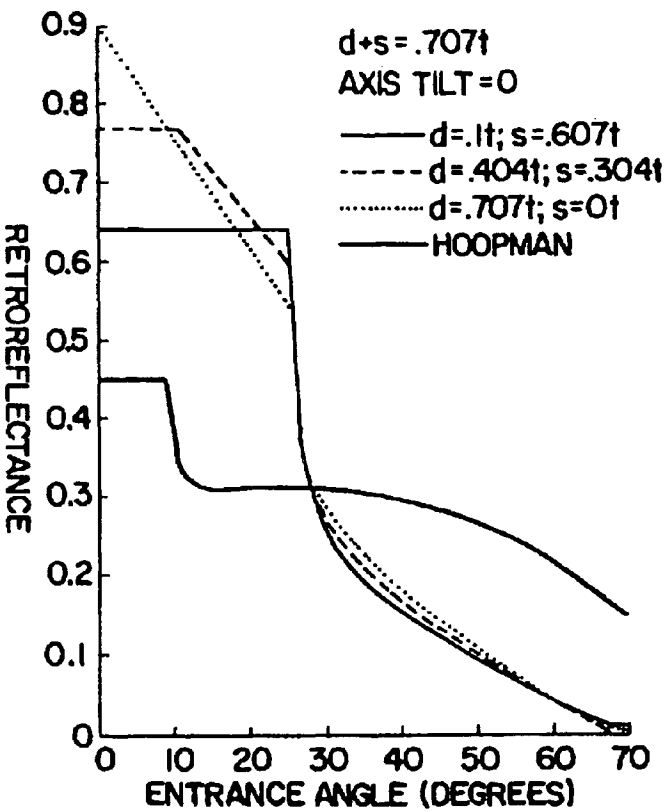
Figure 42E:
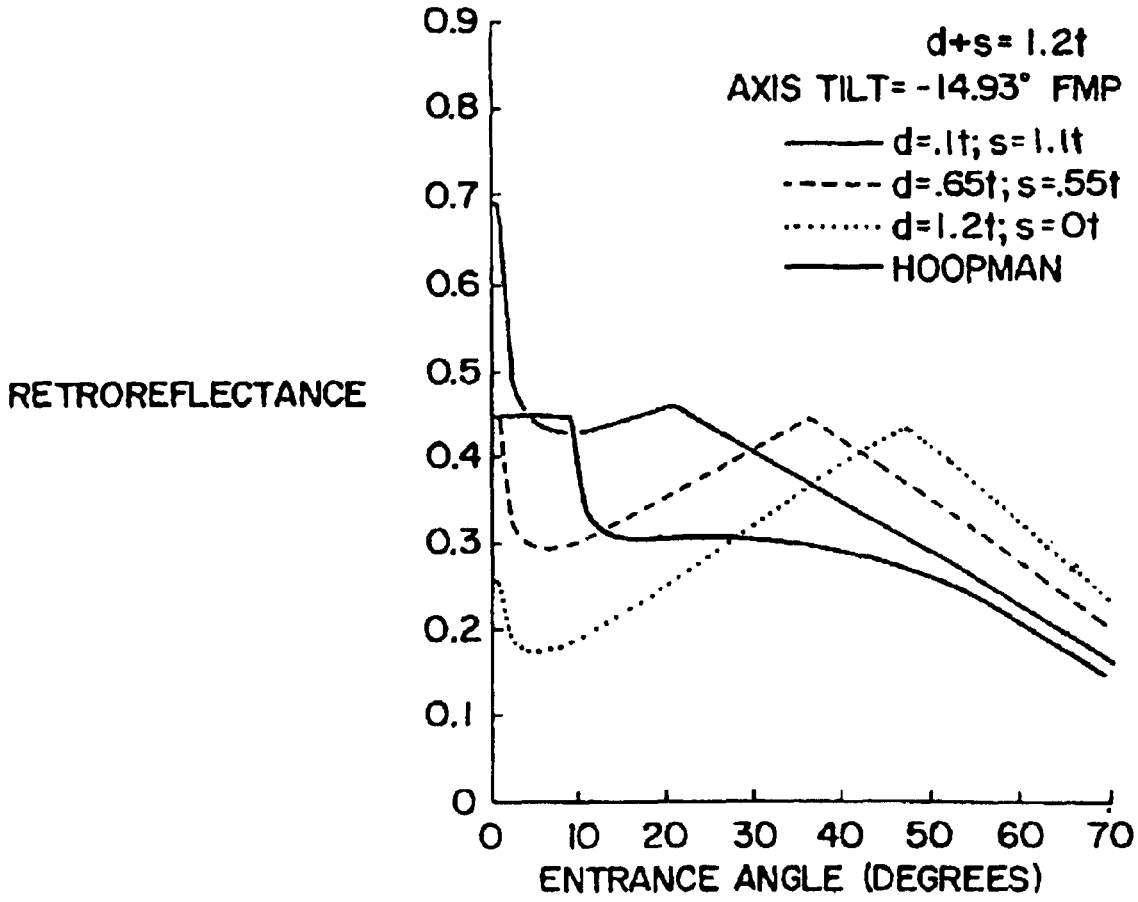
Figure 43:
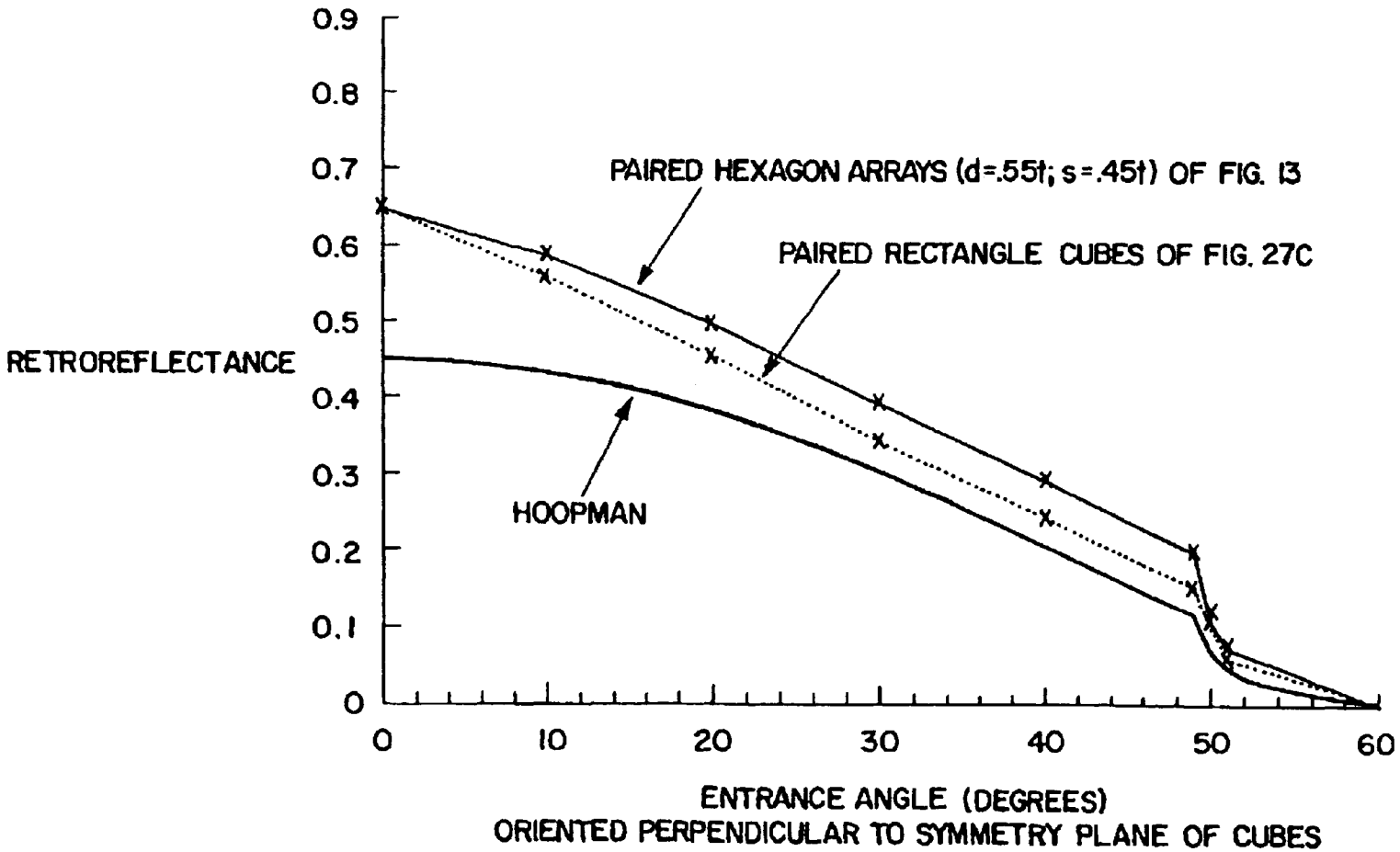
FIG. 43 depicts curves of retroreflectance versus entrance angles from 0° to 60° in a plane perpendicular to the plane of symmetry of the cubes for paired canted rectangles and paired arrays of canted hexagons compared with identically canted Hoopman.

Since the advantages of cube axis canting are realized primarily with cubes relying on TIR, it is more appropriate to base these efficiency considerations on retroreflectance rather than on percent active aperture. In both the rectangle and hexagon examples, when the incidence angle is 19.6° TIR is preserved for that cube (or array) of the pair which gains in effective aperture and lost for the cube (or array) which loses in effective aperture. The net result is total retroreflectance of 0.898×50.2% for the paired rectangles and 0.898×52.3% for the paired arrays of hexagons. (The 0.898 factor is due to the front surface losses.) FIG. 40 compares the retroreflectance and percent active aperture of these rectangle pairs and paired arrays of hexagons over a wide range of entrance angles for an entrance plane aligned with the symmetry plane of the cubes. The d/t=0.55 and s/t=0.45 curve of FIG. 42D compares the retroreflectance of the paired arrays of hexagons (and by association, the retroreflectance of the rectangle pairs of FIG. 27C) with Hoopman for entrance angles aligned with the symmetry plane. FIG. 43 shows retroreflectance versus entrance angle for the same rectangle pairs and paired arrays of hexagons for an entrance plane perpendicular to the symmetry plane. In the plane of symmetry the face-more-parallel paired hexagon arrays of FIG. 13 and rectangle pairs of FIG. 27C are superior to Hoopman through 47°; in a plane perpendicular to the symmetry plane, these pairs are superior to Hoopman through 60°.

Percent active aperture and retroreflectance for paired pentagons (see FIG. 36) are substantially the same as those of the described hexagons and rectangles for the same axis cant and percent active aperture of 0° incidence.

For a discussion of the advantages of the "face-more-parallel" construction with sets of cubes oppositely oriented, see patent U.S. Pat. No. 3,541,606, at col. 15, line 62 through col. 16 line 47, and FIGS. 18, 19 and 20.

Note that the method outlined in Example 1 is intended to maximize the range of entrance angles in one or more planes through which a predetermined minimum retroreflectance can be maintained; the concept requires cubes (or cube arrays) with canted cube axes oppositely oriented as previously described in commonly assigned patents and as used in 3M's "Diamond Grade" sheeting (see also Hoopman U.S. Pat. No. 4,588,258).

EXAMPLE 2

Retroreflectors for Large Incidence Angles, Such as for Pavement Markers

Example 2 is quite different. The method of Example 2 is intended to maximize the retroreflectance through a relatively smaller range of entrance angles about an axis (the principal incident ray) which is not normal to the face of the retroreflector. For example, a raised retroreflective lane marker mounted on a road may have its front surface tilted back 60° from a plane perpendicular to the plane of the pavement. A light ray from the headlight of an approaching vehicle, being substantially parallel to the pavement, becomes incident on the face of the retroreflector at an angle to the normal of 60° and is refracted (in acrylic) to an angle to the normal of 35.5°. For purposes of discussion, the ray parallel to the pavement surface and to the centerline of the road will be called the principal incident ray or optical axis and the ray within the marker after reflection at the front surface will be called the principal refracted ray.

A retroreflector for which L=t, the plates for which are illustrated in FIG. 6, will not be preferred for use as a pavement marker if the plates are stacked with the upper edges of a groove of one plate aligned with the root of a groove in a neighboring plate as in example 1, FIG. 6A, primarily because of loss of effective cube area. A retroreflected ray departs from a cube corner at a point on the opposite side of the cube apex from the point of incidence and at the same distance from the cube apex. If the principal refracted ray is at an angle to the cube axis, some of the light incident on the cube for which L=t will be lost because there is no corresponding point on the opposite side of the cube center. For 100% utilization of the area of each cube in the direction of the optical axis, the cube diagonal 28, FIG. 12, drawn from the point of intersection 29 of the three real faces of the cube corner to the point of intersection 30 of three imaginary planes parallel respectively to each of the three real faces, must be parallel to the principal refracted ray.

As stated in equation E, for hexagonal microcubes the relationship between I', d, s, and t is:

$$\text{Equation E: } 90° - I' = \tan^{-1}\left[\frac{t}{d+s}\right] + \tan^{-1}\left[\frac{t}{2d+s}\right]$$

For an acrylic pavement marker with front surface tilt of 30° to the road, I'=35.54°. If slippage is chosen to be zero (s/t=0), then $$90°-35.54°=\tan^{-1}(t/d)+\tan^{-1}(t/2d);$$

from which d/t=1.42.

To produce a tool comprising hexagonal microcubes for the above pavement marker, the plates will be ruled so that d/t=1.42 and will be offset from one another by an amount d=1.42 t in both the horizontal and vertical directions as in FIG. 10.

Alternatively, the plates of FIG. 6 may be used (d/t=0.707), and the plates offset in the horizontal direction by d=0.707 t and in the vertical direction from one another by an amount d=0.707 t plus s=0.932 t as in FIG. 12. The irregular hexagons projected along the cube diagonal 28 are defined in part by dotted lines 15 in FIG. 12A. The microcubes may be metallized to provide better horizontal entrance angularity.

Figures 29, 29A:
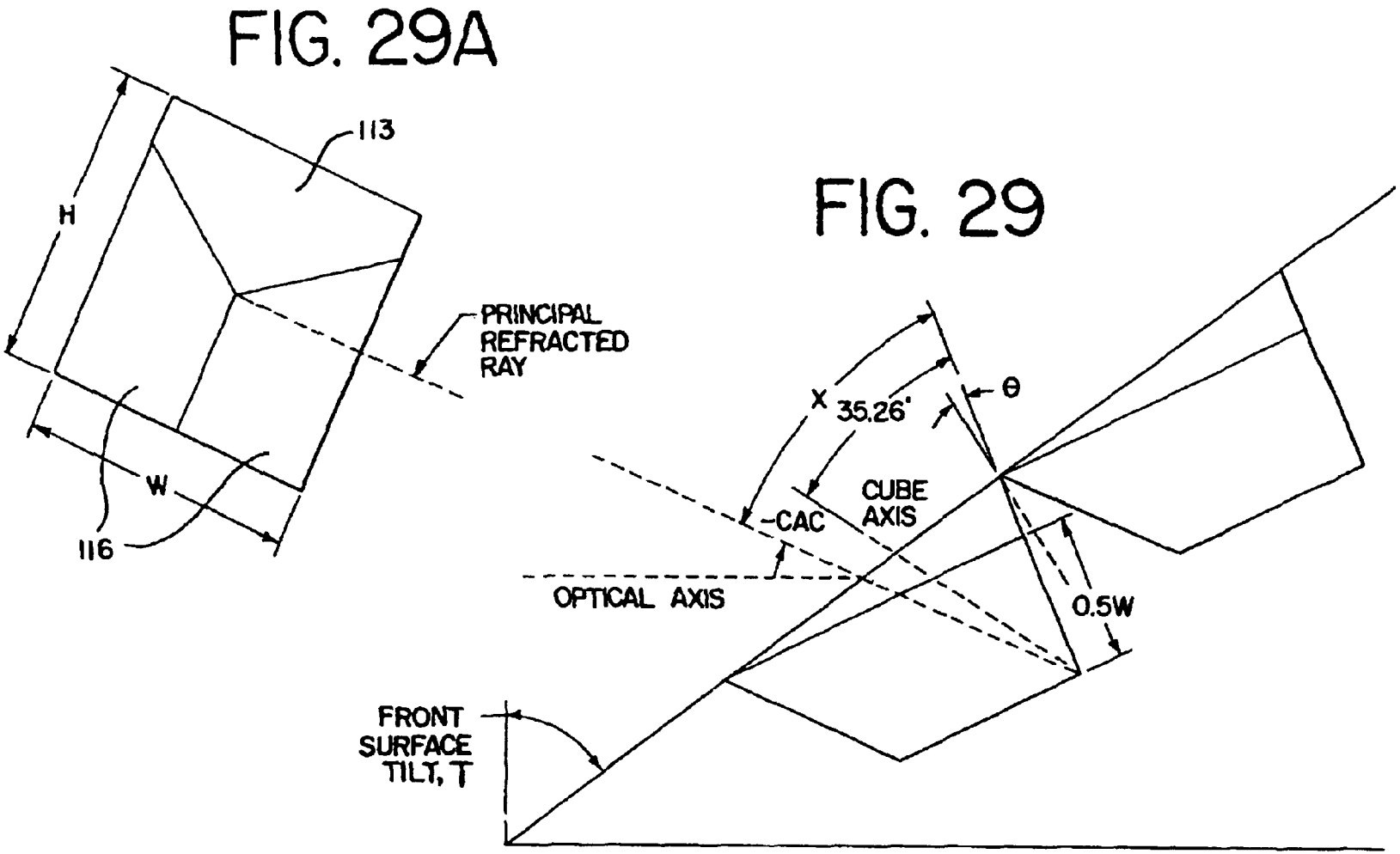
FIG. 29 illustrates an improved rectangular cube, with face-more-parallel when used, for example, in a pavement marker with a 55° incidence angle.
FIG. 29A is a projection of the cube of FIG. 29 parallel to the principal refracted ray.
Figure 30:
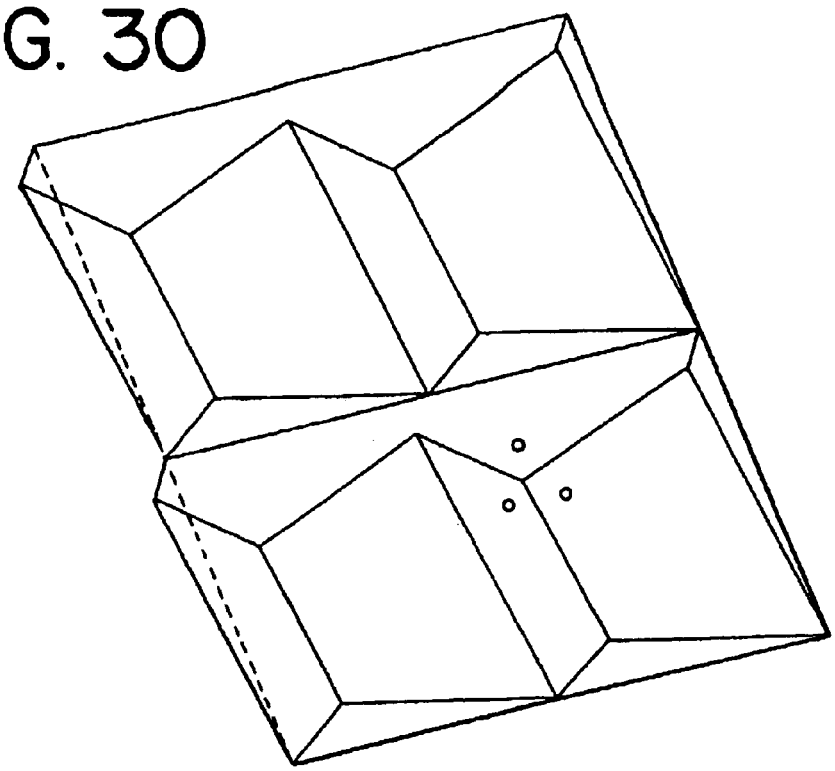
FIG. 30 is an illustrative rear isometric view of an array of cubes of the type shown in the marker of FIG. 29.
Figure 41:
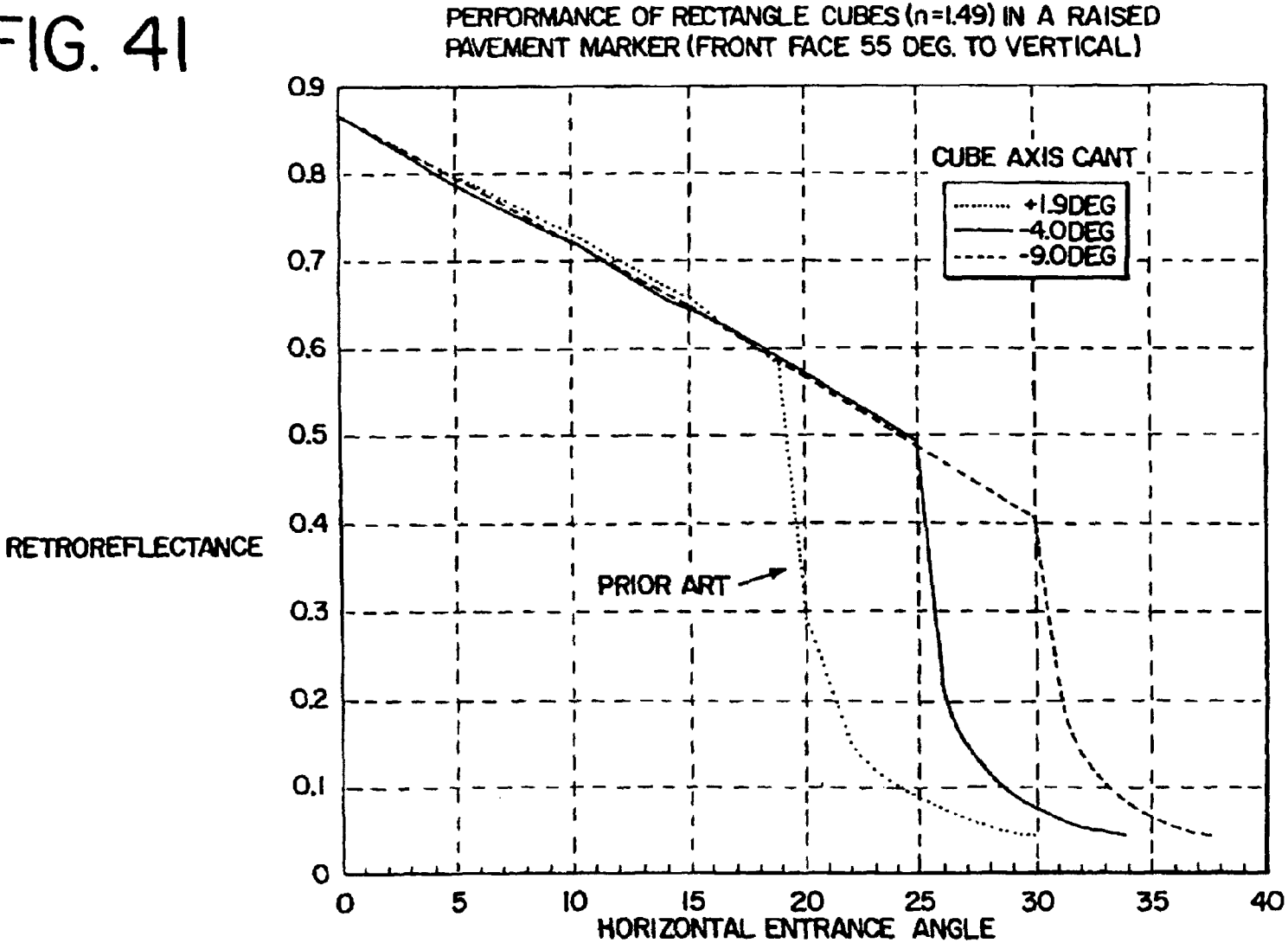
FIG. 41 is a graph of curves of rectroreflectance versus horizontal entrance angle for the improved inventive rectangular microcubes of FIGS. 29 and 30 as compared with rectangular microcubes of cube axis cant=1.9° for which the non-quadrilateral face is perpendicular to the front surface of the reflector as in prior art devices.

Pavement markers comprising rectangular microcubes tooled by the plate method can be made with improved horizontal entrance angularity compared with the direct-ruled cubes of Nelson U.S. Pat. No. 4,895,428. To tool −9°-face-more-parallel rectangular cubes for use in an acrylic pavement marker with a front surface tilt of 55°, the plate thickness is chosen to be equal to H, which is the dimension of the side of the cube that is parallel to the symmetry plane as projected parallel to the principal refracted ray as in FIG. 29A; the plates are positioned on a ruling machine with the plate at an angle to the vertical, X, equal to 35.26° less the cube axis cant (hereinafter "CAC"), (in this example at an angle X, equal to 35.26°−(−9°), or 44.26°); the bevel face 113 is cut to the midpoint of the plate; and grooves are ruled perpendicular to the direction of cut of the bevel face to a depth equal to 0.5 W as shown in FIG. 29 where W in FIG. 29A is the dimension of the side of the rectangle perpendicular to H. The angle θ in FIG. 29 is the angle between the pentagonal face 113 and the normal to the plane of the cube tips, which angle is equal to 35.26° minus CAC minus $\sin^{-1}$ [(sinT)/n], where T is the front surface tilt. For the direct ruled cubes of Nelson U.S. Pat. No. 4,895,428, θ is necessarily 0° and the pentagonal face becomes a triangle. FIG. 29 shows the resulting rectangular cube in section, FIG. 30 shows an array of such cubes in perspective, and FIG. 41 illustrates the approximately 11° improvement in horizontal entrance angularity compared with Nelson that is achieved by means of −9° face-more-parallel construction in accordance with the principles taught in Heenan U.S. Pat. No. 3,541,606. The use of face-more-parallel angles greater than −9° for acrylic pavement markers is questionable because of installation tolerances. Note in FIG. 41 that the maximum retroreflectance is limited to about 0.87 because of the front surface losses at 55° incidence angle.

EXAMPLE 3

Retroreflectors with Increased Divergence

The divergence of the retroreflected beam (i.e., the observation angularity) can be varied in one plane or in multiple planes by changing the dihedral angles between either two or three faces as taught in U.S. Pat. No. 3,833,285 also to the same assignee and incorporated herein by reference and/or by changing the size of the cube, which affects diffraction.

The dihedral angle can be changed by making the groove angle greater or less than 90° and/or by tilting the stack of plates 10 slightly off the perpendicular to the cutting plane, as illustrated by angle "b" in FIG. 11, before the grooves are cut. The groove angle can be varied by changing the angle "C" of the diamond tool (FIG. 7A) or by adjusting the angle "e" of the diamond tool (FIG. 8B) with respect to the perpendicular to the surface being ruled, in accordance with Equation A, previously stated.

The tilt angle "e" of the cutting tool can be held constant for all grooves. Alternatively, the tilt angle "e" of the cutting tool can be adjusted continuously as each groove is cut as a function of the distance traveled by the cutting tool along the ruled surface, or the cutting tool can be held at a constant angle "e" for the entire length of each groove, but changed for each successive groove cut into the surface. It is also possible to use a combination of these techniques; i.e., change the angle "e" of the cutting tool with respect to the surface both along the length of each groove, and from groove to groove.

Diffraction is the spreading of a light beam caused by restriction of the beam size. Diffraction is the main optical difference between macrocubes and microcubes. For the observation angles associated with such commercial applications as highway markings, approximately 0.1° to 1.5°, the diffraction effects for microcubes may be significant while those for macrocubes are insignificant. For macrocubes observation angularity is completely determined by the dihedral angles, the flatness of the faces, and the cube shape, but for microcubes size is an additional determinant.

Figure 46A:
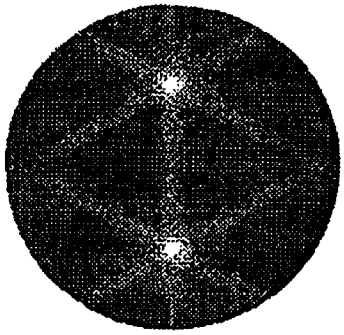
FIGS. 46a–c show the effect of diffraction on the pattern of retroreflected light for three different sizes of hexagonal microcubes.
Figure 46B:
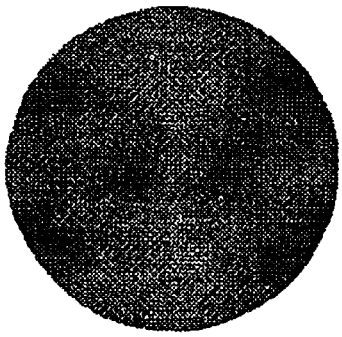
Figure 46C:
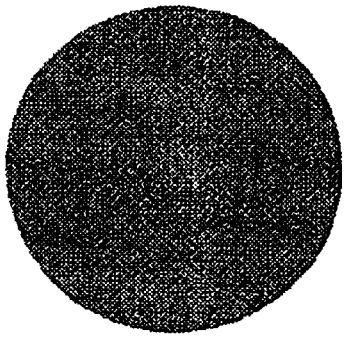

FIGS. 46a–c show the effect of diffraction on the pattern of retroreflected light for d/t=0.707, s/t=0 hexagonal cube corners of refractive index 1.49 for 0° incidence angle and three different cube sizes. The circumference of the figures represents 0.5° divergence and each band of grey represents a factor of two in the retroreflected intensity. All the cube corners have perfectly flat faces and an error of 0.103° on just one of the dihedral angles. FIG. 46a is for t=0.866 mm; FIG. 46b is for t=0.217 mm; FIG. 46c is for t=0.087 mm.

By making the groove angle 90.103° in the plates of FIG. 6, a prismatic article with index 1.49 accurately reproduced from the tool should, by geometry alone, have exactly 0.25° divergence and with all the retroreflection directed at two points. In fact, the light pattern depends on the cube size. For the large microcubes of FIG. 46a, having a cube height of 1 mm, and a width of 1.22 mm across the flats, the light pattern does approximate the geometric prediction (FIG. 46a). For the average size microcubes of FIG. 46b, having a cube height of 0.25 mm and a width of 0.306 mm across the flats, the light pattern still resembles the geometric prediction but with considerable broadening (FIG. 46b). For the small microcubes of FIG. 46c, having a cube height of 0.1 mm and a width of 0.122 mm across the flats, the light pattern, contrary to the geometric prediction, has its major peak at 0° divergence and only weak secondary peaks at 0.3° divergence, near the two predicted points (FIG. 46c). Diffraction by microcubes usefully smooths light patterns, but since it may send light in non-functional directions it must be reckoned in all microcube designs. Adequate cube corner diffraction theory has been in the optical literature for at least 35 years.

The plates used in the ruling method of the instant invention may be formed of any material that is sufficiently strong and rigid to be ruled when formed into flat plates of the thinness required. The material must also be capable of being cut and polished with a high degree of precision. Certain plastics, such as polymethylmethacrylate, may be suitable if metallized after machining to provide electrical conductivity for electroforming. Suitable metals include hardened sterling silver 925 fine, hardened aluminum 7075T6, and electroless nickel. Electroless nickel is known to be very hard yet readily cut with a diamond cutting tool. An electroless nickel overlay on a stainless steel substrate may be sliced into plates with the electroless nickel on one end, which plates may be particularly suited for use in the instant invention. Alternatively, the electroless nickel may be formed as non-adherent plates on a passivated stainless steel block (or a block of another material such as aluminum or metallized plastic) to a thickness of about 0.012 inch and separated from the block to serve as plates 10.

In one form of the invention, the assembly of microcubes defined by the plates when ruled, assembled, and oriented as described herein may be used as a master to electroform copies. The copies are then assembled into a cluster of contiguous elements; the cluster is replicated to provide a number of copies; and the process is repeated, eventually to produce flexible strips having an uninterrupted pattern; the strips are assembled on a cylindrical mandrel to provide cylindrical segments; the cylindrical segments are assembled to provide a cylinder of the desired dimensions corresponding to the width of the web intended to be provided with retroreflective elements; and the assembled cylinder is replicated to provide a flexible endless master cylinder having the pattern of microcubes thereon. The master cylinder may then be replicated to form a relatively thick mother cylinder, which may in turn be replicated to form a generally cylindrical metal embossing tool.

The embossing tool so made may then be used to emboss the microcubes on a surface of a continuous resinous sheeting material to manufacture a retroreflective sheeting article, as disclosed in U.S. Pat. No. 4,486,363. In accordance with the method disclosed therein, the embossing tool described above is moved along a closed course through a heating station where it is heated to a predetermined temperature and then to a cooling station where it is cooled below that temperature; a resinous sheeting material is continuously fed onto the embossing tool through a part of the heating station so that the sheeting is in direct contact with the pattern of hollow microcubes; the sheeting is pressed against the embossing tool at one or more points in the heating station until one surface of the sheeting conforms to the pattern of hexagonal or rectangular microcubes; the embossing tool and sheeting are passed to the cooling station such that the sheeting is cooled below its glass transition temperature; and the embossed sheeting is stripped from the embossing tool.

Those skilled in the art will recognize that, in addition to the embossing tools and techniques described above, the hexagonal or rectangular microcube embossing tool made as described above may also be used to manufacture retroreflective sheeting by other methods such as molding, pressing, or casting. For example, the electroformed strip as described above having the pattern of hollow hexagonal or rectangular microcubes can be provided with a proper support and used directly as an embossing or compression molding tool but in a non-continuous manner, as described in Rowland U.S. Pat. No. 4,244,683.

The retroreflective sheeting made in accordance with the instant invention and having a precise optical pattern of microcubes of various cube shapes is advantageous over sheeting currently being made with triangular microcubes. For the small entrance angles of 0° to 5°, which are of particular interest for retroreflective highway markers and signs, substantially the entire area of the hexagonal or rectangular microcubes is effective for retroreflectance, but only 66 percent of the area of triangular microcubes is retroreflective. Thus, at these small entrance angles, the hexagonal or rectangular microcube retroreflective sheeting represents a 50 percent increase in retroreflective area compared with prior art triangular microcubes.

Retroreflective articles other than sheeting that are currently manufactured with macrocubes may also benefit from a change to hexagonal or rectangular microcubes. For example, pavement markers incorporating microcubes of the instant invention will be less costly because of reduced material cost, may be deteriorated less by abrasion because the exiting rays are closer to the incident rays so that the effect of surface irregularities is reduced, and, for recessed pavement markers or low profile plowable pavement markers, the loss due to shadowing is minimized.

It is well-known in the reflective sheeting art that different sheeting materials such as acrylic, polycarbonate, and vinyl, have different indices of refraction, "n", and will yield different retroreflective results, even for identical cube shapes (see FIG. 37).

Many variations of cubes are possible by modifications of the tooling procedure of the instant invention. For example:

(1) Square cubes, as in FIG. 26, can be tooled by reducing the depth of the intersection at 421 of groove faces 416 and of the intersection at 521 of groove faces 516, relative to the depth of the intersection at 423 of the bevel faces 413 and 513, as shown in FIGS. 27 and 27A. The resulting array of square microcubes is shown in plan view in FIG. 27B, wherein cube 500 is square and face 500A with extended imaginary lines 515 is pentagonal; compare 500A of FIG. 27B with the triangular face 300A of FIG. 25B. Also note that the quadrilateral faces 500B and 500C of FIG. 27B are elongated compared with faces 300B and 300C of FIG. 25B. Square cubes or even cubes elongated beyond square have some advantages regarding the spot pattern of retroreflected light.

(2) The angle of the cube axis with respect to the normal to the plane of the cube apices can be varied by selection of the angle X (FIGS. 15, 22 and 23A) of the front face 124 or 224 of the plate with respect to the perpendicular to the bed of the machine and/or by angling the bisector of the included angle of the V grooves in FIGS. 18, 23, 25 and 27 with respect to the perpendicular to the bed of the machine; for a discussion of the effect of cube axis angle on entrance angularity, see patent U.S. Pat. No. 3,541,606 to the same assignee and subsequent related patents, such as Hoopman U.S. Pat. No. 4,588,258.

(3) For rectangular or pentagonal microcubes, the dihedral angles between cube faces can be varied from 90° by setting the cutting edge 119A of tool 119, FIG. 15, for example, at an angle to the perpendicular to the machine bed, as viewed in the direction of tool travel, for machining the bevel face, and/or by increasing or decreasing from 90° the included angle Y of the V grooves (FIG. 18); changing the dihedral angle between faces controls divergence of the retroreflected beam.

(4) The cube aperture size can be varied by changing the plate thicknesses and groove depth or by machining one row of microcubes on a double thickness plate larger than the row of microcubes with which it is paired; combining microcubes of different cube aperture size minimizes the potential diffraction loss at any one observation angle.

(5) Because one edge of the rectangular cube is rectilinear, sets of opposed pairs of rectangular cubes with different characteristics can be assembled without area loss or slippage walls between the sets; therefore adjoining sets can have different cube axes or different divergence, or different cube height with no inactive surfaces or sharp edges between the sets. For the transition between plates with different cube heights, the cube apices of one or both adjoining rows of cubes of different size may be moved off center; moving the apices of the last row of cubes in a set of large cubes towards a set of smaller cubes will tend to equalize the volume of material in the two sets of cubes.

Similarly, sets of opposed pairs of rectangular cubes can be assembled with plates bearing optic detail other than microcubes, such as a flat surface, a cylindrical surface, or lenticular elements. Such sheeting comprising retroreflective portions and other optical portions is known in the art as transilluminated sheeting. The rectilinear edge of a flat or cylindrical optic surface may be set at the same height as the rectilinear edges of the rectangular microcubes, thereby avoiding any slippage walls between the two types of plates.

(6) For large angles of incidence, in macrocube technology the rectangular cubes in a bundle of pins may be assembled oriented all in one direction as exemplified by the use of hex cubes for pavement markers, in which use there will be a slippage wall paralleling the cube axis and corresponding to one exposed side of the pin. Similarly, for microcube technology, plates on which rectangular microcubes have been machined can be assembled with adjacent plates oppositely oriented (or for large incidence angles optionally oriented in the same direction) and with the cube apices contacting a reference surface set at an angle of (90°−R) to the side of the plates, where R is the angle between the principal refracted ray and the normal.

Figure 32:
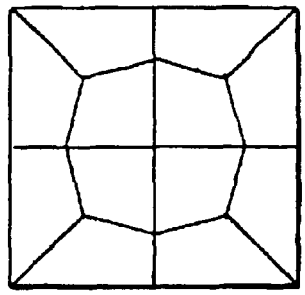
FIG. 32 depicts an array of square microcubes providing four orientations without slippage walls.
Figure 33:
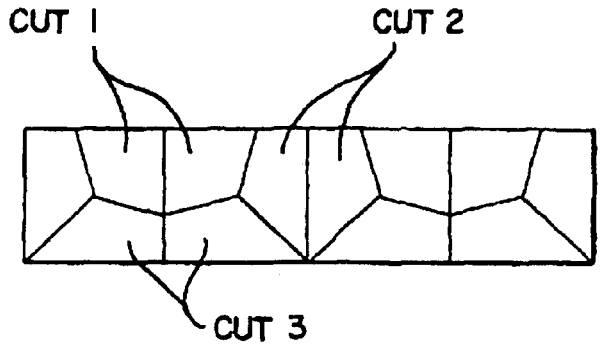
FIG. 33 is a plan view of a plate with a single row of square cubes of the type shown in FIG. 32, with the three cutting steps indicated.
Figure 34A:
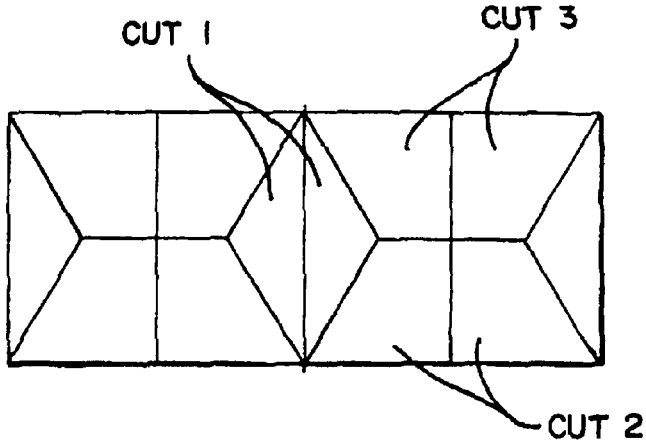
FIGS. 34A and 34B are plan and side views respectively of a portion of a plate having rectangular microcubes with the bevel face ruled in a direction perpendicular to the front face of the plate, as contrasted to the tooling method described in FIGS. 15–21, for which the bevel face was ruled in a direction parallel to the front face of the plate.
Figure 34B:
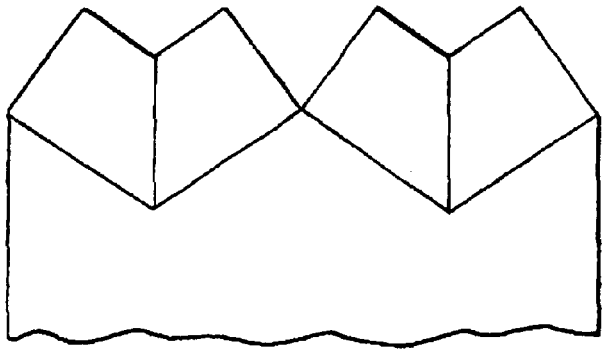

(7) Square cubes such as illustrated in FIG. 32, in which four orientation sets are closely grouped, can be produced by making plates as in FIG. 33. Three sets of grooves are cut as indicated, although not necessarily in any order. For each of the three grooves, two faces are shaped, one on each of two different cubes. Each set of grooves requires a different tilt angle X for the plates and a different included angle of the cutting tool, both of which are calculable by trigonometry. Table J below lists plate tilt angles and the included angle of the cutting tools used to generate cubes of various cube axis cants. For example, if the cube axis cant is to be 0°, then to make cut #1 the angle X to which the plate must be tilted will be 45° and the included angle of the first cutting tool will be 109.47°. To create the four cube orientations shown in FIG. 32, the finished plates are assembled with alternate plates oppositely oriented, i.e., rotated 180° with respect to each other. When the cube axis cant is to be other than 0°, the values of the tilt angle of the plate and included angle of the cutting tool, for each of the three sets of grooves, can be calculated as shown in the following Table J.

TABLE J

| Cube | Groove 1 | | Groove 2 | | Groove 3 | |
|---|---|---|---|---|---|---|
| Axis Cant | Tilt Angle | Included Angle | Tilt Angle | Included Angle | Tilt Angle | Included Angle |
| −10° | 35.02° | 120.31° | 16.22° | 62.44° | 59.80° | 163.35° |
| −8° | 36.92° | 118.02° | 16.99° | 65.15° | 58.57° | 161.90° |
| −6° | 38.87° | 115.78° | 17.76° | 67.85° | 57.36° | 160.40° |

TABLE J-continued

| Cube | Groove 1 | | Groove 2 | | Groove 3 | |
|---|---|---|---|---|---|---|
| Axis Cant | Tilt Angle | Included Angle | Tilt Angle | Included Angle | Tilt Angle | Included Angle |
| −4° | 40.86° | 113.61° | 18.53° | 70.54° | 56.16° | 158.85° |
| −2° | 42.90° | 111.51° | 19.32° | 73.21° | 54.97° | 157.25° |
| 0° | 45° | 109.47° | 20.10° | 75.88° | 53.79° | 155.60° |
| 2° | 47.15° | 107.51° | 20.90° | 78.53° | 52.63° | 153.91° |
| 4° | 49.35° | 105.63° | 21.70° | 81.16° | 51.49° | 152.17° |
| 6° | 51.60° | 103.83° | 22.51° | 83.78° | 50.35° | 150.38° |
| 8° | 53.91° | 102.11° | 23.32° | 86.39° | 49.23° | 148.56° |
| 10° | 56.28° | 100.50° | 24.14° | 88.98° | 48.13° | 146.69° |

The above noted values of the cube axis cant are for illustrative purposes only, and are not intended to limit the scope of the invention or the range of cube axis cants obtainable by the method of the instant invention.

(8) To produce pentagonal microcubes such as illustrated in FIG. 36, plates 710 and 810 are provided, each of which has one side flat and the other side grooved with V grooves having a width equal to the desired spacing of the cubes on the plate and an included angle equal to $$\text{EQUATION K: } g = 2\frac{\arctan\left(\sqrt{3}\cos(v-u)\right)}{\left(\cos(v)-\sqrt{2}\sin(v)\right)}$$

where g is the included angle of the grooves and u and v are the angles of cant of the cubes formed on plates 710 and 810, respectively (see FIG. 36A.) Plates 710 and 810 are not necessarily the same thickness. Bevel faces 813 and groove faces 716 are cut into the smooth side and the grooved side respectively of plate 810 following a procedure similar to that described in detail for rectangular cubes. Bevel faces 713 and groove faces 816 are cut into the grooved side and the smooth side respectively of plate 710. The plates are then assembled as illustrated in FIG. 36 with two plates 710 paired and oppositely oriented alternating with two plates 810 paired and oppositely oriented. The equivalent of the assembly of two paired and oppositely oriented plates 710 could also be made by cutting two rows of cubes on one thicker plate as was illustrated for rectangular cubes in FIGS. 22 through 25A; for this construction both sides of the plate would be grooved. Note that the bevel faces 713 and 813 are continuous for the length of the plates 710 and 810, respectively; as with hexagonal cubes, in instances where there is an uninterrupted face shared by two or more adjacent cube elements, the dividing line between elements shall be considered to be the shortest line (lines 715 and 815 in FIG. 36) that can be drawn to complete the polygon. To avoid damage to the edges of the grooves on the sides of the plates, the plates are assembled for machining with the grooved sides against a similarly grooved dummy plate.

Figure 31:
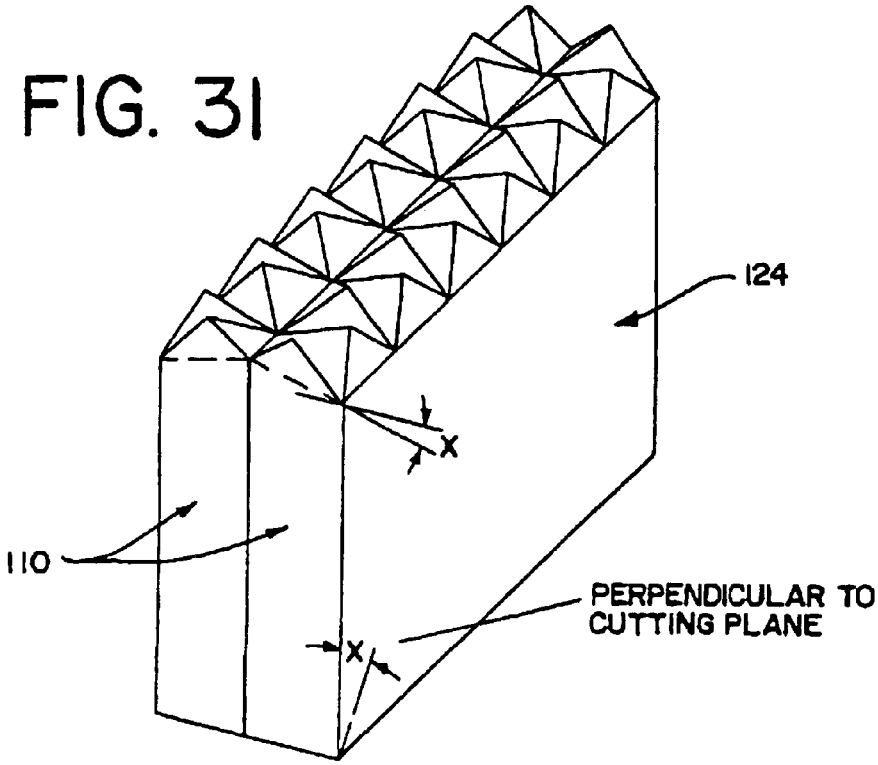
FIG. 31 illustrates the tooling of triangular microcubes with bases not all parallel.

(9) To produce triangular microcubes such as illustrated in FIG. 31, for which the cant and active area are not solely dependent upon cube shape, a plate 110 or a stack of plates is positioned on a ruling machine with the cuttable end up and with the sides of the plate angled by a desired amount X with respect to a perpendicular to the cutting plane of the ruling machine. A pattern of triangular microcubes is then ruled onto the cuttable ends of the plates in a manner similar to the ruling of an uninterrupted surface, which is taught in Stamm, U.S. Pat. No. 3,712,706 or in U.S. Pat. No. 4,478,769 assigned to applicant's assignee. The ruled plates are then assembled as shown in FIG. 31 with alternate plates oriented 180° to each other. Alternatively, the assembly of FIG. 31 could be made by starting with a double thickness plate 210 and separately ruling two arrays of triangular microcubes on its end, which was illustrated for rectangular microcubes in FIGS. 22 through 25. The cant of the triangular microcubes tooled by either of the methods above will be a combination of the angle X and the cube axis cant resulting from the selected ruling angles. In most instances, the paired cubes in the array will be alternately face-more-parallel and edge-more-parallel.

(10) A retroreflective array comprising hexagonal cubes with pentagonal faces, FIG. 35, is made from a plurality of plates, each plate having a plurality of parallel V-grooves on the two opposing surfaces. To make the plates, first a master is made by plating adherent electroless nickel onto the surface of a stainless steel block to a thickness of approximately 0.010". The electroless nickel master is ruled to form one set of parallel V-grooves with a 120° included angle and a groove width equal to the desired dimension across flats of the hexagonal microcube, 0.006" for example. The grooved surface is passivated and additional electroless nickel is deposited on the master to a depth of approximately 0.010". Before removing the electroless nickel deposit from the master, the surface of the deposit is machined with a like set of parallel 120° V-grooves, aligned with the first set of V-grooves on the master, and to a depth such that the greatest thickness of nickel in the deposit is equal to the desired dimension across flats times 1.155. The deposit is separated as a grooved plate from the master.

The plate is positioned with the grooves perpendicular to the bed of the ruling machine. Faces A are machined by a cutting tool having an included angle of 70.52° (as projected in the direction of cutting), the bisector of the included angle being perpendicular to the bed of the machine. The plates then are tilted so that a grooved side makes an angle X equal to 50.77° with respect to a perpendicular to the bed of the machine and faces B1 are cut with a cutting tool having an included angle of 131.81° with the bisector of the included angle perpendicular to the bed of the machine. The process is repeated for faces B2.

The finished plates are stacked for electroforming with grooves interlocking, which results in adjacent plates being displaced half a cube width laterally. One plate in the assembly is shown in bold outline.

For each microcube there will be left exposed in the assembly of plates one small triangular vertical wall where the cube dihedral edge in one plate abuts the face of a cube in an adjacent plate as indicated by the circles labeled C in FIG. 35. This exposed wall is not expected to be a problem in either electroforming or in assignee's embossing process, but, if necessary, the exposed wall can be drafted.

Those skilled in the art will recognize alternative methods for making arrays of hexagonal cubes with pentagonal faces, based on the invention herein, but the method shown is preferred for ease of tooling plates.

It will be understood that while machining using diamond tools to form grooves and edges is the disclosed embodiment, other linear forming techniques, such as laser cutting, EDM, or ion machining, or the like may be used. It will further be understood that known variations of ruling techniques may be employed without departing from the scope and spirit of the invention. For example, grooves may be cut wherein the faces are not planar, but have a slight and known curvature.

What is claimed is:

1. An article comprising an array of microcubes, such that for every plane in space there are two adjacent microcubes for which at the place of adjacency none of the face edges is parallel to that plane, and in which at least one microcube of said array is rectangular or pentagonal, *said at least one microcube of said array having a projected area of less than 1 mm*$^2$, said at least one microcube of said array being canted face-more-parallel.

2. The article of claim 1 in which at least one microcube of said array has a plane of symmetry in which lies the cube axis of said microcube, thereby increasing the entrance angularity of said array in a plane perpendicular to said plane of symmetry.

3. An article comprising an array of microcubes, such that for every plane in space there are two adjacent microcubes for which at the place of adjacency none of the face edges is parallel to that plane, *and* in which at least one [of said] microcube [shape] *of said array* is rectangular, [and in which] *said at least one microcube of said array having a projected area of less than 1 mm*$^2$*, said* at least one [face of said] rectangular microcube [is] *of said array having one* pentagonal *face*.

4. An article comprising an array of *male* microcubes in which every three by three subarray of *said* microcubes is nonrulable, [and] in which at least one microcube [in a said three by three subarray] *in said array* of *male* microcubes is rectangular or pentagonal, *said at least one microcube of said array having a projected area of less than 1 mm*$^2$, said at least one microcube being canted face-more-parallel.

5. The article of claim 4 in which at least one microcube of said array has a plane of symmetry in which lies the cube axis with said microcube, thereby increasing the entrance angularity of said array in a plane perpendicular to said plane of symmetry.

*6. The article of claim 1 in which a plurality of said microcubes are male microcubes and said array of microcubes is nonrulable.*

*7. The article of claim 1 in which a plurality of said microcubes of said array have a projected area of about 0.35 mm*$^2$ *or less.*

*8. The article of claim 1 in which a plurality of said microcubes of said array have a projected area of 0.12 mm*$^2$ *or less.*

*9. The article of claim 1 in which the article comprises retroreflective sheeting.*

*10. The article of claim 1 in which said array comprises microcubes present as opposed paired microcubes.*

*11. The article of claim 10 in which said array comprises pairs of rows of said rectangular microcubes, in which each pair of rows is a replica of a structure that has been ruled on the end of a microthick plate by a v-groove extending along the center of the plate, with opposed pairs of v-grooves extending substantially perpendicular to the sides of the center v-groove.*

*12. The article of claim 1 in which one or more microcubes within said array have substantially 100% active aperture for incidence angles of about zero degrees.*

*13. The article of claim 1 in which said array comprises at least three consecutive rows of said microcubes.*

*14. The article of claim 1 in which said array of microcubes comprises rows of said microcubes in which*

*each row of microcubes is a replica of a structure that has been ruled on the end of a microthick plate.*

*15. The article of claim 14 in which the microthick plate has a thickness of (a)–(b):*

*(a) less than 1 mm, or*

*(b) 0.012 inch (0.305 mm) or less.*

*16. The article of claim 1 in which said array comprises rows of said rectangular microcubes, in which each row is a replica of a structure that has been ruled on the end of a microthick plate by a bevel face formed along the end of the plate and a plurality of v-grooves formed substantially perpendicular to the bevel face.*

*17. The article of claim 16 in which adjacent rows of said microcubes correspond to adjacent plates oriented 180° to each other.*

*18. The article of claim 4 in which at least one microcube of said array has a projected area of about 0.35 $mm^2$ or less.*

*19. The article of claim 4 in which at least one microcube of said array has a projected area of 0.12 $mm^2$ or less.*

*20. The article of claim 4 in which said article comprises retroreflective sheeting.*

*21. The article of claim 4 in which the array comprises microcubes present in said subarray as opposed paired microcubes.*

*22. The article of claim 21 in which said array comprises pairs of rows of said rectangular microcubes, in which each pair of rows is a replica of a structure that has been ruled on the end of a microthick plate by a v-groove extending along the center of the plate, with opposed pairs of v-grooves extending substantially perpendicular to the sides of the center v-groove.*

*23. The article of claim 4 in which one or more microcubes within said array have substantially 100% active aperture for incidence angles of about zero degrees.*

*24. The article of claim 4 in which said array comprises at least three consecutive rows of said microcubes.*

*25. The article of claim 4 in which said array of microcubes comprises rows of said microcubes in which each row of microcubes is a replica of a structure that has been ruled on the end of a microthick plate.*

*26. The article of claim 25 in which the microthick plate has a thickness of (a)–(b):*

*(a) less than 1 mm, or*

*(b) 0.012 inch (0.305 mm) or less.*

*27. The article of claim 4 in which said array comprises rows of said rectangular microcubes, in which each row is a replica of a structure that has been ruled on the end of a microthick plate by a bevel face formed along the end of the plate and a plurality of v-grooves formed substantially perpendicular to the bevel face.*

*28. The article of claim 27 in which adjacent rows of said microcubes correspond to adjacent plates oriented 180° to each other.*

*29. An article comprising an array of male microcubes of which array every three by three subarray of said microcubes is nonrulable, and in which at least one microcube in a said three by three subarray of said microcubes is rectangular or pentagonal, canted face-more-parallel, and has a projected area of 0.12 $mm^2$ or less, in which said array of male microcubes comprises rows of said microcubes in which each row of microcubes is a replica of a structure that has been ruled on the end of a microthick plate, and in which one or more microcubes within the array have substantially 100% active aperture for incidence angles of about zero degrees, and in which the article comprises retroreflective sheeting.*

*30. The article of claim 29 in which said array comprises rows of said rectangular microcubes, in which each row is a replica of a structure produced on the end of said microthick plate by a bevel face formed along the end of the plate and a plurality of v-grooves formed substantially perpendicular to the bevel face.*

*31. The article of claim 30 in which adjacent rows of said microcubes correspond to adjacent plates oriented 180° to each other.*

*32. The article of claim 29 in which said array comprises microcubes present as opposed paired microcubes, and in which said array comprises pairs of rows of said rectangular microcubes in which each pair of rows is a replica of a structure produced on the end of a microthick plate by a v-groove extending along the center of the plate, with opposed pairs of v-grooves extending substantially perpendicular to the sides of the center v-groove.*

*33. The article of claim 29 in which the microthick plate has a thickness of (a)–(b):*

*(a) less than 1 mm, or*

*(b) 0.012 inch (0.305 mm) or less.*

*34. An article comprising an array of male microcubes of which array every three by three subarray of said microcubes is nonrulable, in which at least one microcube in a said three by three subarray of said microcubes is rectangular or pentagonal, canted face-more-parallel, and has a projected area of less than 1 $mm^2$, and in which said array of male microcubes comprises at least three consecutive rows of said microcubes in which each row of microcubes is a replica of a structure that has been ruled on the end of a microthick plate having a thickness of less than 1 mm.*

*35. The article of claim 34 in which said array comprises rows of said rectangular microcubes, in which each row is a replica of a structure that has been ruled on the end of said microthick plate by a bevel face formed along the end of the plate and a plurality of v-grooves formed substantially perpendicular to the bevel face.*

*36. The article of claim 35 in which adjacent rows of said microcubes correspond to adjacent plates oriented 180° to each other.*

*37. The article of claim 34 in which said array comprises microcubes present as opposed paired microcubes, and in which said array comprises pairs of rows of said rectangular microcubes in which each pair of rows is a replica of a structure that has been ruled on the end of a microthick plate by a v-groove extending along the center of the plate, with opposed pairs of v-grooves extending substantially perpendicular to the sides of the center v-groove.*

*38. The article of claim 34 in which the article comprises retroreflective sheeting.*

*39. The article of claim 34 in which one or more microcubes within said array have substantially 100% active aperture for incidence angles of about zero degrees.*

*40. The article of claim 34 in which the microthick plate has a thickness of 0.012 inch (0.305 mm) or less.*

*41. An article comprising an array of microcubes, such that for every plane in space there are two adjacent microcubes for which at the place of adjacency none of the face edges is parallel to that plane, in which a plurality of said microcubes are male microcubes at least some of which have no dihedral face edges collinear with any dihedral face edges of any adjacent microcubes, and in which at least one male microcube of said array is rectangular or pentagonal, has a projected area of less than 1 $mm^2$, and is canted face-more-parallel.*

* * * * *